(12) United States Patent
Ji et al.

(10) Patent No.: US 11,855,550 B2
(45) Date of Patent: Dec. 26, 2023

(54) POWER SUPPLY MODULE

(71) Applicant: Delta Electronics (Shanghai) Co., Ltd., Shanghai (CN)

(72) Inventors: Pengkai Ji, Shanghai (CN); Yibing Cheng, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/644,784

(22) Filed: Dec. 16, 2021

(65) Prior Publication Data

US 2022/0224241 A1 Jul. 14, 2022

(30) Foreign Application Priority Data

Jan. 8, 2021 (CN) .......................... 202110028230.9

(51) Int. Cl.
| | |
|---|---|
| *H02M 7/06* | (2006.01) |
| *H02M 7/00* | (2006.01) |
| *H02M 7/217* | (2006.01) |
| *H01F 27/24* | (2006.01) |

(52) U.S. Cl.
CPC ............ *H02M 7/003* (2013.01); *H01F 27/24* (2013.01); *H02M 7/068* (2013.01); *H02M 7/217* (2013.01)

(58) Field of Classification Search
CPC ...... H02M 3/003; H02M 7/003; H02M 7/068; H02M 7/217; H02M 3/00; H02M 3/01; H02M 3/335; H02M 3/33571; H02M 3/33573; H02M 3/33576; H02M 7/04; H02M 7/06; H01F 27/24; H01F 27/28; H01F 27/306
See application file for complete search history.

(56) References Cited

U.S. PATENT DOCUMENTS

| 7,079,403 | B2 | 7/2006 | Liu et al. | |
|---|---|---|---|---|
| 7,209,374 | B2* | 4/2007 | Noro | ..................... H02M 7/217 363/126 |
| 2020/0219643 | A1* | 7/2020 | Li | ........................... H01F 27/28 |

FOREIGN PATENT DOCUMENTS

| CN | 209312558 U | 8/2019 |
|---|---|---|
| EP | 3648127 A2 | 5/2020 |

* cited by examiner

*Primary Examiner* — Gary L Laxton
(74) *Attorney, Agent, or Firm* — CKC & Partners Co., LLC

(57) ABSTRACT

The disclosure provides a power supply module, including a transformer including magnetic core and winding, and a rectifier circuit electrically connected to the winding, wherein the magnetic core further comprises: a first and a second cover plate opposite to each other; a first magnetic column; and a second magnetic column having a magnetic flux in opposite direction to that of the first magnetic column, the first and second magnetic column connected between the first and the second cover plate; the winding further includes: a first winding wound onto the first magnetic column; and a second winding wound onto the second magnetic column, wherein the first and second winding have a shared winding portion at least partially located between the first and second magnetic column; the rectifier circuit includes a plurality of rectifier components including first to fourth rectifier component electrically connected to form a full bridge rectifier circuit.

34 Claims, 28 Drawing Sheets

POWER SUPPLY MODULE

CROSS-REFERENCE TO RELATED APPLICATIONS

This non-provisional application claims priority under 35 U.S.C. § 119(a) on Patent Application No. 202110028230.9 filed in P.R. China on Jan. 8, 2021, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The disclosure relates to the technical field of power electronics, and particularly to a power supply module.

BACKGROUND

Currently, a market size of cloud (data center) and terminal (mobile phone, iPad, etc.) becomes larger, and is still increasing at a rapid growth. However, it also faces challenges from several aspects while increasing. For example, as functions of various intelligent ICs are diversified, power consumption gets larger, devices on the mainboard is also increasing, and the power supply module shall have a higher power density, or the single power supply module shall have a larger current output capability. Moreover, with improvement of computing performance of the intelligent ICs, there is a higher demand for dynamic performance of the power supply module. Multi-phase parallel power supply is an effective solution for a high current power supply. In the case of both pursuing high efficiency and high dynamic, the power supply module based on a transformer can realize voltage transformation efficiently and plays an important role in power electronics.

The transformer includes a primary winding electrically connected to a primary circuit and a secondary winding electrically connected to a secondary circuit. The primary winding converts electrical energy to the secondary winding through electromagnetic induction according to Faraday's Law of Electromagnetic Induction. Half-bridge full-wave and full bridge rectifier circuits are the basic and widely applied rectifier circuits in the secondary rectifier circuit. When multiple phases are connected in parallel for half-bridge full-wave rectification or full-bridge rectification, more rectifier components are often required, such as, diodes or MOS, and when one level of power of the power supply is improved, more rectifier components often shall be added, which does not facilitate subdividing power level and reducing cost. In addition, connection between the windings is complicated, which does not facilitate integration and manufacturing of the structure. Connection between the rectifier components and the windings easily produces current convergence, causing large connection loss. In the power electronics, the transformer is often used in buck power module, and the rectifier circuit often works in low-voltage large current working conditions, and is more sensitive to connection loss.

Therefore, it is urgent to develop a power supply module capable of solving the above technical problems.

SUMMARY

To solve the above technical problems, the disclosure provides a power supply module, including a transformer including a magnetic core and a winding, and a rectifier circuit electrically connected to the winding, wherein
the magnetic core further includes:
a first cover plate;
a second cover plate opposite to the first cover plate;
a first magnetic column; and
a second magnetic column having a magnetic flux in opposite direction to that of the first magnetic column, the first magnetic column and the second magnetic column are connected between the first cover plate and the second cover plate;
the winding includes:
a first winding wound onto the first magnetic column; and
a second winding wound onto the second magnetic column, wherein the first winding and the second winding have a shared winding portion, and at least a part of the shared winding portion is located between the first magnetic column and the second magnetic column; and
the rectifier circuit includes:
a plurality of rectifier components including a first rectifier component, a second rectifier component, a third rectifier component and a fourth rectifier component electrically connected to form a full bridge rectifier circuit.

In some embodiments, at least one of the first rectifier component, the second rectifier component, the third rectifier component and the fourth rectifier component is connected in series to the shared winding portion.

In some embodiments, the shared winding portion comprises a first shared winding portion and a second shared winding portion, at least a part of the first shared winding portion and at least a part of the second shared winding portion are located between the first magnetic column and the second magnetic column, part of the first winding and part of the second winding disposed on the outside of the first magnetic column and the second magnetic column are electrically connected to form a first annular winding portion, and ends of the first shared winding portion and ends of the second shared winding portion are electrically connected to the first annular winding portion;
the first rectifier component and the second rectifier component are connected in series to the first shared winding portion, the third rectifier component and the fourth rectifier component are connected in series to the second shared winding portion, negative electrode of the first rectifier component and negative electrode of the second rectifier component are respectively electrically connected to the first annular winding portion, positive electrode of the first rectifier component and positive electrode of the second rectifier component are electrically connected to a negative output terminal GND of the power supply module, positive electrode of the third rectifier component and positive electrode of the fourth rectifier component are respectively electrically connected to the first annular winding portion, and negative electrode of the third rectifier component and negative electrode of the fourth rectifier component are electrically connected to a positive output terminal Vo of the power supply module.

In some embodiments, the first shared winding portion and the second shared winding portion have a reuse shared winding portion and two branches, the reuse shared winding portion has one end electrically connected to the first annular winding portion, and the other end extending to upper or lower sides of the first magnetic column and the second magnetic column through a space between the first magnetic column and the second magnetic column, and the other end of the reuse shared winding portion is electrically connected to the first annular winding portion through the two branches, the first rectifier component and the second rectifier component are connected in series to one of the two branches, and the third rectifier component and the fourth rectifier component are connected in series to another one of the two branches.

In some embodiments, all of the first rectifier component, the second rectifier component, the third rectifier component and the fourth rectifier component are located on the upper side of the first magnetic column and the second magnetic column, or all of the first rectifier component, the second rectifier component, the third rectifier component and the fourth rectifier component are located on the lower side of the first magnetic column and the second magnetic column.

In some embodiments, all of the first rectifier component, the second rectifier component, the third rectifier component and the fourth rectifier component are located between the first magnetic column and the second magnetic column, or each of the first rectifier component, the second rectifier component, the third rectifier component and the fourth rectifier component is located on upper or lower sides of the first magnetic column and the second magnetic column.

In some embodiments, wherein when a magnetic flux in the first magnetic column exits perpendicular to a paper, and a magnetic flux in the second magnetic column enters perpendicular to the paper, a current of the first winding flows along an anticlockwise direction, a current of the second winding flows along a clockwise direction, the first rectifier component and the fourth rectifier component are turned on, the second rectifier component and the third rectifier component are turned off, the negative output terminal GND of the power supply module, the first rectifier component, the first winding, the fourth rectifier component and the positive output terminal Vo of the power supply module are electrically connected around the first magnetic column sequentially to form a first current loop, and the negative output terminal GND of the power supply module, the first rectifier component, the second winding, the fourth rectifier component and the positive output terminal Vo of the power supply module are electrically connected around the second magnetic column sequentially to form a second current loop;

when a magnetic flux in the first magnetic column enters perpendicular to a paper, and a magnetic flux in the second magnetic column exits perpendicular to the paper, a current of the first winding flows along a clockwise direction, a current of the second winding flows along an anticlockwise direction, the second rectifier component and the third rectifier component are turned on, the first rectifier component and the fourth rectifier component are turned off, the negative output terminal GND of the power supply module, the second rectifier component, the first winding, the third rectifier component and the positive output terminal Vo of the power supply module are electrically connected around the first magnetic column sequentially to form a third current loop, and the negative output terminal GND of the power supply module, the second rectifier component, the second winding, the third rectifier component and the positive output terminal Vo of the power supply module are electrically connected around the second magnetic column sequentially to form a fourth current loop.

In some embodiments, outer conductors are disposed on outside of the first magnetic column and the second magnetic column, and comprise a first outer conductor, a second outer conductor and a third outer conductor, the first outer conductor is formed by electrically connecting the first winding surrounding an upper surface of the first magnetic column and the second winding surrounding an upper surface of the second magnetic column sequentially, and each of the second outer conductor and the third outer conductor is formed by electrically connecting the first winding surrounding a lower surface of the first magnetic column and the second winding surrounding a lower surface of the second magnetic column sequentially;

a first shared winding portion and a second shared winding portion are provided between the first magnetic column and the second magnetic column, the first shared winding portion has one end electrically connected to the first outer conductor, and the other end electrically connected to the second outer conductor, and the second shared winding portion has one end electrically connected to the first outer conductor, and the other end electrically connected to the third outer conductor;

the plurality of rectifier components further comprise a fifth rectifier component and a sixth rectifier component, the third rectifier component is connected in series to a section of the second outer conductor surrounding the first magnetic column, the fourth rectifier component is connected in series to a section of the third outer conductor surrounding the first magnetic column, the first rectifier component is connected in series to the first shared winding portion, the second rectifier component is connected in series to the second shared winding portion, the fifth rectifier component is connected in series to a section of the second outer conductor surrounding the second magnetic column, and the sixth rectifier component is connected in series to a section of the third outer conductor surrounding the second magnetic column;

positive electrodes of the first rectifier component, the third rectifier component and the fifth rectifier component are electrically connected to a negative output terminal GND of the power supply module, and negative electrodes of the second rectifier component, the fourth rectifier component and the sixth rectifier component are electrically connected to a positive output terminal Vo of the power supply module.

In some embodiments, the plurality of rectifier components further include a fifth rectifier component, a sixth rectifier component, a seventh rectifier component and an eighth rectifier component electrically connected to form an additional full bridge rectifier circuit;

outer conductors are disposed on outside of the first magnetic column and the second magnetic column, and comprise a first outer conductor, a second outer conductor and a third outer conductor, the first outer conductor is formed by electrically connecting the first winding surrounding an upper surface of the first magnetic column and the second winding surrounding an upper surface of the second magnetic column sequentially, and each of the second outer conductor and the third outer conductor is formed by electrically connecting the first winding surrounding a lower surface of the first magnetic column and the second winding surrounding a lower surface of the second magnetic column sequentially;

a reuse shared winding portion is provided between the first magnetic column and the second magnetic column, the reuse shared winding portion has one end electrically connected to the first outer conductor, and the other end electrically connected to the second outer conductor and the third outer conductor;

the first rectifier component and the second rectifier component are connected in series to a section of the second outer conductor surrounding the first magnetic column, the third rectifier component and the fourth rectifier component are connected in series to a section of the third outer conductor surrounding the first magnetic column, the fifth rectifier component and the sixth rectifier component are connected in series to a section of the second outer conductor surrounding the second magnetic column, and the seventh rectifier component and the eighth rectifier component are connected in series to a section of the third outer conductor surrounding the second magnetic column;

positive electrodes of the third rectifier component, the fourth rectifier component, the seventh rectifier component and the eighth rectifier component are electrically connected to a negative output terminal GND of the power supply module, and negative electrodes of the first rectifier component, the second rectifier component, the fifth rectifier component and the sixth rectifier component are electrically connected to a positive output terminal Vo of the power supply module.

In some embodiments, the rectifier circuit further includes a fifth rectifier component, a sixth rectifier component, a seventh rectifier component and an eighth rectifier component.

In some embodiments, the transformer further includes a third magnetic column and a third winding wound onto the third magnetic column, the first magnetic column, the second magnetic column and the third magnetic column are linearly arranged in sequence, magnetic fluxes in the adjacent magnetic columns have opposite directions, and the third magnetic column is connected between the first cover plate and the second cover plate;

the magnetic core further comprises a first magnetic side column and a second magnetic side column disposed on outside of the first magnetic column, the second magnetic column and the third magnetic column, the first magnetic side column and the second magnetic side column are connected between the first cover plate and the second cover plate, and magnetic fluxes in the first magnetic side column and the second magnetic side column are a half of magnetic flux in the first magnetic column or the second magnetic column.

In some embodiments, outer conductors are disposed on outside of the first magnetic column, the second magnetic column and the third magnetic column, and comprise a first outer conductor, a second outer conductor and a third outer conductor, the first outer conductor is formed by electrically connecting the first winding surrounding an upper surface of the first magnetic column, the second winding surrounding an upper surface of the second magnetic column and the third winding surrounding an upper surface of the third magnetic column sequentially, and each of the second outer conductor and the third outer conductor is formed by electrically connecting the first winding surrounding a lower surface of the first magnetic column, the second winding surrounding a lower surface of the second magnetic column and the third winding surrounding a lower surface of the third magnetic column sequentially;

a first inner conductor and a second inner conductor are provided between the first magnetic side column and the first magnetic column, a third inner conductor and a fourth inner conductor are provided between the second magnetic side column and the third magnetic column, a first shared winding portion and a second shared winding portion are provided between the first magnetic column and the second magnetic column, and a third shared winding portion and a fourth shared winding portion are provided between the second magnetic column and the third magnetic column;

one end of the first inner conductor, one end of the first shared winding portion, one end of the third shared winding portion and one end of the third inner conductor are electrically connected to the first outer conductor, the other end of the first inner conductor, the other end of the first shared winding portion, the other end of the third shared winding portion and the other end of the third inner conductor are electrically connected to the second outer conductor, one end of the second inner conductor, one end of the second shared winding portion, one end of the fourth shared winding portion and one end of the fourth inner conductor are electrically connected to the first outer conductor, and the other end of the second inner conductor, the other end of the second shared winding portion, the other end of the fourth shared winding portion and the other end of the fourth inner conductor are electrically connected to the third outer conductor;

the fifth rectifier component is connected in series to the first inner conductor, the sixth rectifier component is connected in series to the second inner conductor, the first rectifier component is connected in series to the first shared winding portion, the second rectifier component is connected in series to the second shared winding portion, the third rectifier component is connected in series to the third shared winding portion, the fourth rectifier component is connected in series to the fourth shared winding portion, the seventh rectifier component is connected in series to the third inner conductor, and the eighth rectifier component is connected in series to the fourth inner conductor;

positive electrodes of the first rectifier component, the third rectifier component, the fifth rectifier component and the seventh rectifier component are electrically connected to a negative output terminal GND of the power supply module, and negative electrodes of the second rectifier component, the fourth rectifier component, the sixth rectifier component and the eighth rectifier component are electrically connected to a positive output terminal Vo of the power supply module.

In some embodiments, the transformer further comprises a third magnetic column, a fourth magnetic column, a third winding wound onto the third magnetic column and a fourth winding wound onto the fourth magnetic column, the first magnetic column, the second magnetic column, the third magnetic column and the fourth magnetic column are arranged in an array, magnetic fluxes of the adjacent magnetic columns have opposite directions, and the third magnetic column and the fourth magnetic column are connected between the first cover plate and the second cover plate;

the first winding, the second winding, the third winding and the fourth winding disposed on outside of the first magnetic column, the second magnetic column, the third magnetic column and the fourth magnetic column are electrically connected sequentially to form a first annular winding portion, the windings between the adjacent magnetic columns form the first shared winding portions and the second shared winding portions, the first shared winding portions are electrically connected to form a first cross-shaped winding portion, the second shared winding portions are electrically connected to form a second cross-shaped winding portion, the first cross-shaped winding portion has one node and four terminals, and the second cross-shaped winding portion has one node and four terminals;

four rectifier components of the first rectifier component, the second rectifier component, the third rectifier component, the fourth rectifier component, the fifth rectifier component, the sixth rectifier component, the seventh rectifier component and the eighth rectifier component are respectively connected in series to the first shared winding portions between corresponding adjacent magnetic columns, positive electrodes of the four rectifier components are electrically connected to the node of the first cross-shaped winding portion, another four rectifier components are respectively connected in series to the second shared winding portions between corresponding adjacent magnetic columns, and negative electrodes of another four rectifier components are electrically connected to the node of the second cross-shaped winding portion.

In some embodiments, the four terminals of the first cross-shaped winding portion and the four terminals of the second cross-shaped winding portion are electrically connected to the first annular winding portion;

the node of the first cross-shaped winding portion is electrically connected to a negative output terminal GND of the power supply module, and the node of the second cross-shaped winding portion is electrically connected to a positive output terminal Vo of the power supply module.

In some embodiments, a window is provided at center of the first cover plate or the second cover plate, lead wires electrically connected to the nodes of the first cross-shaped winding portion and the second cross-shaped winding portion are lead out from the window.

In some embodiments, the winding further includes a second annular winding portion surrounding the first magnetic column, the second magnetic column, the third magnetic column and the fourth magnetic column;

the four terminals of the first cross-shaped winding portion are electrically connected to the first annular winding portion, and the four terminals of the second cross-shaped winding portion are electrically connected to the second annular winding portion;

the node of the first cross-shaped winding portion is electrically connected to the node of the second cross-shaped winding portion;

the first annular winding portion is electrically connected to a positive output terminal Vo of the power supply module, and the second annular winding portion is electrically connected to a negative output terminal GND of the power supply module.

The invention further provides a power supply module, including a transformer including a magnetic core and a winding, and a rectifier circuit electrically connected to the winding, wherein the magnetic core further includes:
a first cover plate;
a second cover plate opposite to the first cover plate;
a first magnetic column; and
a second magnetic column having a magnetic flux in opposite direction to that of the first magnetic column, the first magnetic column and the second magnetic column connected between the first cover plate and the second cover plate;
the winding further includes:

a first winding wound onto the first magnetic column;
a third winding wound onto the second magnetic column;
a second winding wound onto the first magnetic column; and
a fourth winding wound onto the second magnetic column, wherein the first winding and the third winding have a first shared winding portion, the second winding and the fourth winding have a second shared winding portion, at least a part of the first shared winding portion is located between the first magnetic column and the second magnetic column, and at least a part of the second shared winding portion is located between the first magnetic column and the second magnetic column; and
the rectifier circuit further includes:
a plurality of rectifier components including a first rectifier component and a second rectifier component electrically connected to form a half-bridge full-wave rectifier circuit.

In some embodiments, at least one of the first rectifier component and the second rectifier component is connected in series to the first shared winding portion or the second shared winding portion.

In some embodiments, part of the first winding and part of the third winding disposed on outside of the first magnetic column and the second magnetic column are electrically connected to form a first annular winding portion, part of the second winding and part of the fourth winding disposed on outside of the first magnetic column and the second magnetic column are electrically connected to form a second annular winding portion, the first shared winding portion has one end electrically connected to the first annular winding portion, and the other end electrically connected to the second annular winding portion, and the second shared winding portion has one end electrically connected to the first annular winding portion, and the other end electrically connected to the second annular winding portion.

In some embodiments, the first rectifier component is connected in series to the first shared winding portion, the second rectifier component is connected in series to the second shared winding portion, a negative electrode of the second rectifier component is electrically connected to a positive output terminal Vo of the power supply module, and a positive electrode of the first rectifier component is electrically connected to a negative output terminal GND of the power supply module.

In some embodiments, the first rectifier component and the second rectifier component are connected in series to the second shared winding portion, negative electrodes of the first rectifier component and the second rectifier component are electrically connected to a positive output terminal Vo of the power supply module, and the first shared winding portion is electrically connected to a negative output terminal GND of the power supply module.

In some embodiments, the first rectifier component and the second rectifier component are connected in series to the first shared winding portion, positive electrodes of the first rectifier component and the second rectifier component are electrically connected to a negative output terminal GND of the power supply module, and the second shared winding portion is electrically connected to a positive output terminal Vo of the power supply module.

In some embodiments, the first rectifier component and the second rectifier component are between the first magnetic column and the second magnetic column, or the first rectifier component and the second rectifier component are located on upper side of the first magnetic column and the second magnetic column, or the first rectifier component and the second rectifier component are located on lower side of the first magnetic column and the second magnetic column.

In some embodiments, the plurality of rectifier components further include a third rectifier component; wherein the first rectifier component is connected in series to the first shared winding portion, and the second rectifier component and the third rectifier component are connected in series to the second annular winding portion, or the first rectifier component is connected in series to the second shared winding portion, and the second rectifier component and the third rectifier component are connected in series to the first annular winding portion.

In some embodiments, the plurality of rectifier components further include a third rectifier component and a fourth rectifier component;

the first rectifier component is connected in series to a section of the second annular winding portion surrounding the first magnetic column, the second rectifier component is connected in series to a section of the first annular winding portion surrounding the first magnetic column, the third rectifier component is connected in series to a section of the first annular winding portion surrounding the second magnetic column, and the fourth rectifier component is connected in series to a section of the second annular winding portion surrounding the second magnetic column;

positive electrodes of the first rectifier component and the fourth rectifier component are electrically connected to the second shared winding portion, the second shared winding portion is electrically connected to a negative output terminal GND of the power supply module, negative electrodes of the second rectifier component and the third rectifier component are electrically connected to the first shared winding portion, and the first shared winding portion is electrically connected to a positive output terminal Vo of the power supply module.

In some embodiments, the first rectifier component, the first rectifier component, the second rectifier component, the third rectifier component and the fourth rectifier component are located on upper side of the first magnetic column and the second magnetic column; or the first rectifier component, the second rectifier component, the third rectifier component and the fourth rectifier component are located on lower side of the first magnetic column and the second magnetic column; or the first rectifier component and the second rectifier component are respectively located on upper side and lower side of the first magnetic column and the second magnetic column, and the third rectifier component and the fourth rectifier component are respectively located on the upper side and the lower side of the first magnetic column and the second magnetic column; or the first rectifier component and the second rectifier component are located on one side of upper side and lower side of the first magnetic column and the second magnetic column, and the third rectifier component and the fourth rectifier component are located on the other side of the upper side and lower side of the first magnetic column and the second magnetic column; or the first rectifier component and the second rectifier component are located on a left side of the first magnetic column and the second magnetic column, and the third rectifier component and the fourth rectifier component are located on a right side of the first magnetic column and the second magnetic column.

In some embodiments, the rectifier circuit further includes a third rectifier component and a fourth rectifier component.

In some embodiments, the transformer further includes a third magnetic column, a fifth winding and a sixth winding wound onto the third magnetic column, the third winding and the fifth winding have a third shared winding portion, the fourth winding and the sixth winding have a fourth shared winding portion, the first magnetic column, the second magnetic column and the third magnetic column are linearly arranged in sequence, magnetic fluxes in the adjacent magnetic columns have opposite directions, and the third magnetic column is connected between the first cover plate and the second cover plate;

the magnetic core further comprises a first magnetic side column and a second magnetic side column disposed on outside of the first magnetic column, the second magnetic column and the third magnetic column, the first magnetic side column and the second magnetic side column are connected between the first cover plate and the second cover plate, and magnetic fluxes in the first magnetic side column and the second magnetic side column are a half of magnetic flux of the first magnetic column or the second magnetic column;

outer conductors are disposed on outside of the first magnetic column, the second magnetic column and the third magnetic column, and comprises a first outer conductor, a second outer conductor, a third outer conductor and a fourth outer conductor, the first outer conductor is formed by electrically connecting the first winding surrounding an upper surface of the first magnetic column, the third winding surrounding an upper surface of the second magnetic column and the fifth winding surrounding an upper surface of the third magnetic column sequentially, the second outer conductor is formed by electrically connecting the second winding surrounding the upper surface of the first magnetic column, the fourth winding surrounding the upper surface of the second magnetic column and the sixth winding surrounding the upper surface of the third magnetic column sequentially, the third outer conductor is formed by electrically connecting the second winding surrounding a lower surface of the first magnetic column, the fourth winding surrounding a lower surface of the second magnetic column and the fifth winding surrounding a lower surface of the third magnetic column sequentially, and the fourth outer conductor is formed by electrically connecting the first winding surrounding the lower surface of the first magnetic column, the third winding surrounding the lower surface of the second magnetic column and the sixth winding surrounding the lower surface of the third magnetic column sequentially;

a first inner conductor and a second inner conductor are provided between the first magnetic side column and the first magnetic column, a third inner conductor and a fourth inner conductor are provided between the second magnetic side column and the third magnetic column, a first shared winding portion and a second shared winding portion are provided between the first magnetic column and the second magnetic column, and a third shared winding portion and a fourth shared winding portion are provided between the second magnetic column and the third magnetic column;

the first inner conductor has one end electrically connected to the first outer conductor, and the other end electrically connected to the fourth outer conductor, the second inner conductor has one end electrically connected to the second outer conductor, and the other end electrically connected to the third outer conductor, the third inner conductor has one end electrically connected to the first outer conductor, and the other end electrically connected to the third outer conductor, the fourth inner conductor has one end electrically connected to the second outer conductor, and the other end electrically connected to the fourth outer conductor, the first shared winding portion has one end electrically connected to the first outer conductor, and the other end electrically connected to the third outer conductor, the second shared winding portion has one end electrically connected to the second outer conductor, and the other end electrically connected to the fourth outer conductor, the third shared winding portion has one end electrically connected to the first outer conductor, and the other end electrically connected to the fourth outer conductor, and the fourth shared winding portion has one end electrically connected to the second outer conductor, and the other end electrically connected to the third outer conductor.

In some embodiments, the first rectifier component is connected in series to the first inner conductor, the second rectifier component is connected in series to the second shared winding portion, the third rectifier component is connected in series to the third shared winding portion, and the fourth rectifier component is connected in series to the fourth inner conductor;

negative electrodes of the first rectifier component, the second rectifier component, the third rectifier component and the fourth rectifier component are electrically connected to the fourth outer conductor, the third outer conductor is electrically connected to a negative output terminal GND of the power supply module, and the fourth outer conductor is electrically connected to a positive output terminal Vo of the power supply module.

In some embodiments, the transformer further comprises a third magnetic column, a fourth magnetic column, a fifth winding and a sixth winding wound onto the third magnetic column, a seventh winding and an eighth winding wound onto the fourth magnetic column, the first magnetic column, the second magnetic column, the third magnetic column and the fourth magnetic column are arranged in an array, magnetic fluxes of the adjacent magnetic columns have opposite directions, and the third magnetic column and the fourth magnetic column are connected between the first cover plate and the second cover plate;

the first winding, the third winding, the fifth winding and the seventh winding disposed on outside of the first magnetic column, the second magnetic column, the third magnetic column and the fourth magnetic column are electrically connected sequentially to form a first annular winding portion, the second winding, the fourth winding, the sixth winding and the eighth winding disposed on outside of the first magnetic column, the second magnetic column, the third magnetic column and the fourth magnetic column are electrically connected sequentially to form a second annular winding portion, the windings between the adjacent magnetic columns form the first shared winding portions and the second shared winding portions, the first shared winding portions are electrically connected to form a first cross-shaped winding portion, the second shared winding portions are electrically connected to form a second cross-shaped winding portion;

the first cross-shaped winding portion has one node and four terminals, two spaced terminals of the first cross-shaped winding portion are electrically connected to the first annular winding portion, another two terminals of the first cross-shaped winding portion are electrically connected to the second annular winding portion, the second cross-shaped winding portion has one node and four terminals, two spaced terminals of the second cross-shaped winding portion are electrically connected to the first annular winding portion, another two terminals of the second cross-shaped winding portion are electrically connected to the second annular winding portion;

the two terminals of the second cross-shaped winding portion electrically connected to the first annular winding portion are adjacent to the two terminals of the first cross-shaped winding portion electrically connected to the second annular winding portion, and the two terminals of the second cross-shaped winding portion electrically connected to the second annular winding portion are adjacent to the two terminals of the first cross-shaped winding portion electrically connected to the first annular winding portion.

In some embodiments, each of the first rectifier component, the second rectifier component, the third rectifier component and the fourth rectifier component is connected in series to the first shared winding portions between the corresponding adjacent magnetic columns, negative electrodes of the first rectifier component, the second rectifier component, the third rectifier component and the fourth rectifier component are electrically connected to the node of the first cross-shaped winding portion, the node of the first cross-shaped winding portion is electrically connected to a positive output terminal Vo of the power supply module, and the node of the second cross-shaped winding portion is electrically connected to a negative output terminal GND of the power supply module.

In some embodiments, the first rectifier component and the third rectifier component are connected in series to the first shared winding portion, the second rectifier component and the fourth rectifier component are connected in series to the second shared winding portion, positive electrodes of the first rectifier component and the third rectifier component are electrically connected to the node of the first cross-shaped winding portion, positive electrodes of the second rectifier component and the fourth rectifier component are electrically connected to the node of the second cross-shaped winding portion, the first annular winding portion is electrically connected to a negative output terminal GND of the power supply module, and the second annular winding portion is electrically connected to a positive output terminal Vo of the power supply module.

In some embodiments, wherein when a magnetic flux in the first magnetic column exits perpendicular to a paper, and a magnetic flux in the second magnetic column enters perpendicular to the paper, a current of the first winding flows along an anticlockwise direction, a current of the third winding flows along a clockwise direction, the second rectifier component is turned off, the first rectifier component is turned on, the current of the first winding flows through the negative output terminal GND of the power supply module, the first rectifier component and the first winding to the positive output terminal Vo of the power supply module, and the current of the third winding flows through the negative output terminal GND of the power supply module, the first rectifier component and the third winding to the positive output terminal Vo of the power supply module;

when a magnetic flux in the first magnetic column enters perpendicular to a paper, and a magnetic flux in the second magnetic column exits perpendicular to the paper, a current of the second winding flows along a clockwise direction, a current of the fourth winding flows along an anticlockwise direction, the first rectifier component is turned off, the second rectifier component is turned on, the current of the second winding flows through the negative output terminal GND of the power supply module, the second winding and the second rectifier component to the positive output terminal Vo of the power supply module, and the current of the fourth winding flows through the negative output terminal GND of the power supply module, the fourth winding and the second rectifier component to the positive output terminal Vo of the power supply module.

In some embodiments, each of the rectifier components includes one switching tube or a plurality of switching tubes connected in parallel;

the winding is a flat-wise winding, and functions as a secondary winding of the transformer.

The embodiments of the disclosure have at least one of the following advantageous effects:

(1) By disposing the shared winding portion between the magnetic columns, the winding is reused, which can reduce types of electrodes of the winding between the magnetic columns, facilitates simplifying structure and manufacturing process of the transformer, and facilitates improving a power density of the power supply module.

(2) By connecting the rectifier component in series to the shared winding portion, the rectifier components are reused, which can reduce the number of rectifier components, facilitates subdividing the power level of the power supply module, and is convenient for selecting models of switching tubes in the rectifier components.

(3) Arrangement of the rectifier components and the windings better facilitates reducing connection impedance between the rectifier components and the windings, and improving efficiency of the power supply module.

DETAILED DESCRIPTION

Figure 1A:
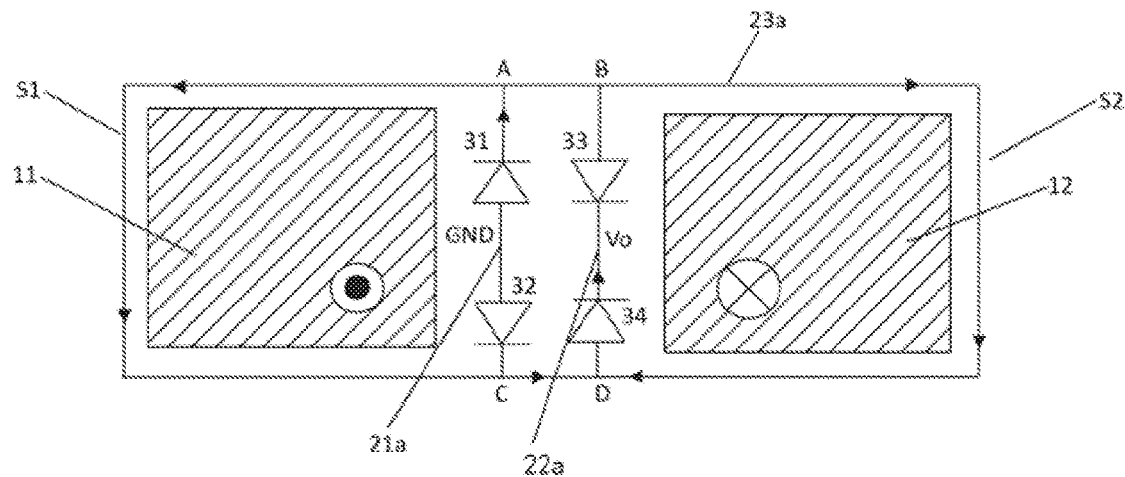
FIG. 1A is a structural view of a power supply module in a first embodiment of the disclosure.

Now exemplary embodiments are described comprehensively with reference to the accompanying drawings. However, the exemplary embodiments can be implemented in various forms, and it shall not be understood as that the disclosure is limited thereto. In contrast, the disclosure is thorough and complete with these embodiments, and concept of the exemplary embodiments is generally transferred to those skilled in the art. The same reference sign in the drawings represents the same or similar structure, so detailed descriptions will be omitted.

Figure 1B:
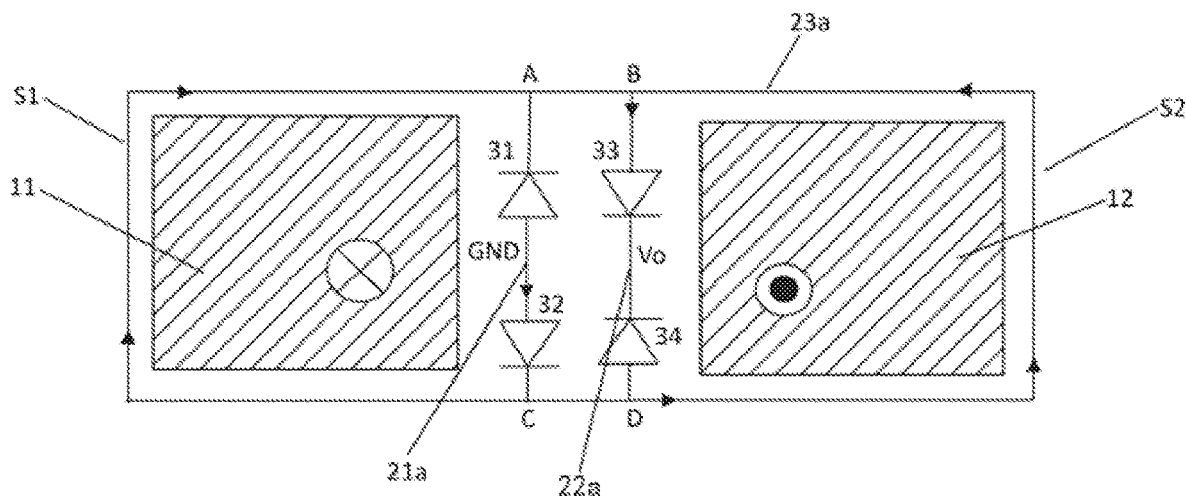
FIG. 1B is another structural view of the power supply module in FIG. 1A.
Figure 1C:
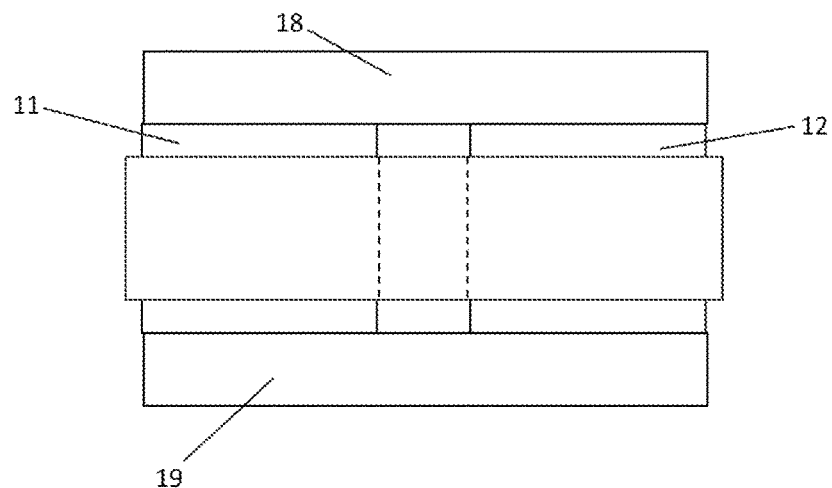
FIG. 1C is a sectional view of the power supply module in the first embodiment of the disclosure.
Figure 1D:
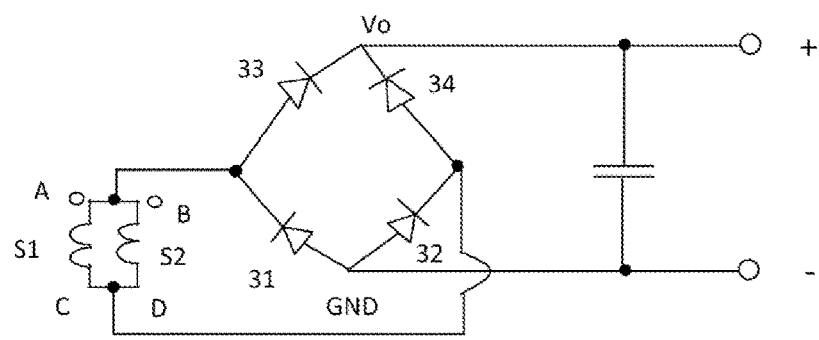
FIG. 1D is a circuit view of the power supply module in the first embodiment of the disclosure.

Referring to FIGS. 1A to 1D, FIG. 1A is a structural view of a power supply module in a first embodiment of the disclosure, FIG. 1B is another structural view of the power supply module in FIG. 1A, FIG. 1C is a sectional view of the power supply module in the first embodiment of the disclosure, and FIG. 1D is a circuit view of the power supply module in the first embodiment of the disclosure.

As shown in FIGS. 1A to 1D, the power supply module includes a transformer and a rectifier circuit electrically connected to the transformer, and the rectifier circuit is a full bridge rectifier circuit. The transformer includes a magnetic core and a winding, and the rectifier circuit is electrically connected to the winding of the transformer. The magnetic core further includes a first cover plate 18, a second cover plate 19 opposite to the first cover plate 18, a first magnetic column 11, and a second magnetic column 12 having a magnetic flux in opposite direction to that of the first magnetic column 11. For example, a direction of the magnetic flux passing through one of the first magnetic column 11 and the second magnetic column 12 is to enter perpendicular to a paper, and a direction of the magnetic flux passing through another one of the first magnetic column 11 and the second magnetic column 12 is to exit perpendicular to the paper. The first magnetic column 11 and the second magnetic column 12 are connected between the first cover plate 18 and the second cover plate 19. The winding further includes a first winding S1 wound onto the first magnetic column 11, and a second winding S2 wound onto the second magnetic column 12, the first winding S1 and the second winding S2 have a shared winding portion, such as sections AC and BD of the first winding S1 and the second winding S2, and at least a part of the shared winding portion is located between the first magnetic column 11 and the second magnetic column 12. The shared winding portion refers to a winding section shared by the first winding S1 and the second winding S2, and a current flowing through the first winding S1 and a current flowing through the second winding S2 are overlapped in the shared winding portion. The rectifier circuit further includes a plurality of rectifier components, for example, a first rectifier component 31, a second rectifier component 32, a third rectifier component 33 and a fourth rectifier component 34 electrically connected to form a full bridge rectifier circuit. By disposing the shared winding portion between the magnetic columns, the winding is reused, which can reduce types of electrodes of the winding between the magnetic columns, facilitates simplifying structure and manufacturing process of the transformer, and facilitates improving a power density of the power supply module.

In some embodiments, the winding is a flat-wise winding, and functions as a secondary winding of the transformer.

In some embodiments, at least one of the first rectifier component 31, the second rectifier component 32, the third rectifier component 33 and the fourth rectifier component 34 is connected in series to the shared winding portion. By connecting the rectifier component in series to the shared winding portion, the rectifier components are reused, which can reduce the number of rectifier components, facilitates subdividing the power level of the power supply module, and is convenient for selection of power devices in the rectifier components.

As shown in FIG. 1A, the shared winding portion includes a first shared winding portion 21a (such as, the section AC of the winding) and a second shared winding portion 22a (such as, the section BD of the winding), at least a part of the first shared winding portion 21a and at least a part of the second shared winding portion 22a are located between the first magnetic column 11 and the second magnetic column 12, the part of the first winding S1 and the part of the second winding S2 that are disposed on the outside of the first magnetic column 11 and the second magnetic column 12 are electrically connected to form a first annular winding portion 23a, and two ends of the first shared winding portion 21a are electrically connected to the first annular winding portion 23a, and two ends of the second shared winding portion 22a are electrically connected to the first annular winding portion 23a. The first rectifier component 31 and the second rectifier component 32 are connected in series to the first shared winding portion 21a, and the third rectifier component 33 and the fourth rectifier component 34 are connected in series to the second shared winding portion 22a. The first shared winding portion 21a is electrically connected to a negative output terminal GND of the power supply module, and the second shared winding portion 22a is electrically connected to a positive output terminal Vo of the power supply module. Specifically, negative electrode of the first rectifier component 31 and negative electrode of the second rectifier component 32 are electrically connected to the first annular winding portion 23a, respectively, positive electrode of the first rectifier component 31 and positive electrode of the second rectifier component 32 are electrically connected to the negative output terminal GND of the power supply module, positive electrode of the third rectifier component 33 and positive electrode of the fourth rectifier component 34 are electrically connected to the first annular winding portion 23a, respectively, and negative electrode of the third rectifier component 33 and negative electrode of the fourth rectifier component 34 are electrically connected to the positive output terminal Vo of the power supply module. Each of the first rectifier component 31, the second rectifier component 32, the third rectifier component 33 and the fourth rectifier component 34 is provided with one switch, such as a power device. The switch can be diodes or MOS, and the diodes drawn in the figure are for illustration only. In other embodiments, each of the rectifier components also can include a plurality of switches connected in parallel. In this embodiment, negative electrode is also named cathode, and positive electrode is also named anode.

As shown in FIG. 1D, the first winding S1 and the second winding S2 are connected in parallel, and share the first rectifier component 31, the second rectifier component 32, the third rectifier component 33 and the fourth rectifier component 34, and the first rectifier component 31, the second rectifier component 32, the third rectifier component 33 and the fourth rectifier component 34 form a full bridge rectifier circuit. As compared to the traditional two-phase parallel full bridge rectifier circuit, the number of rectifier components can be reduced by half to realize a two-phase parallel full bridge rectifier circuit having the same power, or the same number of rectifier components as that in two parallel full bridge circuits can be used to enhance the power by connecting the rectifier components in parallel. Moreover, such structure can improve connection and distribution of the windings and the rectifier components, i.e., increasing the number of parallel connection nodes of the windings and the rectifier components, such that distribution of current of each connection node is more balanced, thereby reducing connection loss, facilitating improving efficiency of the power supply module.

Hereinafter conditions of currents and magnetic fluxes when the power supply module works are explained in details. As shown in FIG. 1A, when a magnetic flux in the first magnetic column 11 exits perpendicular to a paper, and a magnetic flux in the second magnetic column 12 enters perpendicular to the paper, a current of the first winding S1 flows along an anticlockwise direction, a current of the second winding S2 flows along a clockwise direction, the first rectifier component 31 and the fourth rectifier component 34 are turned on, the second rectifier component 32 and the third rectifier component 33 are turned off, the negative output terminal GND of the power supply module, the first rectifier component 31, the first winding S1, the fourth rectifier component 34 and the positive output terminal Vo of the power supply module are electrically connected around the first magnetic column 11 sequentially to form a first current loop, and the negative output terminal GND of the power supply module, the first rectifier component 31, the second winding S2, the fourth rectifier component 34 and the positive output terminal Vo of the power supply module are electrically connected around the second magnetic column 12 sequentially to form a second current loop.

As shown in FIG. 1B, when a magnetic flux in the first magnetic column 11 enters perpendicular to a paper, and a magnetic flux in the second magnetic column 12 exits perpendicular to the paper, a current of the first winding S1 flows along a clockwise direction, a current of the second winding S2 flows along an anticlockwise direction, the second rectifier component 32 and the third rectifier component 33 are turned on, the first rectifier component 31 and the fourth rectifier component 34 are turned off, the negative output terminal GND of the power supply module, the second rectifier component 32, the first winding S1, the third rectifier component 33 and the positive output terminal Vo of the power supply module are electrically connected around the first magnetic column 11 sequentially to form a third current loop, and the negative output terminal GND of the power supply module, the second rectifier component 32, the second winding S2, the third rectifier component 33 and the positive output terminal Vo of the power supply module are electrically connected around the second magnetic column 12 sequentially to form a fourth current loop. In the duration of alternating variation of the magnetic fluxes in the first magnetic column 11 and the second magnetic column 12, the circuit works alternatively, as shown in FIGS. 1A and 1B. The magnetic fluxes varied alternatively in the first magnetic column 11 and the second magnetic column 12 can be generated by primary coils (not shown) wound onto the first magnetic column 11 and the second magnetic column 12 with an AC current flowed therein.

Figure 1E:
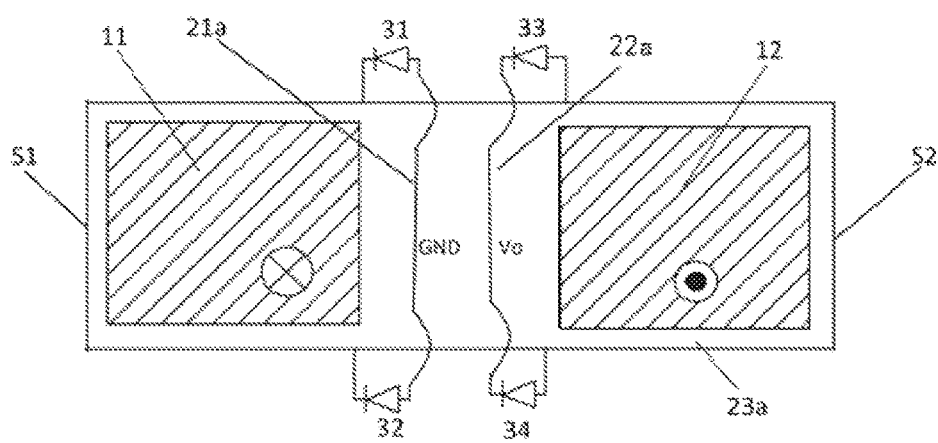
FIG. 1E is a schematic view (I) of arrangement of rectifier components of a power supply module modified on the basis of the first embodiment of the disclosure.
Figure 1F:
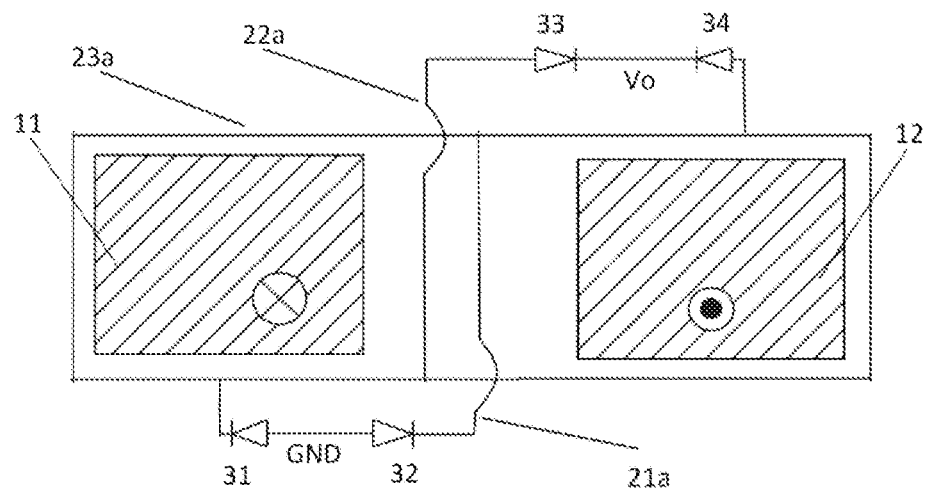
FIG. 1F is a schematic view (II) of arrangement of rectifier components of the power supply module modified on the basis of the first embodiment of the disclosure.

Referring to FIGS. 1A, 1E and 1F, FIG. 1E is a schematic view (I) of arrangement of rectifier components of a power supply module modified on the basis of the first embodiment of the disclosure, and FIG. 1F is a schematic view (II) of arrangement of rectifier components of the power supply module modified on the basis of the first embodiment of the disclosure. As shown in FIG. 1A, the first rectifier component 31, the second rectifier component 32, the third rectifier component 33 and the fourth rectifier component 34 are between the first magnetic column 11 and the second magnetic column 12. In some embodiments, each of the first rectifier component 31, the second rectifier component 32, the third rectifier component 33 and the fourth rectifier component 34 is located on upper side or lower side of the first magnetic column and the second magnetic column. As shown in FIG. 1E, the first rectifier component 31 and the third rectifier component 33 are located on the upper side of the first magnetic column 11 and the second magnetic column 12, and the second rectifier component 32 and the fourth rectifier component 34 are located on the lower side of the first magnetic column 11 and the second magnetic column 12. As shown in FIG. 1F, the first rectifier component 31 and the second rectifier component 32 are located on the lower side of the first magnetic column 11 and the second magnetic column 12, and the third rectifier component 33 and the fourth rectifier component 34 are located on the upper side of the first magnetic column 11 and the second magnetic column 12. In some embodiments, the first rectifier component 31 and the second rectifier component 32 can also be located on the upper side of the first magnetic column 11 and the second magnetic column 12, and the third rectifier component 33 and the fourth rectifier component 34 can also be located on the lower side of the first magnetic column 11 and the second magnetic column.

When locating the rectifier components above or below the magnetic core, it facilitates realizing structure of the power supply module, facilitates distribution and arrangement of the rectifier components as well as heat dissipation of the rectifier components, and has wide applicability. For example, different types or heat dissipation requirements of the rectifier components can be moot by adjusting position arrangement of the rectifier components.

Figure 1G:
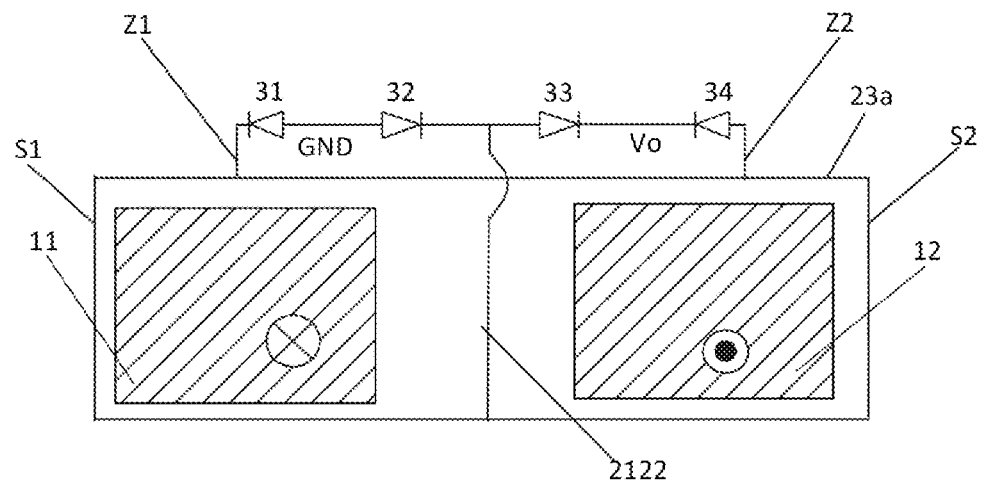
FIG. 1G is a schematic view (III) of arrangement of rectifier components of the power supply module modified on the basis of the first embodiment of the disclosure.
Figure 1H:
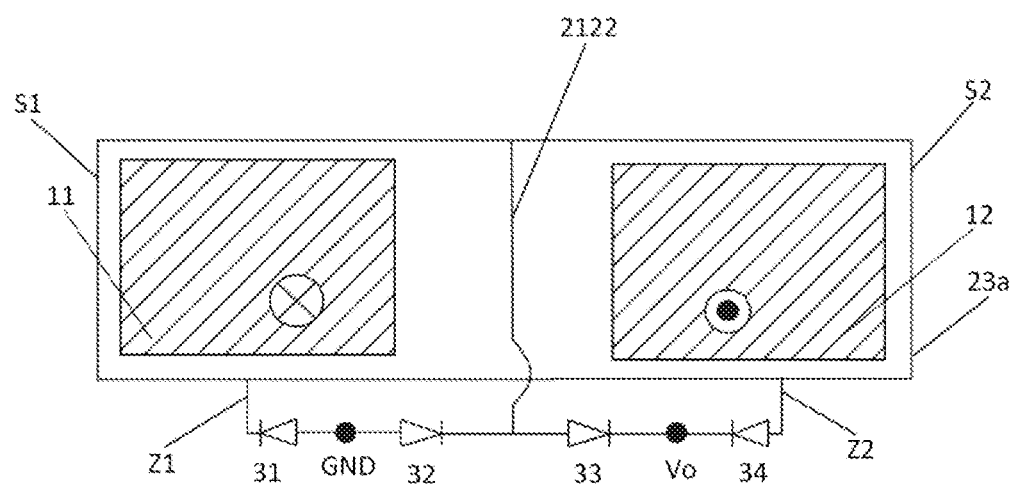
FIG. 1H is a schematic view (IV) of arrangement of rectifier components of the power supply module modified on the basis of the first embodiment of the disclosure.

Referring to FIGS. 1G and 1H, FIG. 1G is a schematic view (III) of arrangement of rectifier components of the power supply module modified on the basis of the first embodiment of the disclosure, and FIG. 1H is a schematic view (IV) of arrangement of rectifier components of the power supply module modified on the basis of the first embodiment of the disclosure. As shown in FIGS. 1G and 1H, the first shared winding portion 21a and the second shared winding portion 22a between the first magnetic column 11 and the second magnetic column 12 can be combined to form a reuse shared winding portion 2122. Specifically, the first shared winding portion 21a and the second shared winding portion 22a has one reuse shared winding portion 2122 and two branches Z1, Z2. In the power supply module shown in FIG. 1G, one end (such as lower end) of the reuse shared winding portion 2122 is electrically connected to the first annular winding portion 23a, and the other end (such as upper end) extends to the upper side of the first magnetic column 11 and the second magnetic column 12 through a space between the first magnetic column 11 and the second magnetic column 12, and the other end (such as the upper end) of the reuse shared winding portion 2122 is electrically connected to the first annular winding portion 23a through the two branches Z1, Z2. In the power supply module shown in FIG. 1H, one end (such as upper end) of the reuse shared winding portion 2122 is electrically connected to the first annular winding portion 23a, and the other end (such as lower end) extends to the lower side of the first magnetic column 11 and the second magnetic column 12 through a space between the first magnetic column 11 and the second magnetic column 12, and the other end (such as the lower end) of the reuse shared winding portion 2122 is electrically connected to the first annular winding portion 23a through the two branches Z1, Z2. The first rectifier component 31 and the second rectifier component 32 are connected in series to one branch Z1, and the third rectifier component 33 and the fourth rectifier component 34 are connected in series to the other branch Z2.

In some embodiments, as shown in FIG. 1G, all of the first rectifier component 31, the second rectifier component 32, the third rectifier component 33 and the fourth rectifier component 34 can be located on the upper side of the first magnetic column 11 and the second magnetic column 12. As shown in FIG. 1H, positions of the four rectifier components 31-34 are opposite to positions shown in FIG. 1G. For example, all of the first rectifier component 31, the second rectifier component 32, the third rectifier component 33 and the fourth rectifier component 34 can be located on the lower side of the first magnetic column 11 and the second magnetic column 12. The disclosure is not limited thereto, and positions of the rectifier components can be selectively adjusted according to specific applications.

In the power supply module shown in FIGS. 1G and 1H, the branch Z2 is electrically connected to a positive output terminal Vo of the power supply module, and the branch Z1 is electrically connected to a negative output terminal GND of the power supply module. Specifically, positive electrodes of the first rectifier component 31 and the second rectifier component 32 are electrically connected to the negative output terminal GND of the power supply module, and negative electrodes of the third rectifier component 33 and the fourth rectifier component 34 are electrically connected to the positive output terminal Vo of the power supply module.

Figure 2A:
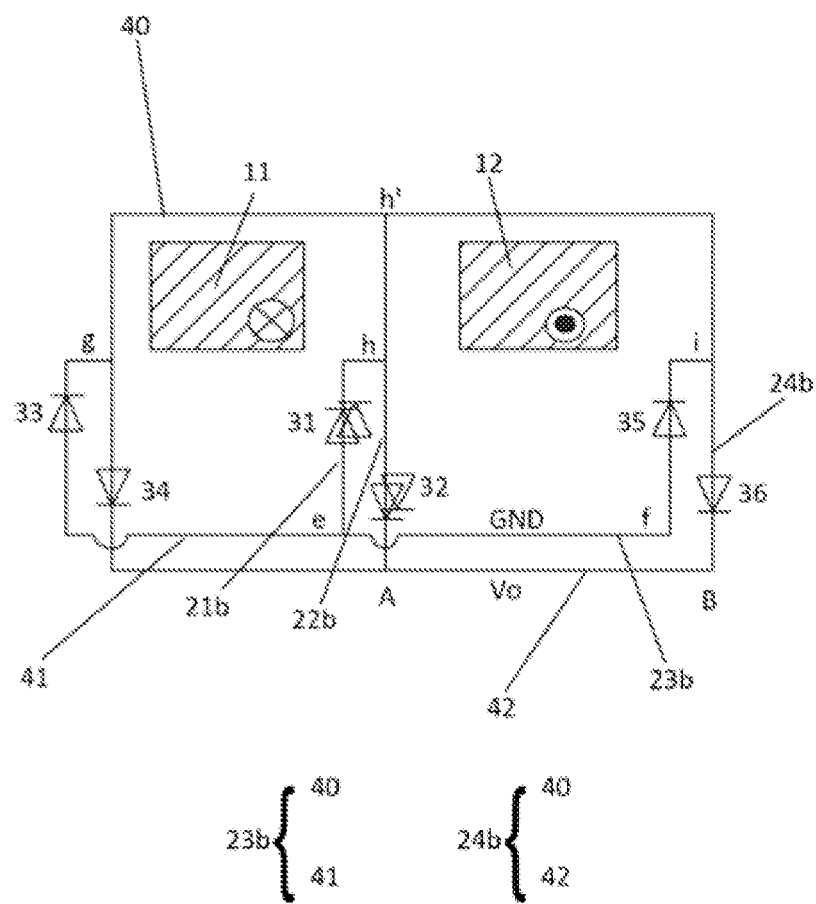
FIG. 2A is a structural view of a power supply module in a second embodiment of the disclosure.

Referring to FIG. 2A, FIG. 2A is a structural view of a power supply module in a second embodiment of the disclosure, and the power supply module is similar with the power supply module shown in the first embodiment. The rectifier circuit of the power supply module is a full bridge rectifier circuit, and the rectifier circuit further includes a fifth rectifier component 35 and a sixth rectifier component 36. To describe conveniently, partial windings disposed on outside of the first magnetic column 11 and the second magnetic column 12 are defined as outer conductors. The outer conductor includes a first outer conductor 40, a second outer conductor 41 and a third outer conductor 42. The first outer conductor 40 is formed by electrically connecting the first winding S1 surrounding an upper surface of the first magnetic column 11 and the second winding S2 surrounding an upper surface of the second magnetic column 12 sequentially. The second outer conductor 41 is formed by electrically connecting the first winding S1 surrounding a lower surface of the first magnetic column 11 and the second winding S2 surrounding a lower surface of the second magnetic column 12 sequentially. The third outer conductor 42 is also formed by electrically connecting the first winding S1 surrounding the lower surface of the first magnetic column 11 and the second winding S2 surrounding the lower surface of the second magnetic column 12 sequentially. The second outer conductor 41 is electrically connected to a negative output terminal GND of the power supply module, and the third outer conductor 42 is electrically connected to a positive output terminal Vo of the power supply module. The first outer conductor 40, the second outer conductor 41 and the third outer conductor 42 are electrically connected. Specifically, the first outer conductor 40 and the second outer conductor 41 are electrically connected to form a first annular winding portion 23b, and the first outer conductor 40 and the third outer conductor 42 are electrically connected to form a second annular winding portion 24b. To describe more conveniently, the outer conductors are provided with terminals. Terminals g and i are two terminals of the first outer conductor 40, which are located on outside of the first magnetic column 11 and the second magnetic column 12, respectively. Two terminals of the second outer conductor 41 and two terminals of the third outer conductor 42 are eclectically connected to the two terminals of the first outer conductor 40 (such as, the terminals g and i).

In this embodiment, a first shared winding portion 21b (such as, a section eh' of the winding) and a second shared winding portion 22b (such as, a section Ah' of the winding) are between the first magnetic column 11 and the second magnetic column 12, and the first shared winding portion 21b and the second shared winding portion 22b have a reuse shared winding portion (such as, a section hh' of the winding). The first shared winding portion 21b has one end (such as, terminal h') is electrically connected to the first outer conductor 40, and the other end (such as, terminal e) is electrically connected to the second outer conductor 41, and the second shared winding portion 22b has one end (such as, terminal h') is electrically connected to the first outer conductor 40, and the other end (such as, terminal A) is electrically connected to the third outer conductor 42.

In this embodiment, the third rectifier component 33 is connected in series to a section of the second outer conductor 41 surrounding the first magnetic column 11, the fourth rectifier component 34 is connected in series to a section of the third outer conductor 42 surrounding the first magnetic column 11, the first rectifier component 31 is connected in series to the first shared winding portion 21b, the second rectifier component 32 is connected in series to the second shared winding portion 22b, the fifth rectifier component 35 is connected in series to a section of the second outer conductor 41 surrounding the second magnetic column 12 (such as, a section if of the winding), and the sixth rectifier component 36 is connected in series to a section of the third outer conductor 42 surrounding the second magnetic column 12 (such as, a section iB of the winding). The rectifier circuit reuses the first rectifier component 31 and the second rectifier component 32. Positive electrodes of the first rectifier component 31, the third rectifier component 33 and the fifth rectifier component 35 are electrically connected to a negative output terminal GND of the power supply module, and negative electrodes of the second rectifier component 32, the fourth rectifier component 34 and the sixth rectifier component 36 are electrically connected to a positive output terminal Vo of the power supply module. A negative electrode of the first rectifier component 31 is electrically connected to a node h, a negative electrode of the third rectifier component 33 is electrically connected to the terminal g of the first outer conductor 40, and a negative electrode of the fifth rectifier component 35 is electrically connected to the terminal i of the first outer conductor 40. A positive electrode of the second rectifier component 32 is electrically connected to the node h, a positive electrode of the fourth rectifier component 34 is electrically connected to the terminal g of the first outer conductor 40, and a positive electrode of the sixth rectifier component 36 is electrically connected to the terminal i of the first outer conductor 40.

In this embodiment, the first rectifier component 31 and the second rectifier component 32 are located below the first magnetic column 11 and the second magnetic column 12, and the third rectifier component 33, the fourth rectifier component 34, the fifth rectifier component 35 and the sixth rectifier component 36 are also located below the first magnetic column 11 and the second magnetic column 12. The first rectifier component 31 and the second rectifier component 32 can use the same switch as the third rectifier component 33 or the fourth rectifier component 34, for example, two switches connected in parallel, or one switch that has a current capability twice of the third rectifier component 33 or the fourth rectifier component 34. The third rectifier component 33, the fourth rectifier component 34, the fifth rectifier component 35 and the sixth rectifier component 36 each has one switch, the switch maybe power device or maybe diode, but the disclosure is not limited thereto.

Figure 2B:
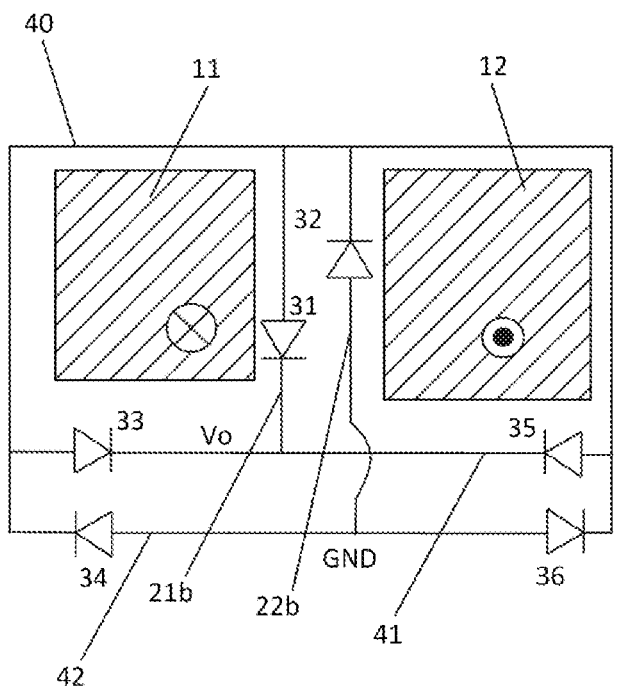
FIG. 2B is a schematic view (I) of arrangement of rectifier components of a power supply module modified on the basis of the second embodiment of the disclosure.

Referring to FIG. 2B, FIG. 2B is a schematic view (I) of arrangement of rectifier components of a power supply module modified on the basis of the second embodiment of the disclosure. The power supply module shown in FIG. 2B has similar arrangement of rectifier components as the power supply module shown in FIG. 2A, and the main differences are that each of the first rectifier component 31 and the second rectifier component 32 has one switch (such as MOS or diode) only, and the first shared winding portion 21b and the second shared winding portion 22b do not have a reuse shared winding portion. The first rectifier component 31 and the second rectifier component 32 are located between the first magnetic column 11 and the second magnetic column 12, and the third rectifier component 33, the fourth rectifier component 34, the fifth rectifier component 35 and the sixth rectifier component 36 are located below the first magnetic column 11 and the second magnetic column 12. Negative electrodes of the first rectifier component 31, the third rectifier component 33 and the fifth rectifier component 35 are electrically connected to a positive output terminal Vo of the power supply module, and positive electrodes of the first rectifier component 31, the third rectifier component 33 and the fifth rectifier component 35 are electrically connected to the first outer conductor 40. Positive electrodes of the second rectifier component 32, the fourth rectifier component 34 and the sixth rectifier component 36 are electrically connected to a negative output terminal GND of the power supply module, and negative electrodes of the second rectifier component 32, the fourth rectifier component 34 and the sixth rectifier component 36 are electrically connected to the first outer conductor 40. In this embodiment, the rectifier circuit reuses the first rectifier component 31 and the second rectifier component 32.

Figure 2C:
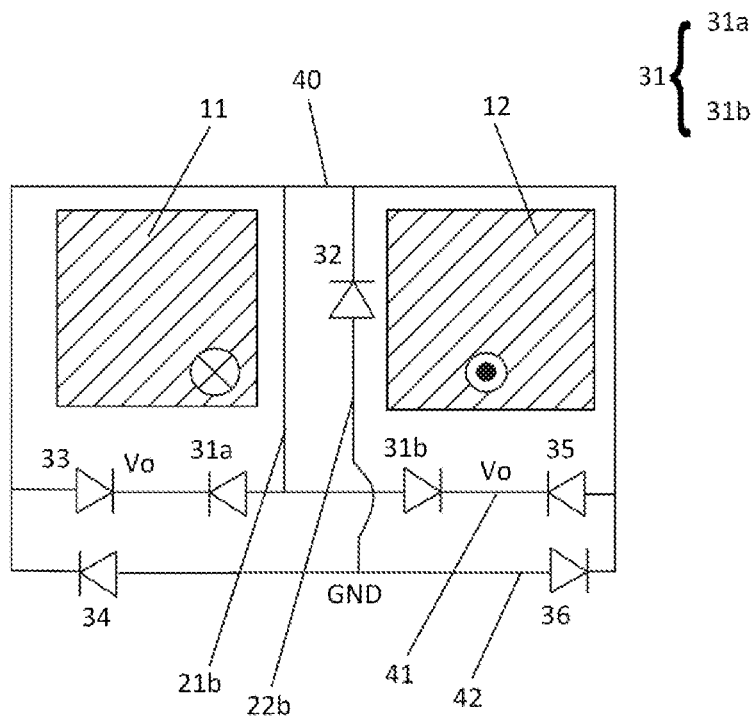
FIG. 2C is a schematic view (II) of arrangement of rectifier components of the power supply module modified on the basis of the second embodiment of the disclosure.

Referring to FIG. 2C, FIG. 2C is a schematic view (II) of arrangement of rectifier components of the power supply module modified on the basis of the second embodiment of the disclosure. The power supply module shown in FIG. 2C has similar arrangement of rectifier components as the power supply module shown in FIG. 2B, and the main differences are that the first rectifier component 31 is not connected in series to the first shared winding portion 21b between the first magnetic column 11 and the second magnetic column 12, the first rectifier component 31 includes two rectifier components 31a and 31b, one rectifier component 31a is connected in series to a section of the second outer conductor 41 surrounding the first magnetic column 11, and the other rectifier component 31b is connected in series to a section of the second outer conductor 41 surrounding the second magnetic column 12. In this embodiment, the second outer conductor 41 is electrically connected to a positive output terminal Vo of the power supply module, and the third outer conductor 42 is electrically connected to a negative output terminal GND of the power supply module. The first rectifier component 31 (31a, 31b), the third rectifier component 33 and the fifth rectifier component 35 are connected in series to the second outer conductor 41, a negative electrode of the first rectifier component 31 (31a, 31b) is electrically connected to the positive output terminal Vo of the power supply module, a positive electrode of the first rectifier component 31 (31a, 31b) is electrically connected to the first shared winding portion 21b, and negative electrodes of the third rectifier component 33 and the fifth rectifier component 35 are electrically connected to the positive output terminal Vo of the power supply module. The fourth rectifier component 34 and the sixth rectifier component 36 are connected in series to the third outer conductor 42a, and positive electrodes of the fourth rectifier component 34 and the sixth rectifier component 36 are electrically connected to the negative output terminal GND of the power supply module. The second rectifier component 32 is located between the first magnetic column 11 and the second magnetic column 12, and the first rectifier component 31, the third rectifier component 33, the fourth rectifier component 34, the fifth rectifier component 35 and the sixth rectifier component 36 are located below the first magnetic column 11 and the second magnetic column 12. In this embodiment, the rectifier circuit only reuses the second rectifier component 32.

Figure 2D:
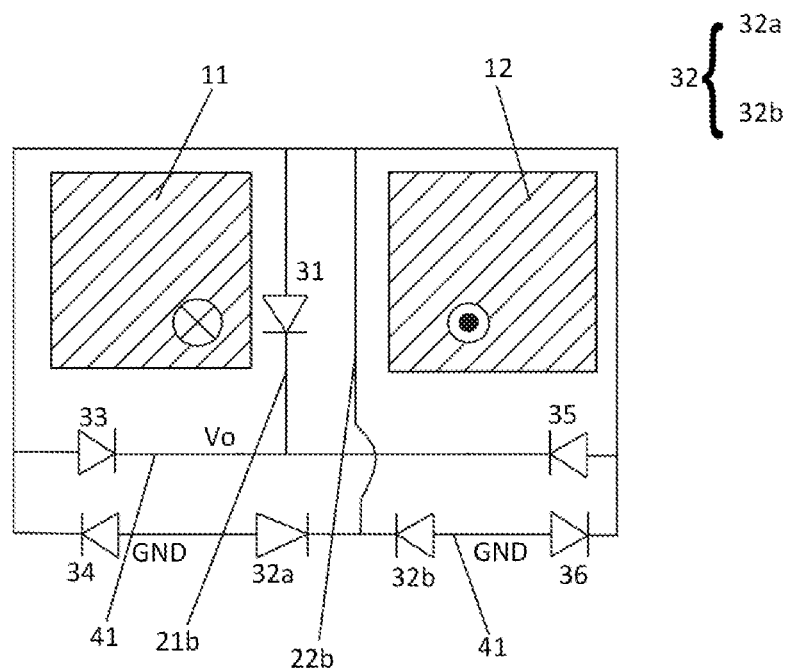
FIG. 2D is a schematic view (III) of arrangement of rectifier components of the power supply module modified on the basis of the second embodiment of the disclosure.

Referring to FIG. 2D, FIG. 2D is a schematic view (III) of arrangement of rectifier components of the power supply module modified on the basis of the second embodiment of the disclosure. The power supply module shown in FIG. 2D has similar arrangement of rectifier components as the power supply module shown in FIG. 2B, and the main differences are that the second rectifier component 32 is not connected in series to the second shared winding portion 22b between the first magnetic column 11 and the second magnetic column 12, the second rectifier component 32 has two rectifier components 32a and 32b, one rectifier component 32a is connected in series to a section of the third outer conductor 42 surrounding the first magnetic column 11, and the other rectifier component 32b is connected in series to a section of the third outer conductor 42 surrounding the second magnetic column 12. In this embodiment, the second rectifier component 32 (32a, 32b), the fourth rectifier component 34 and the sixth rectifier component 36 are connected in series to the third outer conductor 42, a negative electrode of the second rectifier component 32 (32a, 32b) is electrically connected to the second shared winding portion 22b, a positive electrode of the second rectifier component 32 (32a, 312b) is electrically connected to a negative output terminal GND of the power supply module, and positive electrodes of the fourth rectifier component 34 and the sixth rectifier component 36 are electrically connected to a negative output terminal GND of the power supply module. The first rectifier component 31 is located between the first magnetic column 11 and the second magnetic column 12, and the second rectifier component 32, the third rectifier component 33, the fourth rectifier component 34, the fifth rectifier component 35 and the sixth rectifier component 36 are located below the first magnetic column 11 and the second magnetic column 12. In this embodiment, the rectifier circuit only reuses the first rectifier component 31.

Figure 2E:
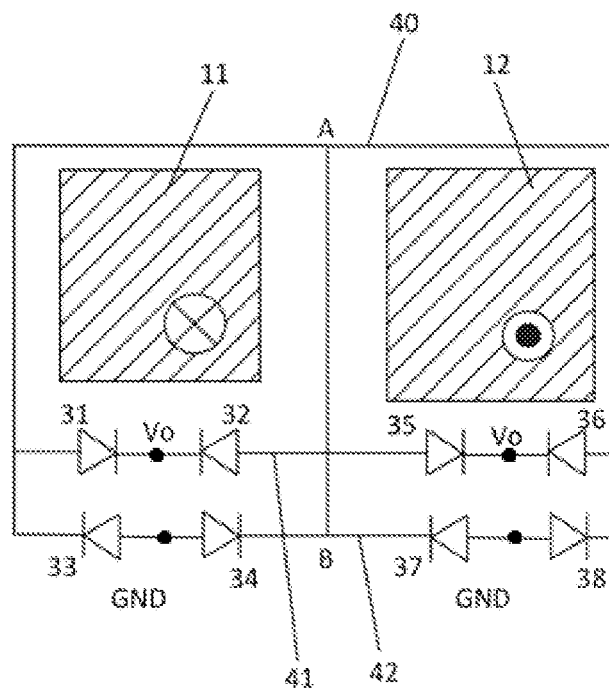
FIG. 2E is a schematic view (IV) of arrangement of rectifier components of the power supply module modified on the basis of the second embodiment of the disclosure.

Referring to FIG. 2E, FIG. 2E is a schematic view (IV) of arrangement of rectifier components of the power supply module modified on the basis of the second embodiment of the disclosure. The power supply module shown in FIG. 2E has similar arrangement of rectifier components as the power supply module shown in FIG. 2B, and the main differences are that in addition to the first rectifier component 31, the second rectifier component 32, the third rectifier component 33 and the fourth rectifier component 34 electrically connected as a full bridge rectifier circuit, the rectifier circuit further includes a fifth rectifier component 35, a sixth rectifier component 36, a seventh rectifier component 37 and an eighth rectifier component 38 electrically connected to form an additional full bridge rectifier circuit, and the power supply module has two full bridge rectifier circuits. Outer conductors are disposed on outside of the first magnetic column 11 and the second magnetic column 12, and include a first outer conductor 40, a second outer conductor 41 and a third outer conductor 42, the first outer conductor 40 is formed by electrically connecting the first winding S1 surrounding an upper surface of the first magnetic column 11 and the second winding S2 surrounding an upper surface of the second magnetic column 12 sequentially, and the second outer conductor 41 and the third outer conductor 42 are respectively formed by electrically connecting the first winding S1 surrounding a lower surface of the first magnetic column 11 and the second winding S2 surrounding a lower surface of the second magnetic column 12 sequentially.

A reuse shared winding portion is provided between the first magnetic column 11 and the second magnetic column 12, i.e., the first shared winding portion 21a and the second shared winding portion 22a between the first magnetic column 11 and the second magnetic column 12 can be combined to form the reuse shared winding portion, such as, the section AB of the winding. The reuse shared winding portion has one end (such as, point A in the FIG. 2E) electrically connected to the first outer conductor 40, and the other end (such as, point B in the FIG. 2E) electrically connected to the second outer conductor 41 and the third outer conductor 42. The first rectifier component 31 and the second rectifier component 32 are connected in series to a section of the second outer conductor surrounding the first magnetic column 11. The third rectifier component 33 and the fourth rectifier component 34 are connected in series to a section of the third outer conductor 42 surrounding the first magnetic column 11. The fifth rectifier component 35 and the sixth rectifier component 36 are connected in series to a section of the second outer conductor 41 surrounding the second magnetic column 12. The seventh rectifier component 37 and the eighth rectifier component 38 are connected in series to a section of the third outer conductor 42 surrounding the second magnetic column 12. Positive electrodes of the third rectifier component 33, the fourth rectifier component 34, the seventh rectifier component 37 and the eighth rectifier component 38 are electrically connected to a negative output terminal GND of the power supply module, and negative electrodes of the first rectifier component 31, the second rectifier component 32, the fifth rectifier component 35 and the sixth rectifier component 36 are electrically connected to a positive output terminal Vo of the power supply module. In this embodiment, the rectifier circuit does not reuse the rectifier components.

Figure 3A:
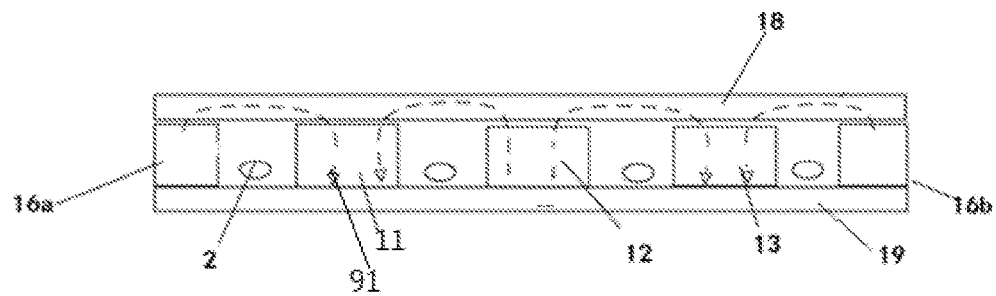
FIG. 3A is a schematic view of arrangement of magnetic columns of a power supply module in a third embodiment of the disclosure.
Figure 3B:
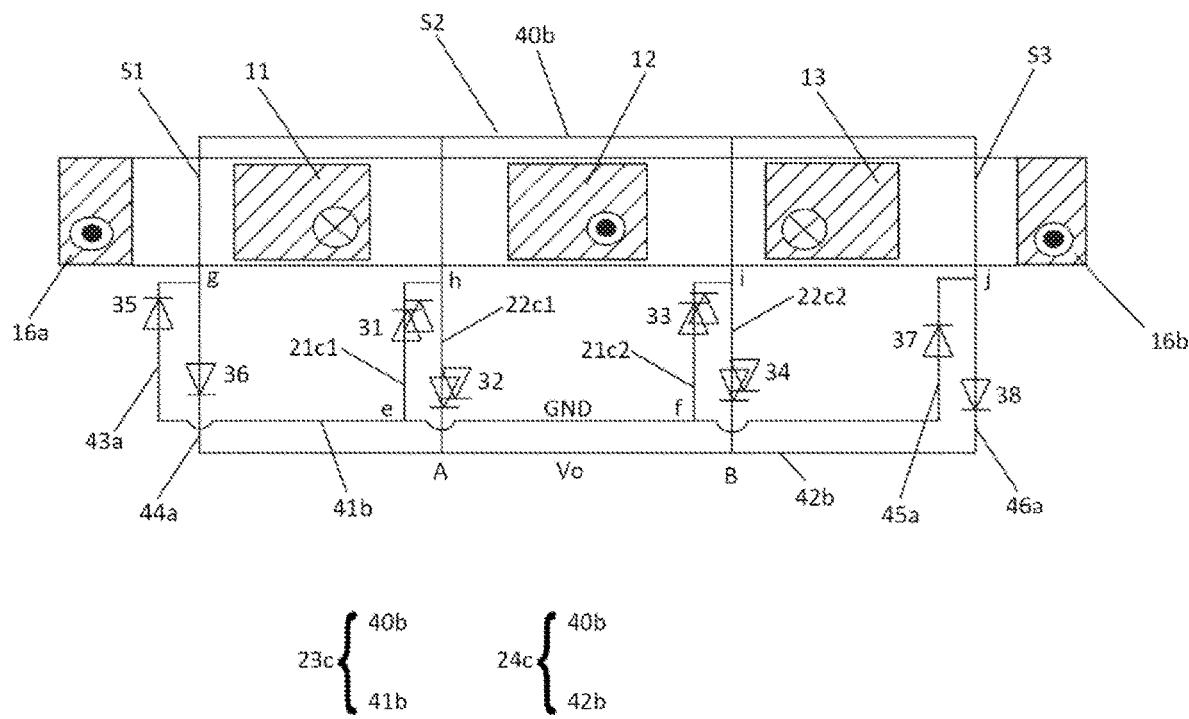
FIG. 3B is a structural view of the power supply module in the third embodiment of the disclosure.
Figure 3C:
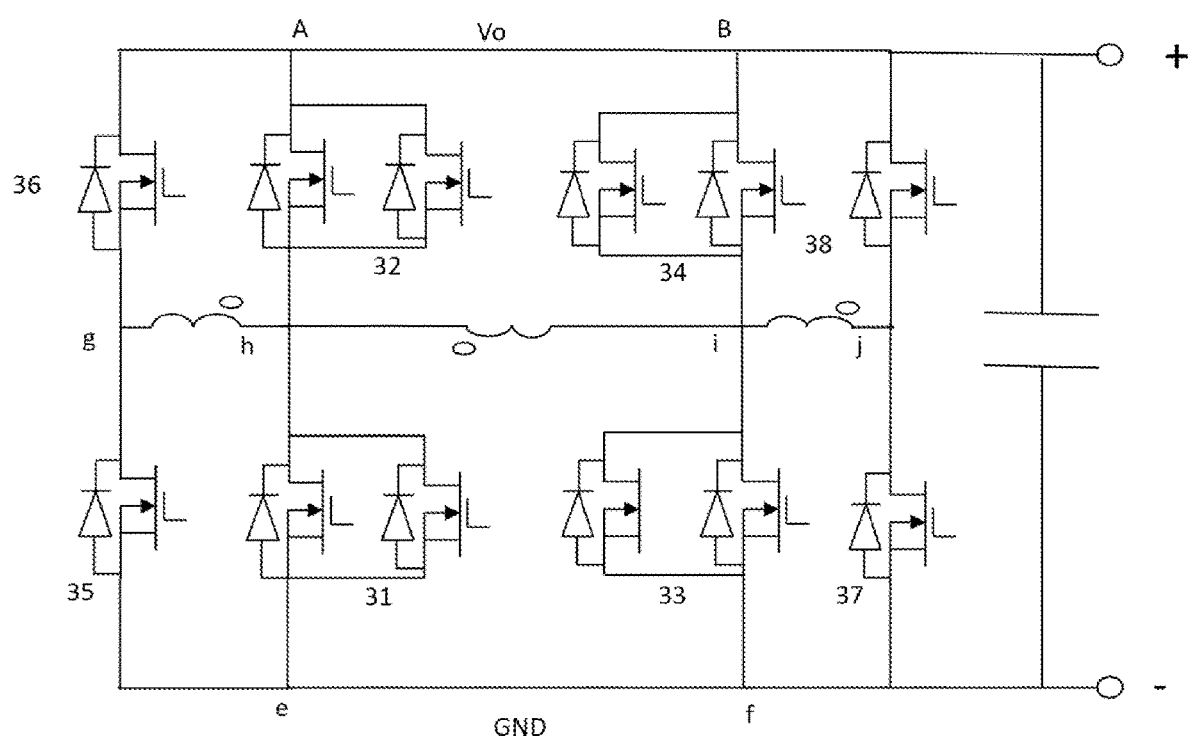
FIG. 3C is a circuit view of the power supply module in the third embodiment of the disclosure.

Referring to FIGS. 3A to 3C, FIG. 3A is a schematic view of arrangement of magnetic columns of a power supply module in a third embodiment of the disclosure, FIG. 3B is a structural view of the power supply module in the third embodiment of the disclosure, and FIG. 3C is a circuit principle view of the power supply module in the third embodiment of the disclosure. The power supply module is similar with the power supply module shown in FIG. 2A, and the main difference is that the transformer further includes a third magnetic column 13 and a third winding S3 wound onto the third magnetic column 13. The first magnetic column 11, the second magnetic column 12 and the third magnetic column 13 are linearly arranged in sequence, magnetic fluxes of the adjacent magnetic columns have opposite directions, and the third magnetic column 13 is connected between the first cover plate 18 and the second cover plate 19. The plurality of windings 2 in the FIG. 3A are disposed between the magnetic columns, respectively.

As shown in FIGS. 3A and 3B, the magnetic core further includes a first magnetic side column 16a and a second magnetic side column 16b. The first magnetic side column 16a is disposed on outside (such as a left side) of the first magnetic column 11, the second magnetic column 12 and the third magnetic column 13, and a second magnetic side column 16b is disposed on outside (such as a right side) of the first magnetic column 11, the second magnetic column 12 and the third magnetic column 13, the first magnetic side column 16a and the second magnetic side column 16b are connected between the first cover plate 18 and the second cover plate 19, and magnetic fluxes in the first magnetic side column 16a and the second magnetic side column 16b are a half of magnetic flux of the first magnetic column 11, the second magnetic column 12 or the third magnetic column 13. The magnetic fluxes of the first magnetic column 11, the second magnetic column 12 or the third magnetic column 13 are the same, and the magnetic fluxes in the adjacent magnetic columns have opposite directions.

In this embodiment, outer conductors are disposed on the outside of the first magnetic column 11, the second magnetic column 12 and the third magnetic column 13, and includes a first outer conductor 40b, a second outer conductor 41b and a third outer conductor 42b, the first outer conductor 40b is formed by electrically connecting the first winding S1 surrounding an upper surface of the first magnetic column 11, the second winding S2 surrounding an upper surface of the second magnetic column 12 and the third winding S3 surrounding an upper surface of the third magnetic column 13 sequentially, and each of the second outer conductor 41b and the third outer conductor 42b is formed by electrically connecting the first winding S1 surrounding a lower surface of the first magnetic column 11, the second winding S2 surrounding a lower surface of the second magnetic column 12 and the third winding S3 surrounding a lower surface of the third magnetic column 13 sequentially. That is, the first outer conductor 40b and the second outer conductor 41b are electrically connected to form a first annular winding portion 23c, and the first outer conductor 40b and the third outer conductor 42b are electrically connected to form a second annular winding portion 24c.

A first inner conductor 43a and a second inner conductor 44a are located between the first magnetic side column 16a and the first magnetic column 11, a third inner conductor 45a and a fourth inner conductor 46a are located between the second magnetic side column 16b and the third magnetic column 13, a first shared winding portion 21c1 and a second shared winding portion 22c1 are located between the first magnetic column 11 and the second magnetic column 12, and a third shared winding portion 21c2 and a fourth shared winding portion 22c2 are located between the second magnetic column 12 and the third magnetic column 13.

The first inner conductor 43a, the first shared winding portion 21c1, the third shared winding portion 21c2 and the third inner conductor 45a are electrically connected to the first outer conductor 40b at one end, and the first inner conductor 43a, the first shared winding portion 21c1, the third shared winding portion 21c2 and the third inner conductor 45a are electrically connected to the second outer conductor 41b at the other end. The second inner conductor 44a, the second shared winding portion 22c1, the fourth shared winding portion 22c2 and the fourth inner conductor 46a are electrically connected to the first outer conductor 40b at one end, and the second inner conductor 44a, the second shared winding portion 22c1, the fourth shared winding portion 22c2 and the fourth inner conductor 46a are electrically connected to the third outer conductor 42b at the other end.

In this embodiment, the rectifier circuit includes a first rectifier component 31, a second rectifier component 32, a third rectifier component 33, a fourth rectifier component 34, a fifth rectifier component 35, a sixth rectifier component 36, a seventh rectifier component 37 and an eighth rectifier component 38. The fifth rectifier component 35 is connected in series to the first inner conductor 43a, the sixth rectifier component 36 is connected in series to the second inner conductor 44a, the first rectifier component 31 is connected in series to the first shared winding portion 22c1, the second rectifier component 32 is connected in series to the second shared winding portion 22c1, the third rectifier component 33 is connected in series to the third shared winding portion 21c2, the fourth rectifier component 34 is connected in series to the fourth shared winding portion 22c2, the seventh rectifier component 37 is connected in series to the third inner conductor 45a, and the eighth rectifier component 38 is connected in series to the fourth inner conductor 46a. Positive electrodes of the first rectifier component 31, the third rectifier component 33, the fifth rectifier component 35 and the seventh rectifier component 37 are electrically connected to a negative output terminal GND of the power supply module, and negative electrodes of the second rectifier component 32, the fourth rectifier component 34, the sixth rectifier component 36 and the eighth rectifier component 38 are electrically connected to a positive output terminal Vo of the power supply module.

In this embodiment, the first rectifier component 31, the second rectifier component 32, the third rectifier component 33 and the fourth rectifier component 34 can be provided with two switches connected in parallel, and the fifth rectifier component 35, the sixth rectifier component 36, the seventh rectifier component 37 and the eighth rectifier component 38 can be provided with one switch, such that in the case of using the same type of switches, each switch can bear the same current load, but the disclosure is not limited thereto.

A dotted arrow 91 in FIG. 3A illustrates that when the first magnetic side column 16a and the second magnetic side column 16b are arranged, magnetic fluxes in the first magnetic column 11 to the third magnetic column 13 can be balanced. In this embodiment, the power supply module has a three-phase full bridge rectifier circuit, an output voltage of the three-phase full bridge rectifier circuit can be the same to facilitate parallel output of three phases, and the magnetic path is shunted by the first magnetic side column 16a and the second magnetic side column 16b on left and right sides, such that distribution of the magnetic fluxes are more balanced, thereby reducing loss of the magnetic core, and improving efficiency of the power supply module.

Figure 4A:
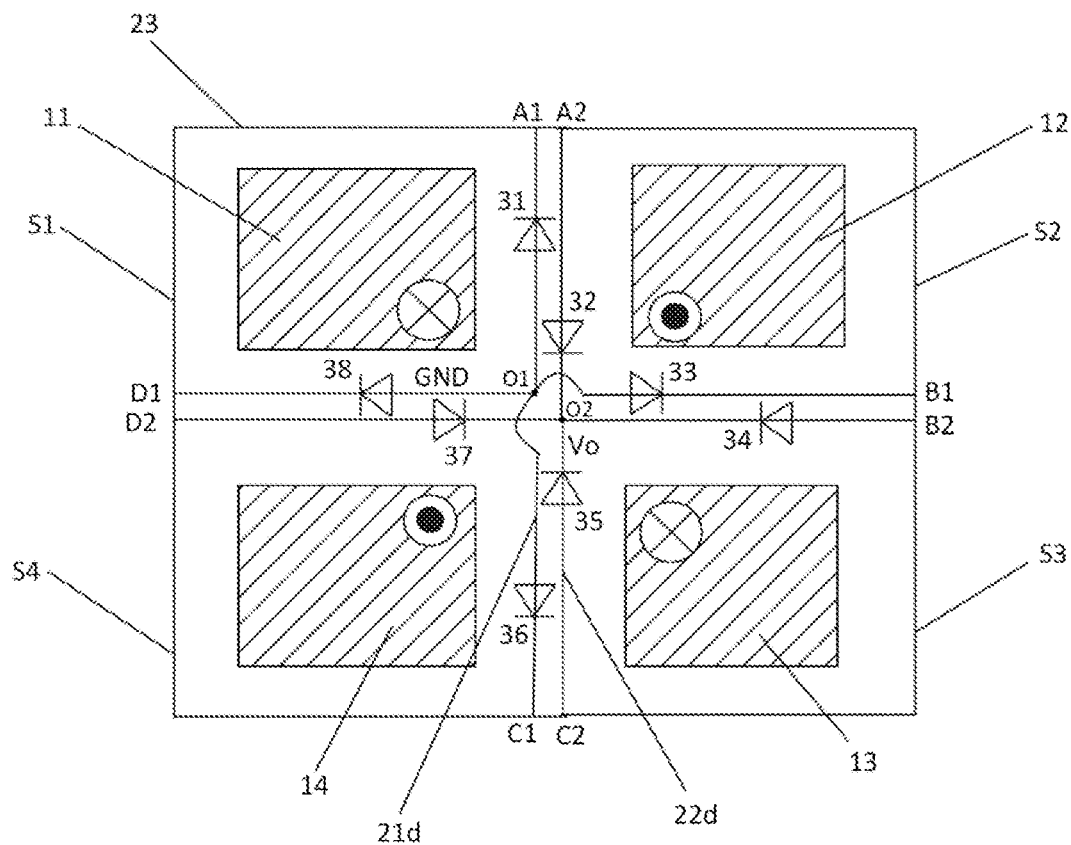
FIG. 4A is a structural view (I) of a power supply module in a fourth embodiment of the disclosure.
Figure 4B:
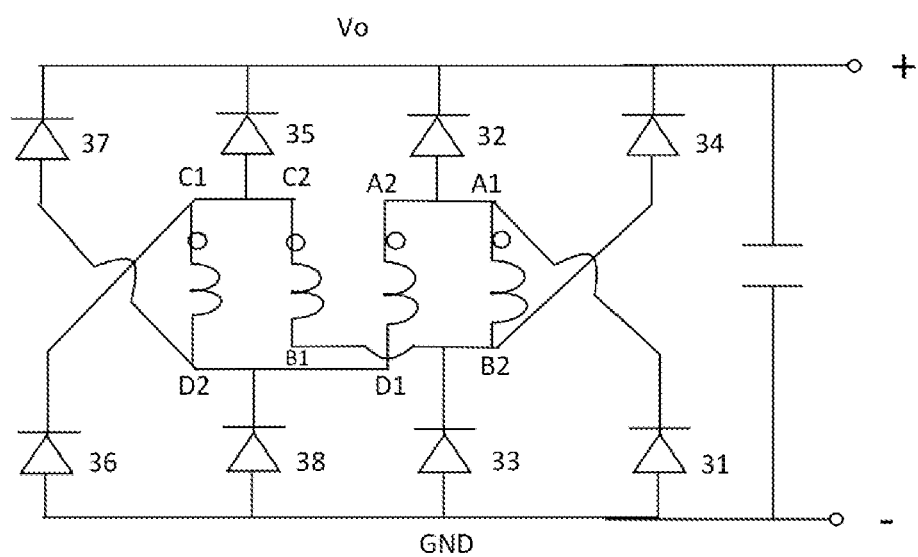
FIG. 4B is a circuit view of the power supply module in the fourth embodiment of the disclosure.
Figure 4C:
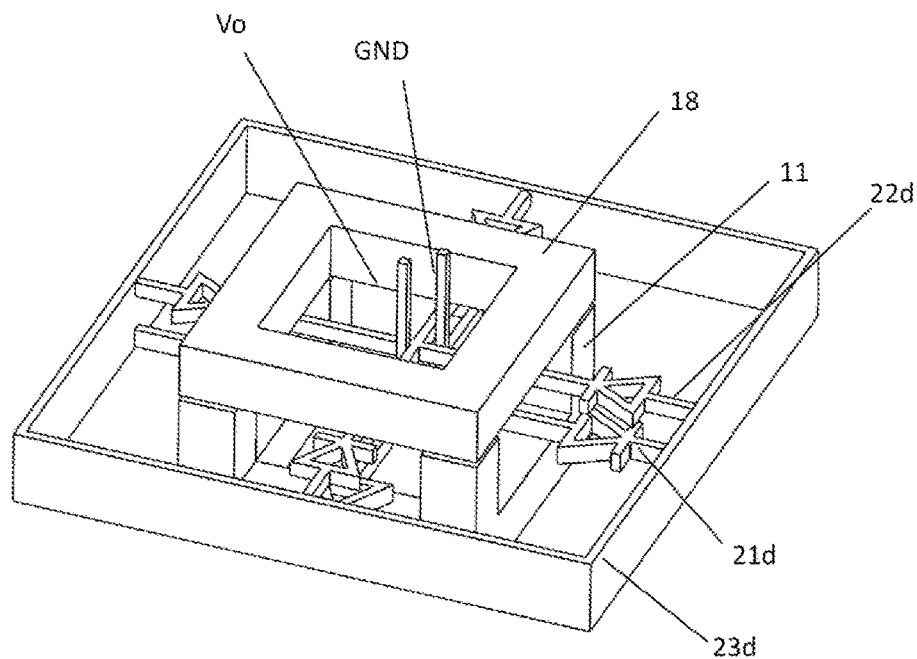
FIG. 4C is a perspective structural view of the power supply module in the fourth embodiment of the disclosure.

Referring to FIGS. 4A to 4C, FIG. 4A is a structural view (I) of a power supply module in a fourth embodiment of the disclosure, FIG. 4B is a corresponding circuit view of the power supply module in the fourth embodiment of the disclosure, and FIG. 4C is a perspective structural view of the power supply module in the fourth embodiment of the disclosure. As shown in FIG. 4A, the rectifier circuit of the power supply module is a full bridge rectifier circuit, and the transformer of the power supply module includes four magnetic columns, which are a first magnetic column 11, a second magnetic column 12, a third magnetic column 13 and a fourth magnetic column 14, respectively, and four windings, which are a first winding S1 wound onto the first magnetic column 11, a second winding S2 wound onto the second magnetic column 12, a third winding S3 wound onto the third magnetic column 13, and a fourth winding S4 wound onto the fourth magnetic column 14, respectively. The four magnetic columns are arranged in an array, i.e., the first magnetic column 11, the second magnetic column 12, the third magnetic column 13 and the fourth magnetic column 14 are arranged in an array 2×2, magnetic fluxes of the adjacent magnetic columns have opposite directions, and the first magnetic column 11, the second magnetic column 12, the third magnetic column 13 and the fourth magnetic column 14 are connected between the first cover plate 18 and the second cover plate 19.

The part of the first winding S1, the part of the second winding S2, the part of the third winding S3, and the part of the fourth winding S4 disposed on outside of the first magnetic column 11, the second magnetic column 12, the third magnetic column 13 and the fourth magnetic column 14 are electrically connected sequentially to form a first annular winding portion 23, the windings between the adjacent magnetic columns form the first shared winding portions and the second shared winding portions, the first shared winding portions are electrically connected to form a first cross-shaped winding portion 21d, the second shared winding portions are electrically connected to form a second cross-shaped winding portion 22d, the first cross-shaped winding portion 21d has one node O1 and four terminals A1, B1, C1 and D1, and the second cross-shaped winding portion 22d has one node O2 and four terminals A2, B2, C2 and D2.

Four rectifier components (such as, the rectifier components 31, 33, 36 and 38) of the first rectifier component 31, the second rectifier component 32, the third rectifier component 33, the fourth rectifier component 34, the fifth rectifier component 35, the sixth rectifier component 36, the seventh rectifier component 37 and the eighth rectifier component 38 are respectively connected in series to the first shared winding portions between each the adjacent magnetic columns, positive electrodes of the four rectifier components are electrically connected to the node O1 of the first cross-shaped winding portion 21d, another four rectifier components (such as, the rectifier components 32, 34, 35 and 37) are respectively connected in series to the second shared winding portions between each the adjacent magnetic columns, and negative electrodes of another four rectifier components are electrically connected to the node O2 of the second cross-shaped winding portion 22d.

In some embodiments, the four terminals (such as, the terminals A1, B1, C1 and D1) of the first cross-shaped winding portion 21d and the four terminals (such as, the terminals A2, B2, C2 and D2) of the second cross-shaped winding portion 22d are electrically connected to the first annular winding portion 23d. The node O1 of the first cross-shaped winding portion 21d is electrically connected to a negative output terminal GND of the power supply module, and the node O2 of the second cross-shaped winding portion 22d is electrically connected to a positive output terminal Vo of the power supply module.

As shown in FIG. 4B, four full bridge rectifier circuits in the power supply module are connected in parallel, and eight rectifier components 31 to 38 are reused. As compared to the traditional four full bridge rectifier circuits, the number of rectifier components can be reduced by half, and types of electrodes between the magnetic columns also can be reduced by half, so structure is largely simplified. Moreover, reuse of the magnetic circuit of the cover plates (not shown) of the magnetic core, reuse of the windings between the respective magnetic columns and reuse of the rectifier components are realized, which facilitates improving efficiency of the power supply module. Furthermore, the structure is balanced symmetrically, and is more suitable for disclosure of stacked power supply modules.

As shown in FIG. 4C, in the power supply module, a window is provided at center of the first cover plate 18 or the second cover plate 19, lead wires electrically connected to the node O1 of the first cross-shaped winding portion 21d and the node O2 of the second cross-shaped winding portion 22d are lead out from the window, such that a negative output terminal GND of the power supply module and a positive output terminal Vo of the power supply module can be lead out from the window effectively and conveniently. Moreover, the structure is compact, and the circuits are symmetrical, which facilitates improving a power density and efficiency of the power supply module, and facilitates realizing structure of vertically stacked power supply modules.

Figure 4D:
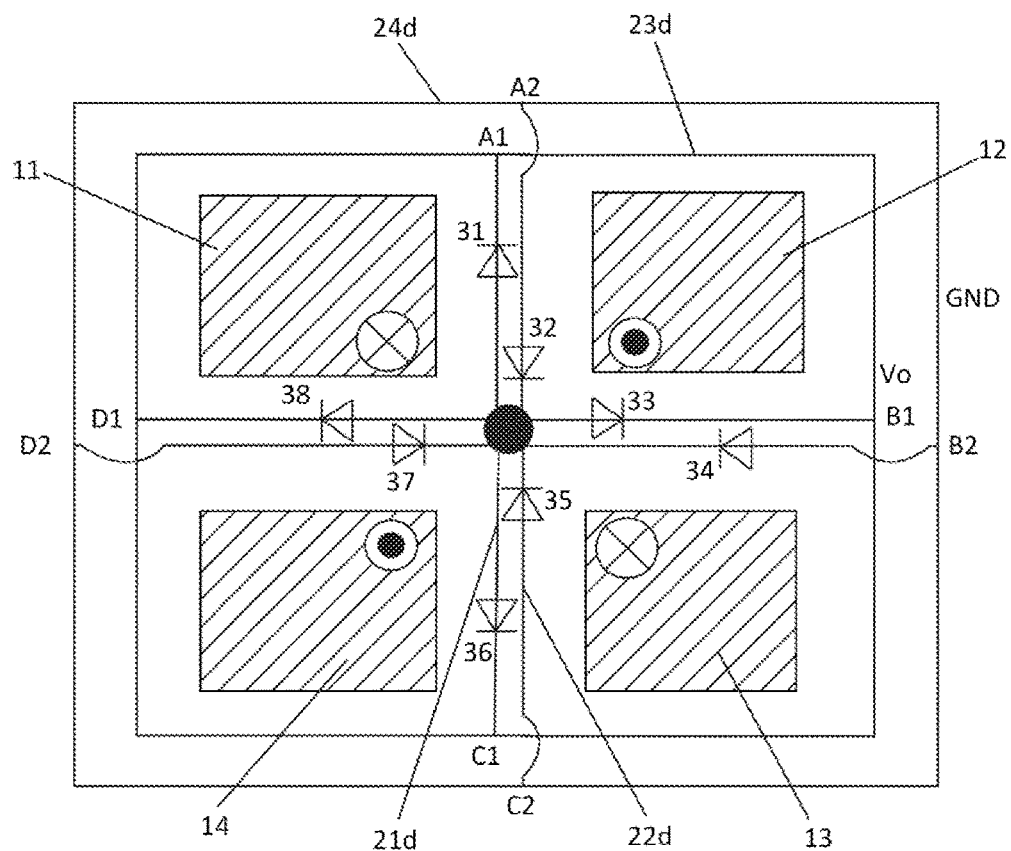
FIG. 4D is a structural view (II) of the power supply module in the fourth embodiment of the disclosure.

Referring to FIG. 4D, FIG. 4D is a structural view (II) of the power supply module in the fourth embodiment of the disclosure. The power supply module has a similar structure as the power supply module shown in FIG. 4A, and the main difference is that in this embodiment, the winding further includes a second annular winding portion 24d surrounding the first magnetic column 11, the second magnetic column 12, the third magnetic column 13 and the fourth magnetic column 14. The four terminals A1, B1, C1 and D1 of the first cross-shaped winding portion 21d are electrically connected to the first annular winding portion 23d, and the four terminals A2, B2, C2 and D2 of the second cross-shaped winding portion 22d are electrically connected to the second annular winding portion 24d. The node O1 of the first cross-shaped winding portion 21d is electrically connected to the node O2 of the second cross-shaped winding portion 22d. The first annular winding portion 23d is electrically connected to a positive output terminal Vo of the power supply module, and the second annular winding portion 24d is electrically connected to a negative output terminal GND of the power supply module, such that the positive output terminal Vo and the negative output terminal GND of the power supply module can be lead out conveniently.

Figure 5A:
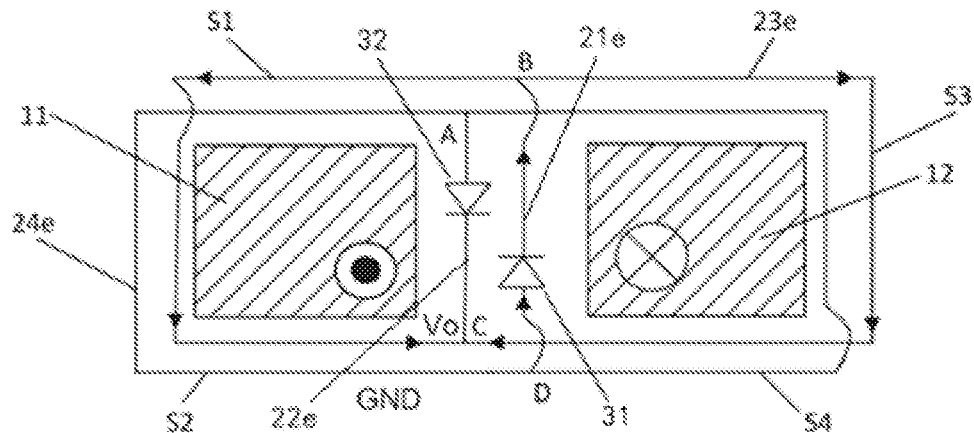
FIG. 5A is a structural view of a power supply module in a fifth embodiment of the disclosure.
Figure 5B:
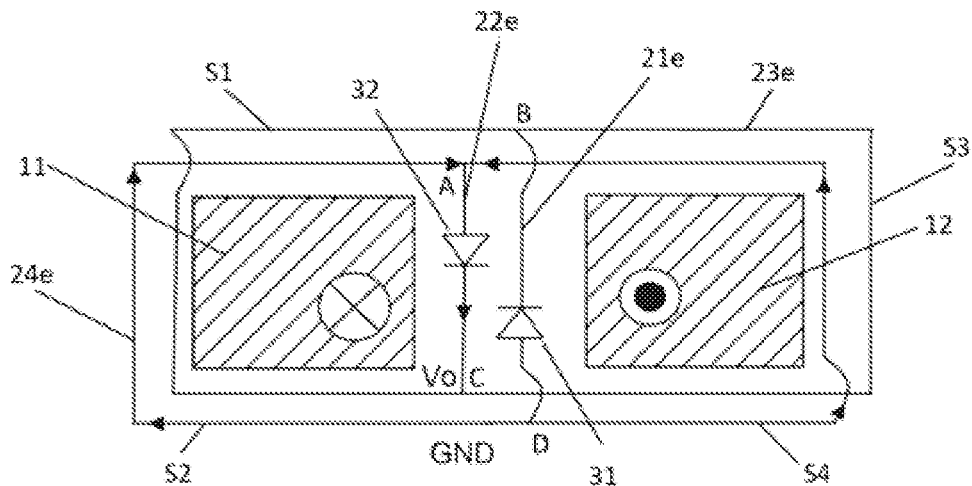
FIG. 5B is another structural view of the power supply module in FIG. 5A.
Figure 5C:
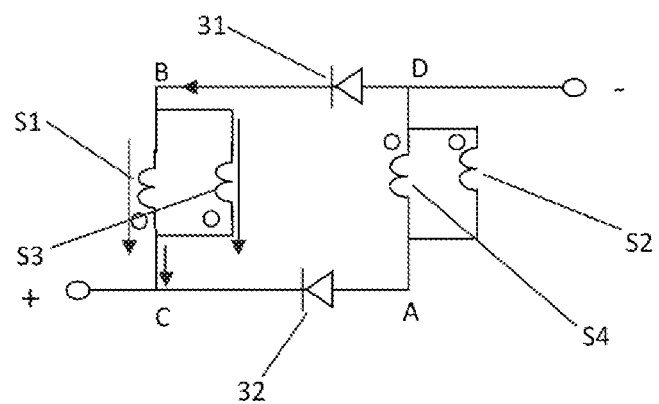
FIG. 5C is a circuit view of the power supply module in the fifth embodiment of the disclosure.
Figure 5D:
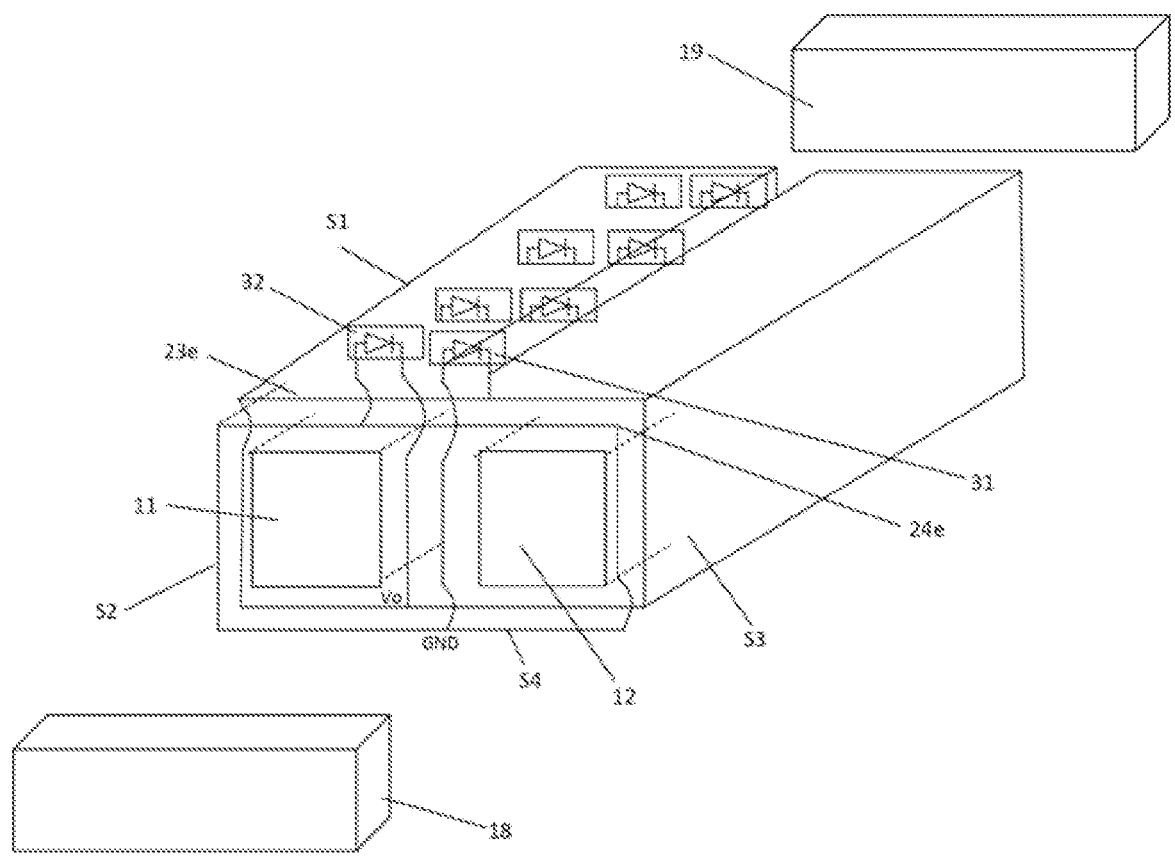
FIG. 5D is a perspective structural view of the power supply module in the fifth embodiment of the disclosure.

Referring to FIGS. 5A to 5D, FIG. 5A is a structural view of a power supply module in a fifth embodiment of the disclosure, FIG. 5B is another structural view of the power supply module in FIG. 5A, FIG. 5C is a circuit view of the power supply module in the fifth embodiment of the disclosure, and FIG. 5D is a perspective structural view of the power supply module in the fifth embodiment of the disclosure.

As shown in FIGS. 5A to 5D, the power supply module includes a transformer and a rectifier circuit, and the rectifier circuit is a half-bridge full-wave rectifier circuit. The transformer includes a magnetic core and a winding, and the rectifier circuit is electrically connected to the winding of the transformer. The magnetic core further includes a first cover plate 18, a second cover plate 19 opposite to the first cover plate 18, a first magnetic column 11, and a second magnetic column 12 having a magnetic flux in opposite direction to that of the first magnetic column 11, and the first magnetic column 11 and the second magnetic column 12 are connected between the first cover plate 18 and the second cover plate 19 to form a magnetic loop. The winding includes a first winding S1 wound onto the first magnetic column 11; a third winding S3 wound onto the second magnetic column 12; a second winding S2 wound onto the first magnetic column 11; and a fourth winding S4 wound onto the second magnetic column 12. The first winding S1 and the third winding S3 have a first shared winding portion 21e (such as, a section BD of the winding), the second winding S2 and the fourth winding S4 have a second shared winding portion (such as, a section AC of the winding), at least a part of the first shared winding portion 21e is located between the first magnetic column 11 and the second magnetic column 12, and at least a part of the second shared winding portion 22e is located between the first magnetic column 11 and the second magnetic column 12. The rectifier circuit further includes a plurality of rectifier components including a first rectifier component 31 and a second rectifier component 32 electrically connected to form a half-bridge full-wave rectifier circuit. The winding is reused by disposing the shared winding portion between the magnetic columns, which can reduce types of electrodes of the windings between the magnetic columns, facilitates simplifying structure and manufacturing process of the transformer, and facilitates improving a power density of the power supply module.

In some embodiments, the first winding S1 and the third winding S3 disposed on outside of the first magnetic column 11 and the second magnetic column 12 are electrically connected to form a first annular winding portion 23e, the second winding S2 and the fourth winding S4 disposed on the outside of the first magnetic column 11 and the second magnetic column 12 are electrically connected to form a second annular winding portion 24e, the first shared winding portion 21e has one end (such as, an terminal B) electrically connected to the first annular winding portion 23e, and the other end (such as, an terminal D) electrically connected to the second annular winding portion 24e, and the second shared winding portion 22e has one end (such as, an terminal C) electrically connected to the first annular winding portion 23e, and the other end (such as, an terminal A) electrically connected to the second annular winding portion 24e.

In some embodiments, at least one of the first rectifier component 31 and the second rectifier component 32 is connected in series to the first shared winding portion 21e or the second shared winding portion 22e. The rectifier components are reused by connecting the rectifier component in series to the shared winding portion, which can reduce the number of rectifier components, facilitates subdividing a power level of the power supply module, and is convenient for selecting models of switches in the rectifier components.

As shown in FIGS. 5A to 5B, the first shared winding portion 21e and the second shared winding portion 22e are located between the first magnetic column 11 and the second magnetic column 12. The first rectifier component 31 is connected in series to the first shared winding portion 21e, the second rectifier component 32 is connected in series to the second shared winding portion 22e, the negative electrode of the second rectifier component 32 is electrically connected to a positive output terminal Vo of the power supply module, a positive electrode of the first rectifier component 31 is electrically connected to a negative output terminal GND of the power supply module, and a connection direction from the positive electrode to a negative electrode of the first rectifier component 31 may be opposite to a connection direction from a positive electrode to the negative electrode of the second rectifier component 32. Preferably, the negative output terminal GND of the power supply module and the positive output terminal Vo of the power supply module are on the same side, for example, a lower side position, of the first magnetic column 11 and the second magnetic column 12. The first rectifier component 31 is reused by the first winding S1 and the third winding S3, and the second rectifier component 32 is reused by the second winding S2 and the fourth winding S4. In the case of using the same rectifier components, generally, two half-bridge full-wave rectifier circuits are connected in parallel through interconnection of the positive output terminal Vo and the negative output terminal GND, and can work with at least four rectifier components, and when one power level is improved, at least four rectifier components shall be added. However, the power supply module in this embodiment enables parallel working of two half-bridge full-wave rectifier circuits with only two rectifier components, and when one power level is improved, only two rectifier components shall be added, such that the number of rectifier components can be reduced, the power level steps also can be subdivided further more, and flexibility of selecting models of the rectifier components is also improved.

Hereinafter conditions of currents and magnetic fluxes when the power supply module works are described in details. Referring to FIGS. 5A and 5C, FIG. 5C is a circuit view of the power supply module shown in FIG. 5A. As shown in FIG. 5A, when a magnetic flux in the first magnetic column 11 exits perpendicular to a paper, and a magnetic flux in the second magnetic column 12 enters perpendicular to the paper, a current of the first winding S1 flows along an anticlockwise direction, a current of the third winding S3 flows along a clockwise direction, the second rectifier component 32 is turned off, the first rectifier component 31 is turned on, the current of the first winding S1 flows through the negative output terminal GND of the power supply module, the first rectifier component 31 and the first winding S1 to the positive output terminal Vo of the power supply module, and the current of the third winding S3 flows through the negative output terminal GND of the power supply module, the first rectifier component 31 and the third winding S3 to the positive output terminal Vo of the power supply module.

As shown in FIG. 5B, when a magnetic flux in the first magnetic column 11 enters perpendicular to a paper, and a magnetic flux in the second magnetic column 12 exits perpendicular to the paper, a current of the second winding S2 flows along a clockwise direction, a current of the fourth winding S4 flows along an anticlockwise direction, the second rectifier component 32 is turned on, the first rectifier component 31 is turned off, the current of the second winding S2 flows through the negative output terminal GND of the power supply module, the second winding S2 and the second rectifier component 32 to the positive output terminal Vo of the power supply module, and the current of the fourth winding S4 flows through the negative output terminal GND of the power supply module, the fourth winding S4 and the second rectifier component 32 to the positive output terminal Vo of the power supply module.

As shown in FIGS. 5A to 5B, the first rectifier component 31 and the second rectifier component 32 are located between the first magnetic column 11 and the second magnetic column 12, but the disclosure is not limited thereto. For example, as shown in FIG. 5D, the first rectifier component 31 and the second rectifier component 32 also can be disposed at an upper position of the first magnetic column 11 and the second magnetic column 12, and the structure better facilitates realizing of the process, and also facilitates heat dissipation of the rectifier components. Moreover, in FIG. 5D, the first rectifier component 31 and the second rectifier component 32 each has a plurality of switches connected in parallel, which can realize connection and distribution between the windings and the rectifier components, better facilitates reducing connection impedance between the windings and the rectifier components, and facilitates improving efficiency of the power supply module.

Figure 5E:
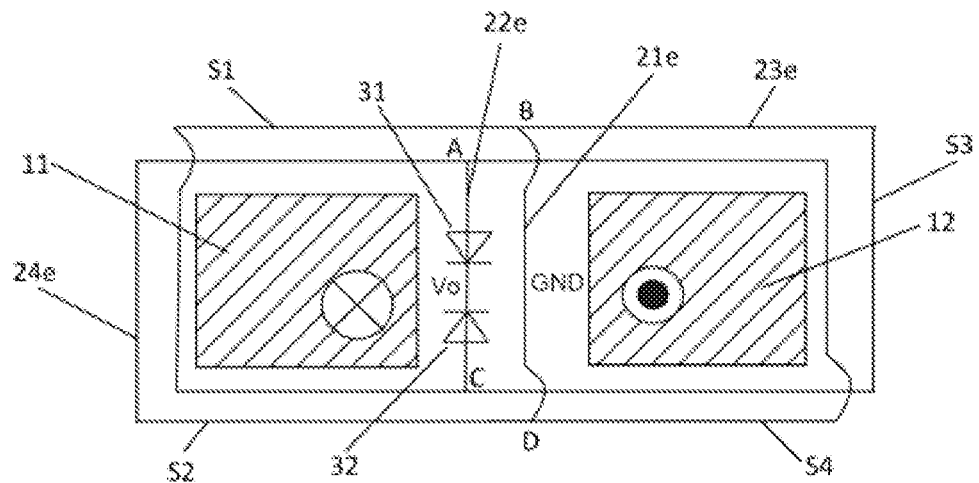
FIG. 5E is a schematic view (I) of arrangement of rectifier components of a power supply module modified on the basis of the fifth embodiment of the disclosure.
Figure 5F:
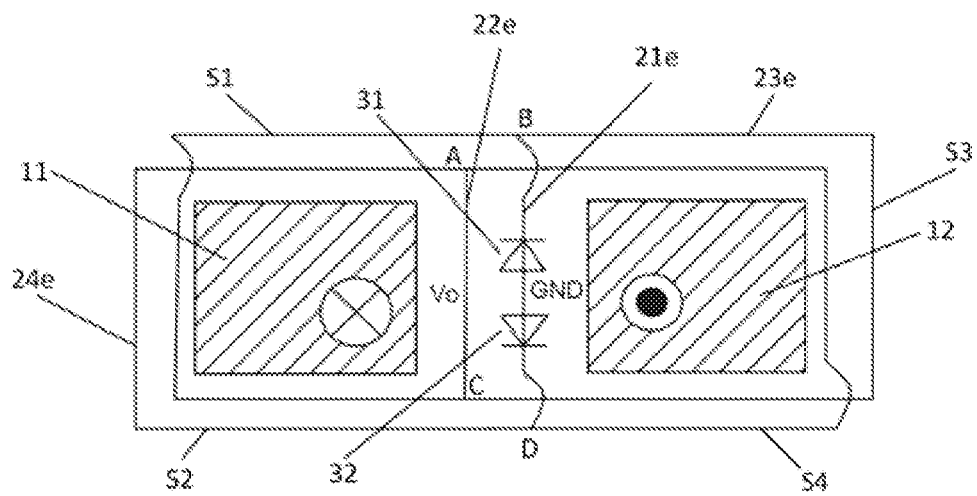
FIG. 5F is a schematic view (II) of arrangement of rectifier components of the power supply module modified on the basis of the fifth embodiment of the disclosure.
Figure 5G:
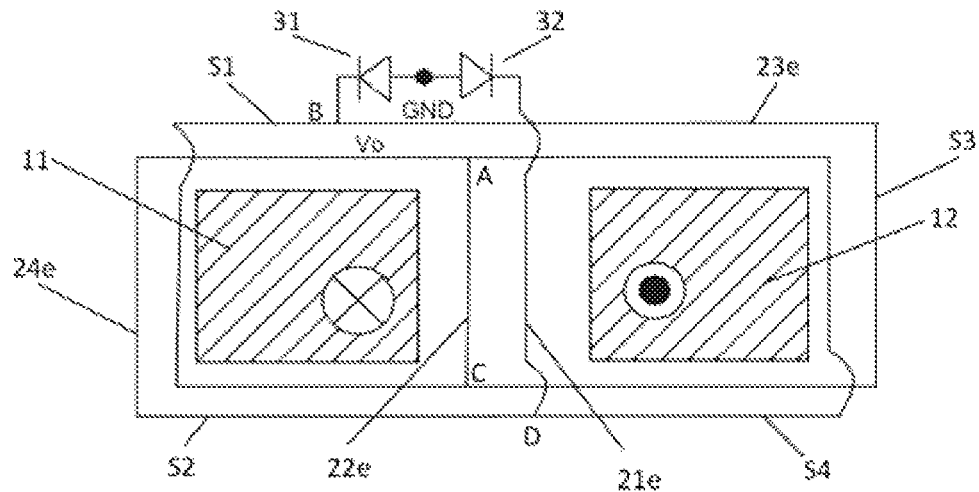
FIG. 5G is a schematic view (III) of arrangement of rectifier components of the power supply module modified on the basis of the fifth embodiment of the disclosure.

Referring to FIGS. 5E to 5G, FIG. 5E is a schematic view (I) of arrangement of rectifier components of a power supply module modified on the basis of the fifth embodiment of the disclosure, FIG. 5F is a schematic view (II) of arrangement of rectifier components of the power supply module modified on the basis of the fifth embodiment of the disclosure, and FIG. 5G is a schematic view (III) of arrangement of rectifier components of the power supply module modified on the basis of the fifth embodiment of the disclosure. As shown in FIGS. 5E to 5G, the power supply module has a similar structure as the power supply module in FIG. 5A, the winding section BD passing between the first magnetic column 11 and the second magnetic column 12 is the first shared winding portion 21e, and the winding section AC passing between the first magnetic column 11 and the second magnetic column 12 is the second shared winding portion 22e.

As shown in FIG. 5E, the first rectifier component 31 and the second rectifier component 32 are connected in series to the second shared winding portion 22e, and are located between the first magnetic column 11 and the second magnetic column 12, negative electrodes of the first rectifier component 31 and the second rectifier component 32 are electrically connected to a positive output terminal Vo of the power supply module, and the first shared winding portion 21e is electrically connected to a negative output terminal GND of the power supply module.

As shown in FIG. 5F, the first rectifier component 31 and the second rectifier component 32 are connected in series to the first shared winding portion 21e, and are located between the first magnetic column 11 and the second magnetic column 12, positive electrodes of the first rectifier component 31 and the second rectifier component 32 are electrically connected to a negative output terminal GND of the power supply module, and the second shared winding portion 22e is electrically connected to a positive output terminal Vo of the power supply module.

As shown in FIG. 5G, the first rectifier component 31 and the second rectifier component 32 are connected in series to the first shared winding portion 21e, and the first rectifier component 31 and the second rectifier component 32 are located on upper side of the first magnetic column 11 and the second magnetic column 12. In other embodiments, the first rectifier component 31 and the second rectifier component 32 also can be located on lower side of the first magnetic column 11 and the second magnetic column 12, or, one of the first rectifier component 31 and the second rectifier component 32 is located on the upper side of the first magnetic column 11 and the second magnetic column 12, and the other one is located on the lower side of the first magnetic column 11 and the second magnetic column 12.

Figure 5H:
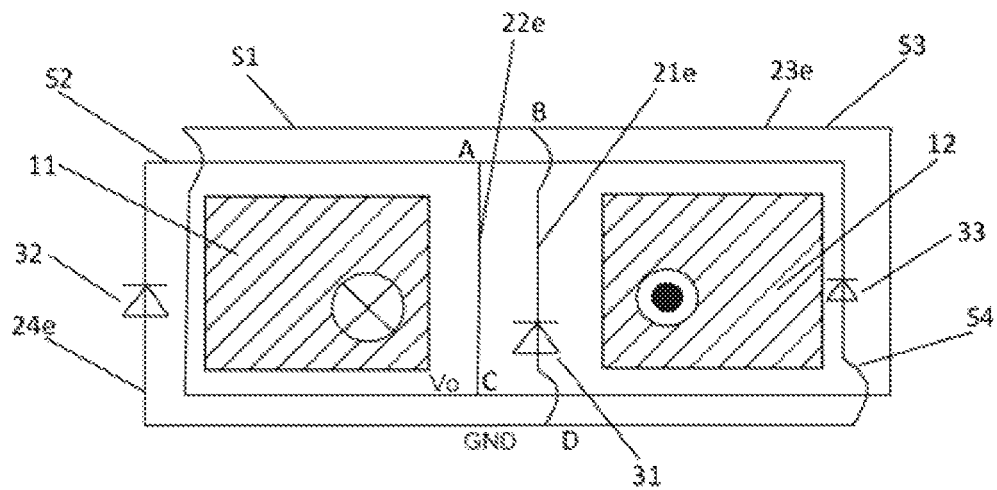
FIG. 5H is a schematic view (IV) of arrangement of rectifier components of the power supply module modified on the basis of the fifth embodiment of the disclosure.

Referring to FIG. 5H, FIG. 5H is a schematic view (IV) of arrangement of rectifier components of the power supply module modified on the basis of the fifth embodiment of the disclosure. As shown in FIG. 5H, the power supply module has a similar structure as the power supply module in FIG. 5A, and the main difference is that the plurality of rectifier components include a first rectifier component 31, a second rectifier component 32 and a third rectifier component 33, and the rectifier components are disposed on the first shared winding portion 21e only. For example, only the first rectifier component 31 is connected in series to the first shared winding portion 21e, and no rectifier component is disposed on the second shared winding portion 22e, while the second rectifier component 32 and the third rectifier component 33 are connected in series to the second annular winding portion 24e. Specifically, the second rectifier component 32 is disposed on the second winding S2, and the third rectifier component 33 is disposed on the fourth winding S4. Accordingly, only the first rectifier component 31 is reused by the second winding S2 and the third winding S3, and the second rectifier component 32 and the third rectifier component 33 are not reused. In other embodiments, the first rectifier component 31 also can be connected in series to the second shared winding portion 22e, and the second rectifier component 32 and the third rectifier component 33 are connected in series to the first annular winding portion 23e. Accordingly, only the first rectifier component 31 is reused by the second winding S2 and the fourth winding S4, and the second rectifier component 32 and the third rectifier component 33 are not reused.

Figure 5I:
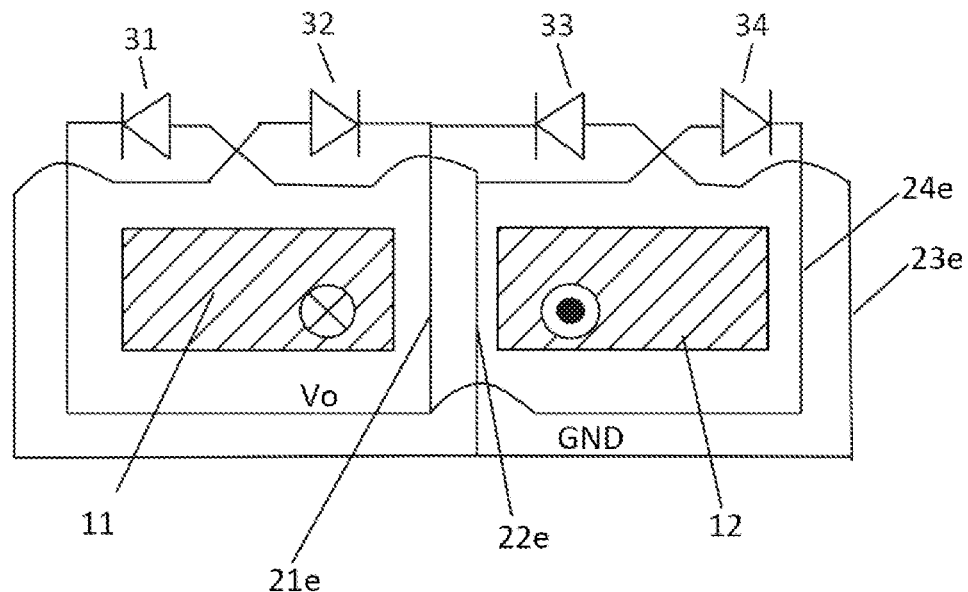
FIG. 5I is a schematic view (V) of arrangement of rectifier components of the power supply module modified on the basis of the fifth embodiment of the disclosure.
Figure 5J:
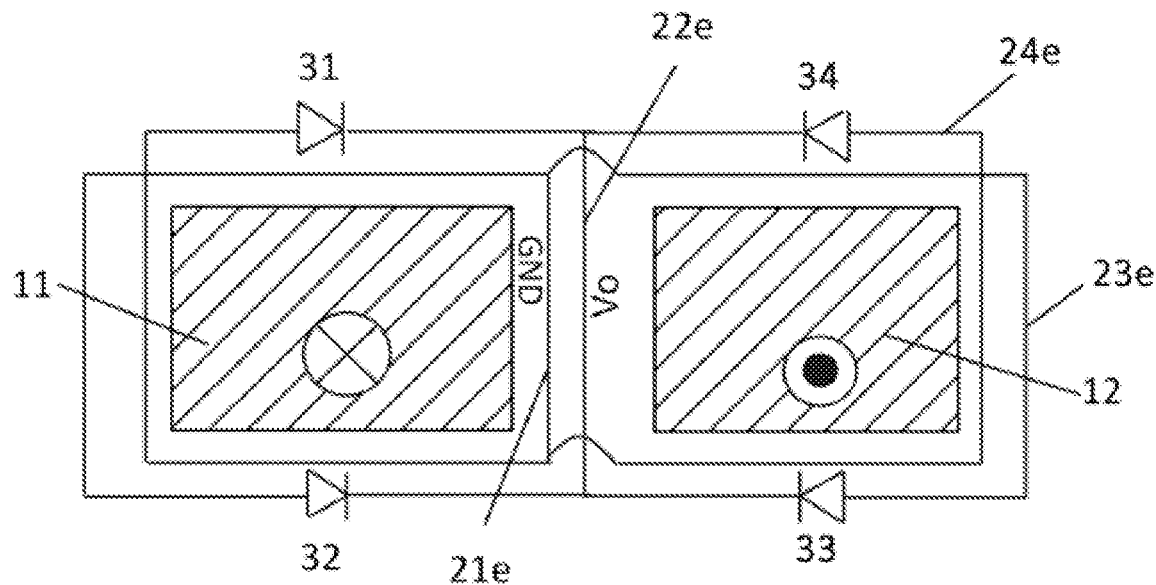
FIG. 5J is a schematic view (VI) of arrangement of rectifier components of the power supply module modified on the basis of the fifth embodiment of the disclosure.
Figure 5K:
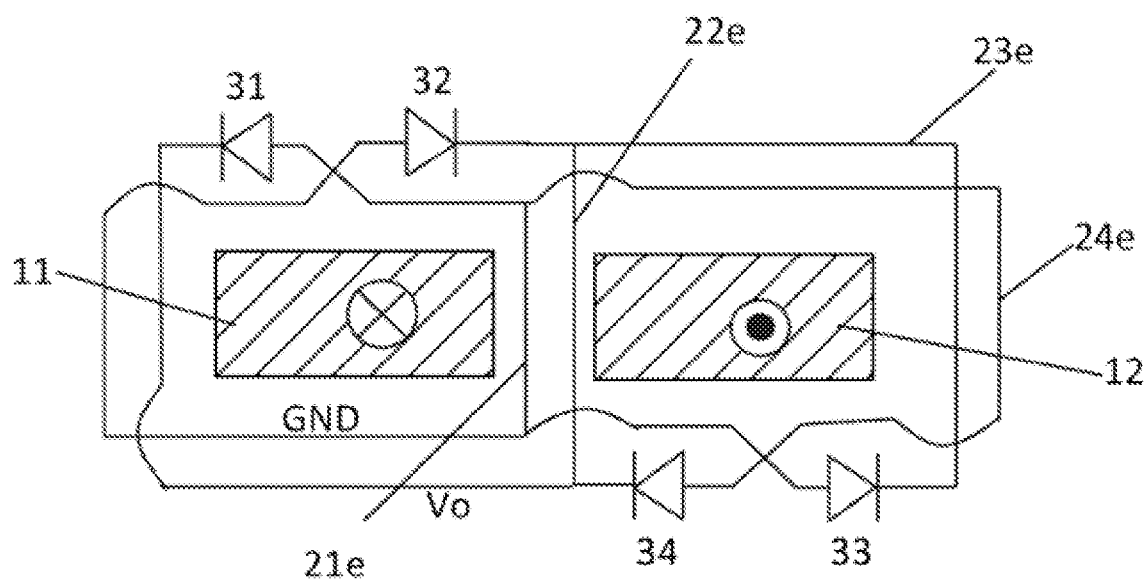
FIG. 5K is a schematic view (VII) of arrangement of rectifier components of the power supply module modified on the basis of the fifth embodiment of the disclosure.
Figure 5L:
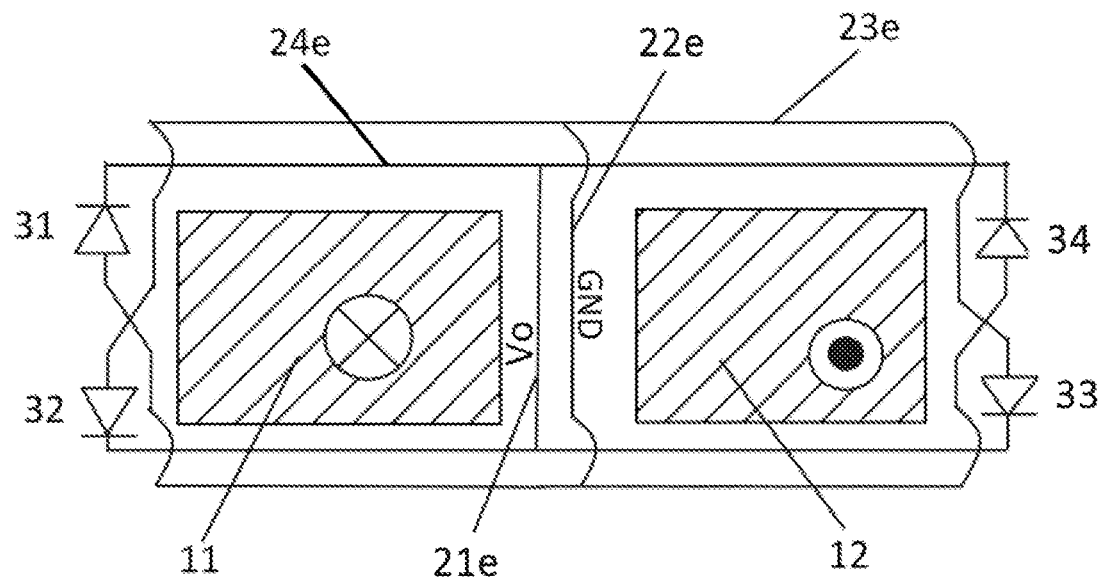
FIG. 5L is a schematic view (VIII) of arrangement of rectifier components of the power supply module modified on the basis of the fifth embodiment of the disclosure.
Figure 5M:
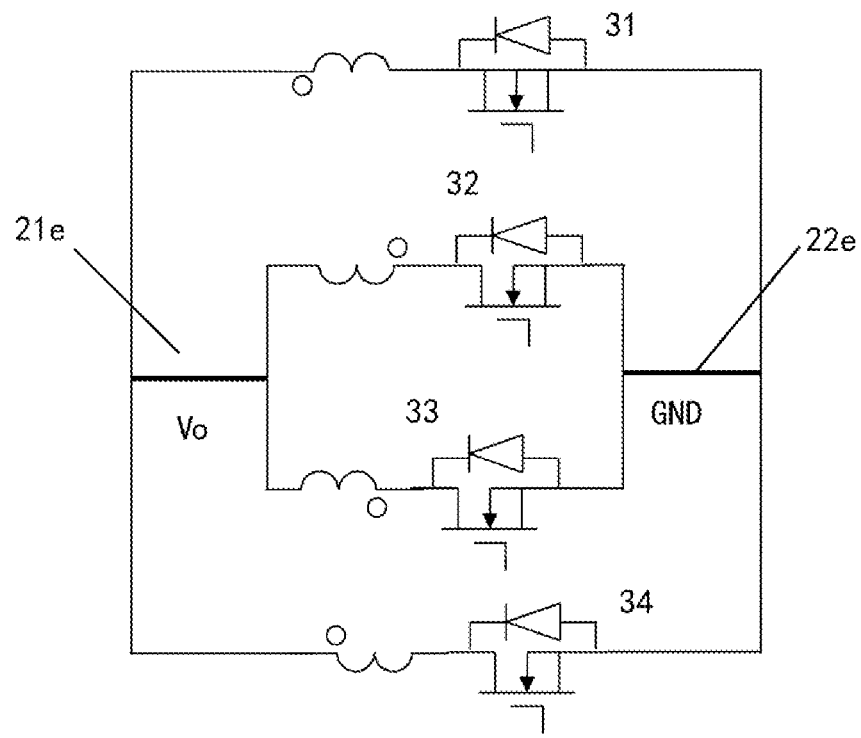
FIG. 5M is another circuit view of the power supply module in the fifth embodiment of the disclosure.

Referring to FIGS. 5I to 5M, FIG. 5I is a schematic view (V) of arrangement of rectifier components of the power supply module modified on the basis of the fifth embodiment of the disclosure, FIG. 5J is a schematic view (VI) of arrangement of rectifier components of the power supply module modified on the basis of the fifth embodiment of the disclosure, FIG. 5K is a schematic view (VII) of arrangement of rectifier components of the power supply module modified on the basis of the fifth embodiment of the disclosure, FIG. 5L is a schematic view (VIII) of arrangement of rectifier components of the power supply module modified on the basis of the fifth embodiment of the disclosure, and a circuit principle view of the power supply module in FIGS. 5I to 5L is generally shown in FIG. 5M.

As shown in FIGS. 5I to 5M, the plurality of rectifier components include a first rectifier component 31, a second rectifier component 32, a third rectifier component 33 and a fourth rectifier component 34. The first rectifier component 31 to the fourth rectifier component 34 can be disposed above and/or below the first magnetic column 11 and the second magnetic column 12, and positions of the rectifier components can be adjusted according to needs. For example, as shown in FIG. 5I, the first rectifier component 31 is connected in series to a section of the second annular winding portion 24e surrounding the first magnetic column 11, the second rectifier component 32 is connected in series to a section of the first annular winding portion 23e surrounding the first magnetic column 11, the third rectifier component 33 is connected in series to a section of the first annular winding portion 23e surrounding the second magnetic column 12, and the fourth rectifier component 34 is connected in series to a section of the second annular winding portion 24e surrounding the second magnetic column 12. Positive electrodes of the first rectifier component 31 and the fourth rectifier component 34 are electrically connected to the second shared winding portion 22e, the second shared winding portion 22e is electrically connected to a negative output terminal GND of the power supply module, negative electrodes of the second rectifier component 32 and the third rectifier component 33 are electrically connected to the first shared winding portion 21e, and the first shared winding portion 21e is electrically connected to a positive output terminal Vo of the power supply module.

Referring to FIG. 5I again, the first rectifier component 31, the second rectifier component 32, the third rectifier component 33 and the fourth rectifier component 34 are located on upper side of the first magnetic column 11 and the second magnetic column 12. In other embodiments, the first rectifier component 31, the second rectifier component 32, the third rectifier component 33 and the fourth rectifier component 34 also can be located on lower side of the first magnetic column 11 and the second magnetic column 12.

As shown in FIG. 5J, the first rectifier component 31 and the second rectifier component 32 are located on upper side and lower side of the first magnetic column 11 and the second magnetic column 12, respectively, and the third rectifier component 33 and the fourth rectifier component 34 are located on the lower side and upper side of the first magnetic column 11 and the second magnetic column 12, respectively.

As shown in FIG. 5K, the first rectifier component 31 and the second rectifier component 32 are located on one side of upper side and lower side (such as, upper side) of the first magnetic column 11 and the second magnetic column 12, and the third rectifier component 33 and the fourth rectifier component 34 are located on the other side of the upper side or lower side (such as, lower side) of the first magnetic column 11 and the second magnetic column 12. In other embodiments, the first rectifier component 31 and the second rectifier component 32 also can be located on the lower side of the first magnetic column 11 and the second magnetic column 12, and the third rectifier component 33 and the fourth rectifier component 34 are located on the upper side of the first magnetic column 11 and the second magnetic column 12.

As shown in FIG. 5L, the first rectifier component 31 and the second rectifier component 32 are located on a left side of the first magnetic column 11 and the second magnetic column 12, and the third rectifier component 33 and the fourth rectifier component 34 are located on a right side of the first magnetic column 11 and the second magnetic column 12.

To sum up, positions of the rectifier components can be adjusted according to needs, and have wide applicability. For example, different types or heat dissipation requirements of the rectifier components may be catered to adjust position arrangement of the rectifier components.

Figure 6A:
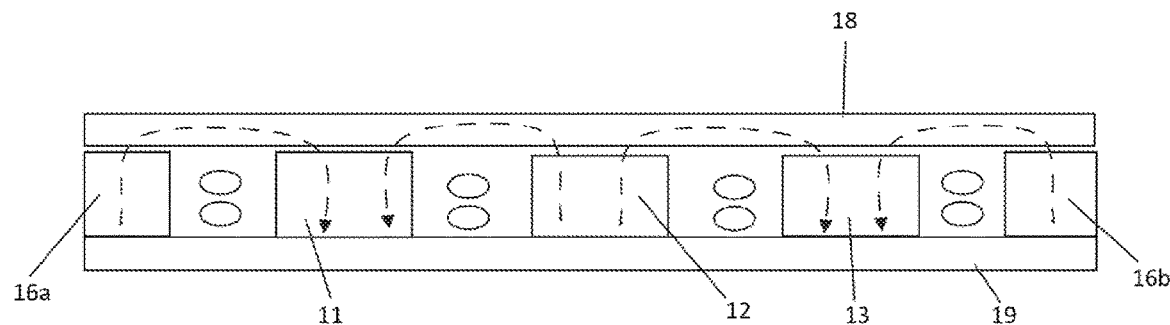
FIG. 6A is a schematic view of arrangement of magnetic columns of a power supply module in a sixth embodiment of the disclosure.
Figure 6B:
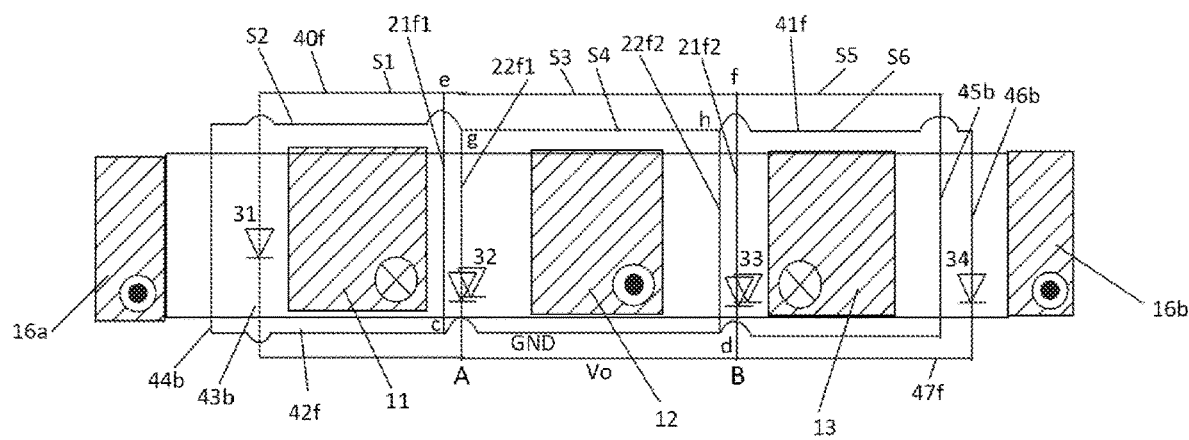
FIG. 6B is a structural view of the power supply module in the sixth embodiment of the disclosure.
Figure 6C:
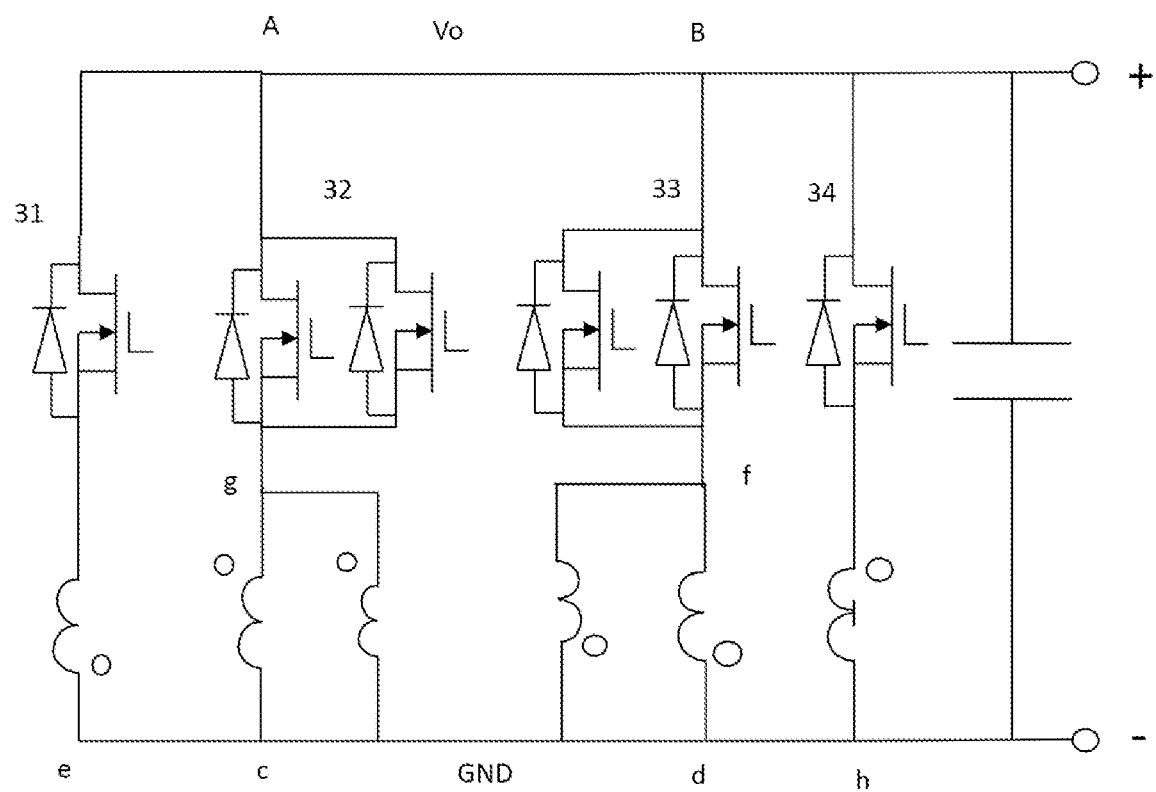
FIG. 6C is a circuit principle view of the power supply module in the sixth embodiment of the disclosure.

Referring to FIGS. 6A to 6C, FIG. 6A is a schematic view of arrangement of magnetic columns of a power supply module in a sixth embodiment of the disclosure, FIG. 6B is a structural view of the power supply module in the sixth embodiment of the disclosure, and FIG. 6C is a circuit view of the power supply module in the sixth embodiment of the disclosure. As shown in FIGS. 6A to 6C, the power supply module has a similar structure as the power supply module shown in FIG. 5A. The rectifier circuit of the power supply module is a half-bridge full-wave rectifier circuit, and the rectifier circuit includes a first rectifier component 31, a second rectifier component 32, a third rectifier component 33 and a fourth rectifier component 34. The transformer includes a first magnetic column 11, a first winding S1 and a second winding S2 wound onto the first magnetic column 11, a second magnetic column 12, a third winding S3 and a fourth winding S4 wound onto the second magnetic column 12, a third magnetic column 13, and a fifth winding S5 and a sixth winding S6 wound onto the third magnetic column 13. The first winding S1 and the third winding S3 have a first shared winding portion 21/1 (such as, the winding section ec), the second winding S2 and the fourth winding S4 have a second shared winding portion 22/1 (such as, the winding section gA), the third winding S3 and the fifth winding S5 have a third shared winding portion 22f2 (such as, the winding section fB), and the fourth winding S4 and the sixth winding S6 have a fourth shared winding portion 22f2 (such as, the winding section hd).

In this embodiment, the first magnetic column 11, the second magnetic column 12 and the third magnetic column 13 are linearly arranged in sequence, magnetic fluxes in the adjacent magnetic columns have opposite directions, and the first magnetic column 11, the second magnetic column 12 and the third magnetic column 13 are connected between the first cover plate 18 and the second cover plate 19 to form a closed magnetic path. The magnetic core further includes a first magnetic side column 16a and a second magnetic side column 16b. The first magnetic side column 16a is disposed on outside (such as, a left side) of the first magnetic column 11, the second magnetic column 12 and the third magnetic column 13, and a second magnetic side column 16b is disposed on outside (such as, a right side) of the first magnetic column 11, the second magnetic column 12 and the third magnetic column 13, the first magnetic side column 16a and the second magnetic side column 16b are connected between the first cover plate 18 and the second cover plate 19, and magnetic fluxes in the first magnetic side column 16a and the second magnetic side column 16b can be a half of magnetic flux in the first magnetic column 11, the second magnetic column 12 or the third magnetic column 13. A direction of the magnetic flux in the first magnetic side column 16a is opposite to a direction of the magnetic flux in the first magnetic column 11, and a direction of the magnetic flux in the second magnetic side column 16b is opposite to a direction of the magnetic flux in the third magnetic column 13. A sectional area of the first magnetic side column 16a and the second magnetic side column 16b can be a half of a sectional area of the first magnetic column 11, the second magnetic column 12 or the third magnetic column 13.

As shown in FIG. 6B, outer conductors are disposed on the outside of the first magnetic column 11, the second magnetic column 12 and the third magnetic column 13, and includes a first outer conductor 40f, a second outer conductor 41f, a third outer conductor 42f and a fourth outer conductor 47f. The first outer conductor 40f is formed by electrically connecting the part of the first winding S1 surrounding an upper surface of the first magnetic column 11, the part of the third winding S3 surrounding an upper surface of the second magnetic column 12 and the part of the fifth winding S5 surrounding an upper surface of the third magnetic column 13 sequentially; the second outer conductor 41f is formed by electrically connecting the part of the second winding S2 surrounding the upper surface of the first magnetic column 11, the part of the fourth winding S4 surrounding the upper surface of the second magnetic column 12 and the part of the sixth winding S6 surrounding the upper surface of the third magnetic column 13 sequentially; the third outer conductor 42f is formed by electrically connecting the part of the second winding S2 surrounding a lower surface of the first magnetic column 11, the part of the fourth winding S4 surrounding a lower surface of the second magnetic column 12 and the part of the fifth winding S5 surrounding a lower surface of the third magnetic column 13 sequentially; and the fourth outer conductor 47f is formed by electrically connecting the part of the first winding S1 surrounding the lower surface of the first magnetic column 11, the part of the third winding S3 surrounding the lower surface of the second magnetic column 12 and the part of the sixth winding S6 surrounding the lower surface of the third magnetic column 13 sequentially.

A first inner conductor 43b and a second inner conductor 44b are provided between the first magnetic side column 16a and the first magnetic column 11, a third inner conductor 45b and a fourth inner conductor 46b are provided between the second magnetic side column 16b and the third magnetic column 13. A first shared winding portion 21f1 and a second shared winding portion 22f1 are provided between the first magnetic column 11 and the second magnetic column 12, and a third shared winding portion 21f2 and a fourth shared winding portion 22f2 are provided between the second magnetic column 12 and the third magnetic column 13.

The first inner conductor 43b has one end electrically connected to the first outer conductor 40f, and the other end electrically connected to the fourth outer conductor 47f. The second inner conductor 44b has one end electrically connected to the second outer conductor 41f, and the other end electrically connected to the third outer conductor 42f. The third inner conductor 45b has one end electrically connected to the first outer conductor 40f, and the other end electrically connected to the third outer conductor 42f. The fourth inner conductor 46b has one end electrically connected to the second outer conductor 41f, and the other end electrically connected to the fourth outer conductor 47f. The first shared winding portion 22f1 has one end electrically connected to the first outer conductor 40f, and the other end electrically connected to the third outer conductor 42f. The second shared winding portion 22f1 has one end electrically connected to the second outer conductor 41f, and the other end electrically connected to the fourth outer conductor 47f. The third shared winding portion 21f2 has one end electrically connected to the first outer conductor 40f, and the other end electrically connected to the fourth outer conductor 47f. The fourth shared winding portion 22f2 has one end electrically connected to the second outer conductor 41f, and the other end electrically connected to the third outer conductor 42f.

In this embodiment, the first rectifier component 31 is connected in series to the first inner conductor 43b, the second rectifier component 32 is connected in series to the second shared winding portion 22f1, the third rectifier component 33 is connected in series to the third shared winding portion 21f2, and the fourth rectifier component 34 is connected in series to the fourth inner conductor 46b. Negative electrodes of the first rectifier component 31, the second rectifier component 32, the third rectifier component 33 and the fourth rectifier component 34 are electrically connected to the fourth outer conductor 47f, the third outer conductor 42f is electrically connected to a negative output terminal GND of the power supply module, and the fourth outer conductor 47f is electrically connected to a positive output terminal Vo of the power supply module.

Figure 7A:
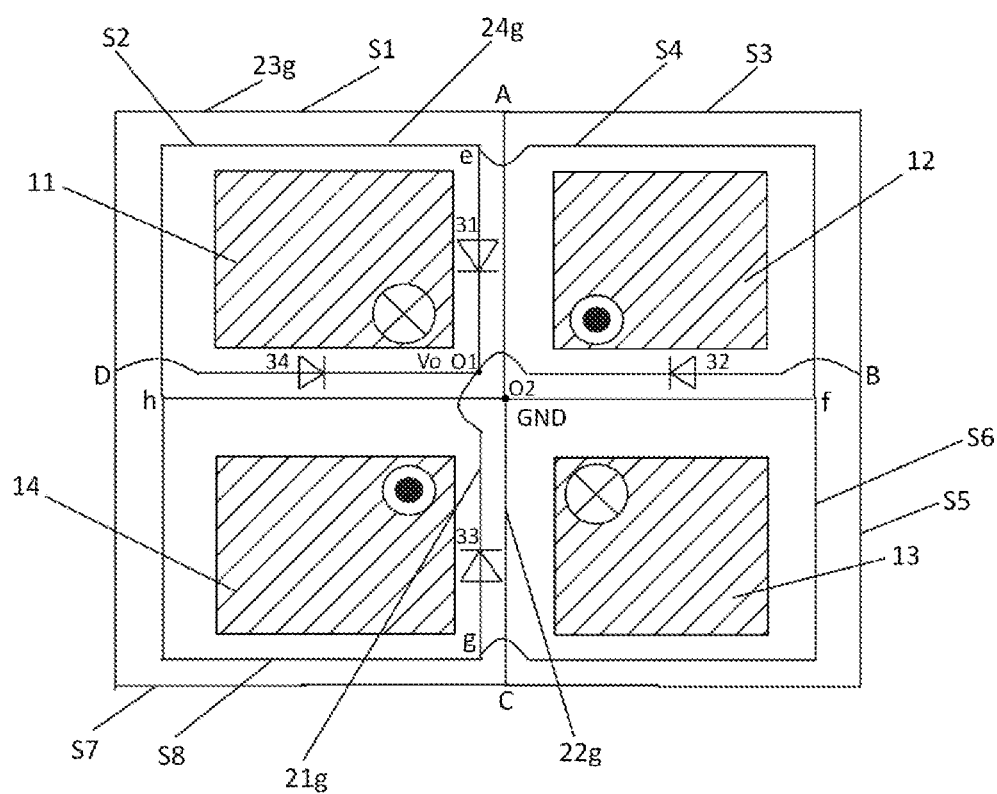
FIG. 7A is a structural view of a power supply module in a seventh embodiment of the disclosure.
Figure 7B:
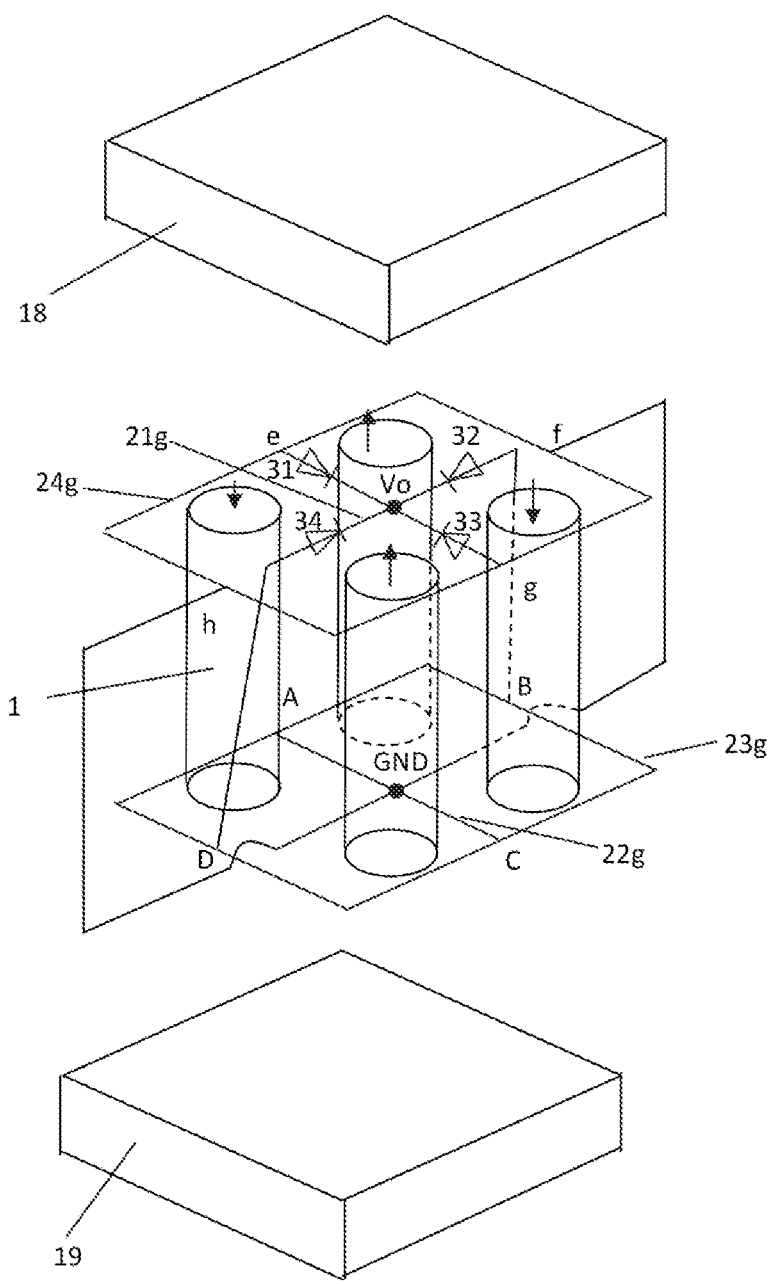
FIG. 7B is a perspective structural view of the power supply module in the seventh embodiment of the disclosure.
Figure 7C:
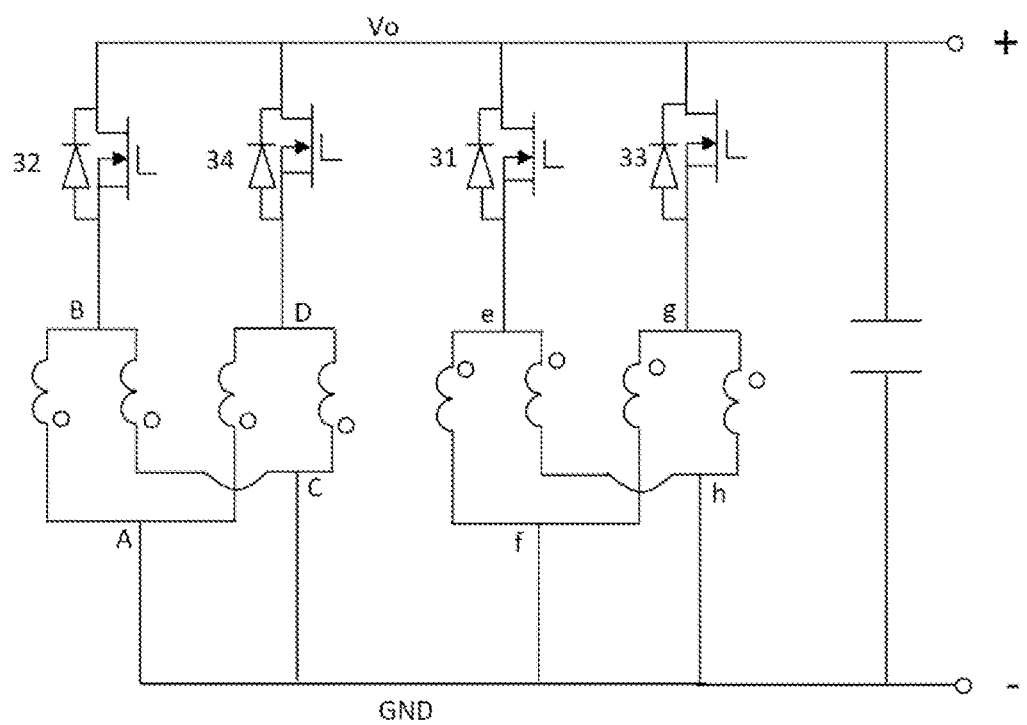
FIG. 7C is a circuit principle view of the power supply module in the seventh embodiment of the disclosure.

Referring to FIGS. 7A to 7C, FIG. 7A is a structural view of a power supply module in a seventh embodiment of the disclosure, FIG. 7B is a perspective structural view of the power supply module in the seventh embodiment of the disclosure, and FIG. 7C is a circuit view of the power supply module in the seventh embodiment of the disclosure. As shown in FIGS. 7A to 7C, the rectifier circuit of the power supply module is a half-bridge full-wave rectifier circuit. The transformer includes a magnetic core and a winding, and the rectifier circuit is electrically connected to the winding of the transformer. The transformer includes a first magnetic column 11, a second magnetic column 12, a first winding S1 and a second winding S2 wound onto the first magnetic column 11, and a third winding S3 and a fourth winding S4 wound onto the second magnetic column 12. The transformer further includes a third magnetic column 13, a fourth magnetic column 14, a fifth winding S5 and a sixth winding S6 wound onto the third magnetic column 13, and a seventh winding S7 and an eighth winding S8 wound onto the fourth magnetic column 14. The first magnetic column 11, the second magnetic column 12, the third magnetic column 13 and the fourth magnetic column 14 are arranged in an array 2×2, magnetic fluxes of the adjacent magnetic columns have opposite directions. The first magnetic column 11, the second magnetic column 12, the third magnetic column 13 and the fourth magnetic column 14 are connected between the first cover plate 18 and the second cover plate 19. Upper and lower end surfaces of the four magnetic columns form a multi-coupling magnetic loop through connection of the first cover plate 18 and the second cover plate 19.

As shown in FIG. 7A, the part of the first winding S1, the part of the third winding S3, the part of the fifth winding S5 and the part of the seventh winding S7 disposed on outside of the first magnetic column 11, the second magnetic column 12, the third magnetic column 13 and the fourth magnetic column 14 are electrically connected sequentially to form a first annular winding portion 23g. the part of The second winding S2, the part of the fourth winding S4, the part of the sixth winding S6 and the part of the eighth winding S8 disposed on the outside of the first magnetic column 11, the second magnetic column 12, the third magnetic column 13 and the fourth magnetic column 14 are electrically connected sequentially to form a second annular winding portion 24g. The windings between the adjacent magnetic columns form the first shared winding portions and the second shared winding portions, the first shared winding portions are electrically connected to form a first cross-shaped winding portion 21g, the second shared winding portions are electrically connected to form a second cross-shaped winding portion 22g.

The first cross-shaped winding portion 21g has one node (such as, a node O1) and four terminals (such as, terminals e, B, g and D). Two separated terminals (such as, the terminals B and D) of the first cross-shaped winding portion 21g are electrically connected to the first annular winding portion 23g, and another two terminals (such as, the terminals e and g) of the first cross-shaped winding portion 21g are electrically connected to the second annular winding portion 24g. The second cross-shaped winding portion has one node (such as, a node O2) and four terminals (such as, terminals A, f, C and h). Two spaced terminals (such as, the terminals A and C) of the second cross-shaped winding portion 22g are electrically connected to the first annular winding portion 23g, another two terminals (such as, the terminals f and h) of the second cross-shaped winding portion 22g are electrically connected to the second annular winding portion 24g.

The two terminals (such as, the terminals A and C), which are electrically connected to the first annular winding portion 23g, of the second cross-shaped winding portion 22g are adjacent to the two terminals (such as, the terminals e and g), which are electrically connected to the second annular winding portion 24g, of the first cross-shaped winding portion 21g. The two terminals (such as, the terminals f and h), which are electrically connected to the second annular winding portion 24g, of the second cross-shaped winding portion 22g are adjacent to the two terminals (such as, the terminals B and D), which are electrically connected to the first annular winding portion 23g, of the first cross-shaped winding portion 21g. In this embodiment, the first rectifier component 31, the second rectifier component 32, the third rectifier component 33 and the fourth rectifier component 34 are respectively connected in series to the shared winding portion between the adjacent magnetic columns. For example, the first rectifier component 31 is located between the first magnetic column 11 and the second magnetic column 12, the second rectifier component 32 is located between the second magnetic column 12 and the third magnetic column 13, the third rectifier component 33 is located between the third magnetic column 13 and the four magnetic column 14, and the fourth rectifier component 34 is located between the fourth magnetic column 14 and the first magnetic column 11. The first rectifier component 31, the second rectifier component 32, the third rectifier component 33 and the fourth rectifier component 34 are respectively connected in series to the first shared winding portions between the adjacent magnetic columns. Negative electrodes of the first rectifier component 31, the second rectifier component 32, the third rectifier component 33 and the fourth rectifier component 34 are electrically connected to the node (such as, the node O1) of the first cross-shaped winding portion 21g. The node (such as, the node O1) of the first cross-shaped winding portion 21g is electrically connected to a positive output terminal Vo of the power supply module, and the node (such as, the node O2) of the second cross-shaped winding portion 22g is electrically connected to a negative output terminal GND of the power supply module. In other embodiments, the first rectifier component 31, the second rectifier component 32, the third rectifier component 33 and the fourth rectifier component 34 also can be respectively connected in series to the second shared winding portions between the adjacent magnetic columns. The positive electrodes of the first rectifier component 31, the second rectifier component 32, the third rectifier component 33 and the fourth rectifier component 34 are electrically connected to the node (such as, the node O2) of the first cross-shaped winding portion 22g.

Figure 7D:
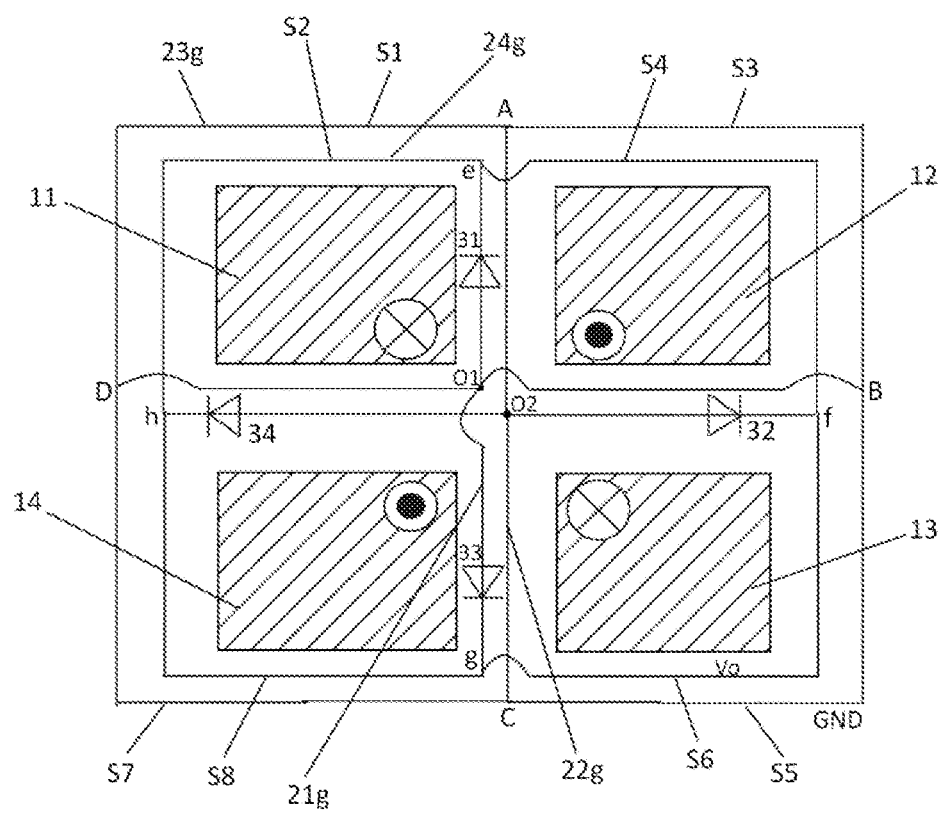
FIG. 7D is another structural view of the power supply module in the seventh embodiment of the disclosure.
Figure 7E:
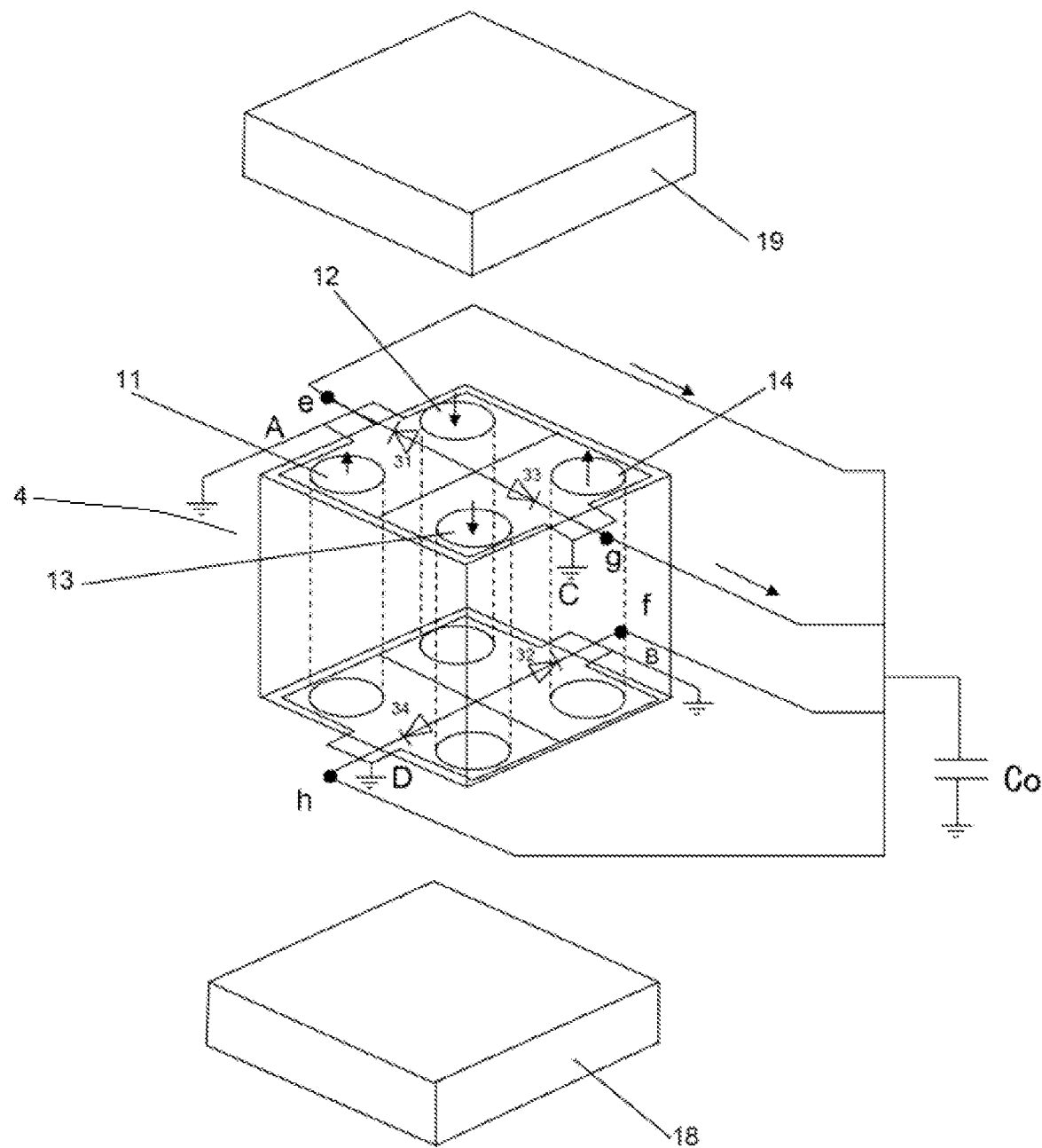
FIG. 7E is another perspective structural view of the power supply module in the seventh embodiment of the disclosure.

Referring to FIGS. 7D to 7E, FIG. 7D is another structural view of the power supply module in the seventh embodiment of the disclosure, and FIG. 7E is another perspective structural view of the power supply module in the seventh embodiment of the disclosure. As shown in FIGS. 7D to 7E, the first rectifier component 31 and the third rectifier component 33 are connected in series to the first shared winding portion, the second rectifier component 32 and the fourth rectifier component 34 are connected in series to the second shared winding portion, positive electrodes of the first rectifier component 31 and the third rectifier component 33 are electrically connected to the node (such as, the node O1) of the first cross-shaped winding portion 21g. The positive electrodes of the second rectifier component 32 and the fourth rectifier component 34 are electrically connected to the node (such as, the node O2) of the second cross-shaped winding portion 22g. The first annular winding portion 23g is electrically connected to a negative output terminal GND of the power supply module, and the second annular winding portion 24g is electrically connected to a positive output terminal Vo of the power supply module. In other embodiments, it is also possible that negative electrodes of the first rectifier component 31 and the third rectifier component 33 are electrically connected to the node (such as, the node O1) of the first cross-shaped winding portion 21g, and negative electrodes of the second rectifier component 32 and the fourth rectifier component 34 are electrically connected to the node (such as, the node O2) of the second cross-shaped winding portion 22g, the first annular winding portion 23g is electrically connected to a positive output terminal Vo of the power supply module, and the second annular winding portion 24g is electrically connected to a negative output terminal GND of the power supply module.

In this embodiment, the shared winding portion is formed in a circuit board 4 (such as Printed Circuit Board), the first rectifier component 31 and the third rectifier component 33 can be disposed on an upper surface of the circuit board 4, and the second rectifier component 32 and the fourth rectifier component 34 can be disposed on a lower surface of the circuit board 4. Four magnetic columns pass through the upper and lower surfaces of the circuit board 4, the first cover plate 18 is disposed on the upper surface of the circuit board 4, and the second cover plate 19 is disposed on the lower surface thereof. The first annular winding portion 23g and the second annular winding portion 24g on outside of the magnetic core form a negative output terminal GND and a positive output terminal Vo of the power supply module, respectively, and can facilitate guiding the negative output terminal GND and the positive output terminal Vo of the power supply module on the circuit board 4.

As compared to the traditional four half-bridge full-wave rectifier circuits, in the power supply module of the seventh embodiment of the disclosure, the number of rectifier components is reduced by half, and types of electrodes between the magnetic columns are also reduced by half, so structure is largely simplified. Moreover, reuse of the magnetic circuit of the cover plates of the magnetic core, reuse of the windings between the respective magnetic columns and reuse of the rectifier components are realized, which facilitates improving efficiency of the power supply module. Furthermore, the structure is balanced symmetrically, and is more suitable for disclosure of stacked power supply modules.

Figure 8A:
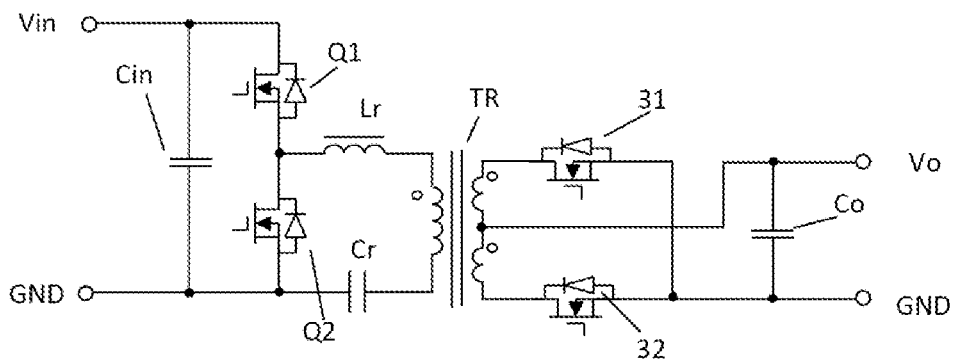
FIG. 8A is a circuit view of a half-bridge DC/DC conversion circuit.
Figure 8B:
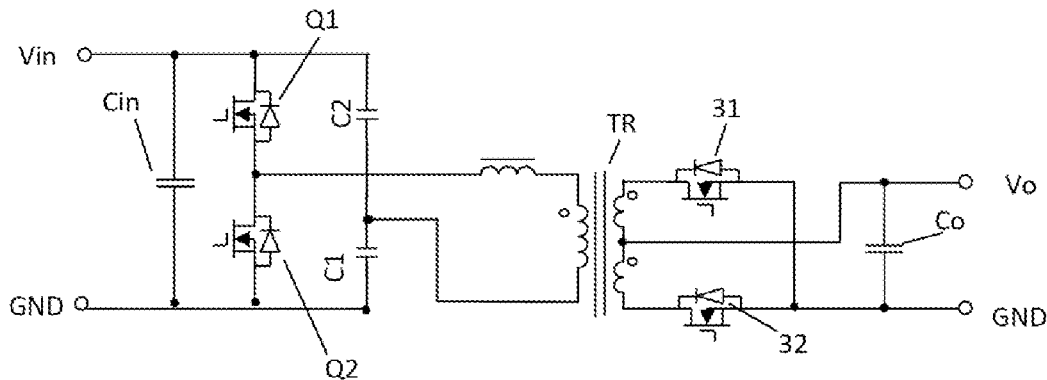
FIG. 8B is a circuit view of a half-bridge LLC circuit.
Figure 8C:
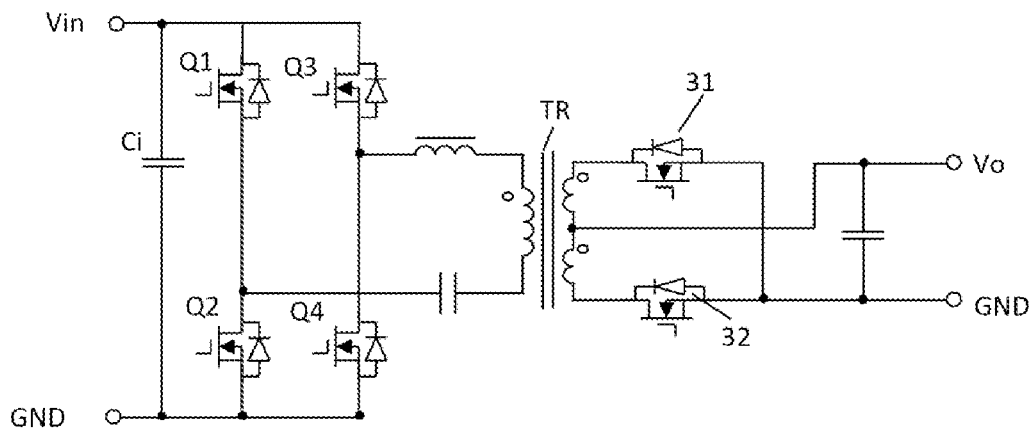
FIG. 8C is a circuit view of a full bridge LLC circuit.
Figure 8D:
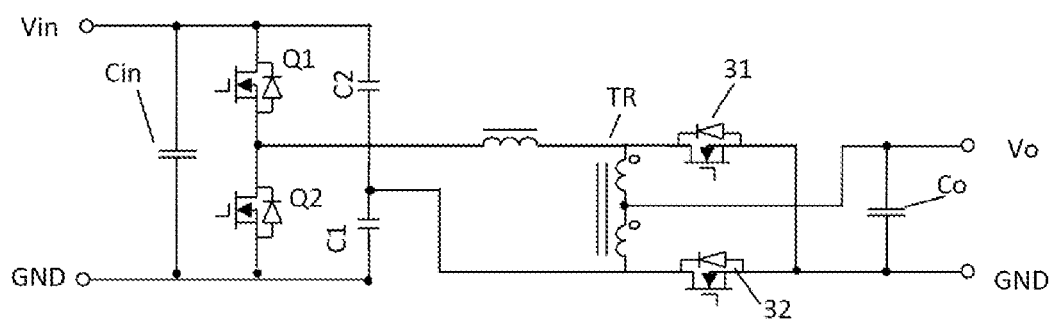
FIG. 8D is a circuit view of the LLC circuit with an autotransformer.

Referring to FIGS. 8A to 8D, FIG. 8A is a circuit view of a half-bridge DC/DC conversion circuit, FIG. 8B is a circuit view of a half-bridge LLC circuit, FIG. 8C is a circuit view of a full bridge LLC circuit, and FIG. 8D is a circuit view of the LLC circuit with an autotransformer. As shown in FIGS. 8A to 8D, the power supply module provided in the disclosure can be applied to these typical application circuits, where Vin represents a positive input terminal, Vo represents a positive output terminal, GND represents a negative input terminal and a negative output terminal, Q1 to Q4 represent switches in the primary bridge circuit, and TR represents a transformer. In addition, the power supply module of the disclosure also can be applied to a Cuk circuit or a flyback circuit.

In the embodiments of the disclosure, it shall be understood that orientation or positional relationship indicated by terms "upper", "lower", "left" and "right" is orientation or positional relationship based on the accompanying drawings, aiming to facilitate describing the embodiments of the disclosure and simplifying the descriptions only, instead of indicating or suggesting that the referred apparatuses or units must have a specific orientation, and constructed and operated in a specific orientation. Therefore, it cannot be understood as limiting the embodiments of the disclosure. The term "some embodiments" refers to specific feature, structure, material or characteristic described combining with the embodiments or examples included in at least one embodiment or example of the embodiments of the disclosure. In the disclosures, exemplary expressions of the terms may not refer to the same embodiment or example. Moreover, the described specific feature, structure, material or characteristic can be combined in a suitable manner in one or more embodiments or examples.

The disclosures are only preferable embodiments of the disclosure, and the disclosure is not limited thereto. For those skilled in the art, the embodiments of the disclosure can have various modifications and variations. Any modifications, equivalent replacements and improvements within spirit and principle of the embodiments of the disclosure shall be included in the extent of protection of the embodiments of the disclosure.

What is claimed is:

1. A power supply module, comprising a transformer comprising a magnetic core and a winding, and a rectifier circuit electrically connected to the winding, wherein
the magnetic core comprises:
  a first cover plate;
  a second cover plate opposite to the first cover plate;
  a first magnetic column; and
  a second magnetic column having a magnetic flux in opposite direction to that of the first magnetic column, the first magnetic column and the second magnetic column are connected between the first cover plate and the second cover plate;
the winding comprises:
  a first winding wound onto the first magnetic column; and
  a second winding wound onto the second magnetic column, wherein the first winding and the second winding have a shared winding portion, and at least a part of the shared winding portion is located between the first magnetic column and the second magnetic column, and wherein a current flowing through the first winding and a current flowing through the second winding are overlapped in the shared winding portion; and
the rectifier circuit comprises:
  a plurality of rectifier components comprising a first rectifier component, a second rectifier component, a third rectifier component and a fourth rectifier component electrically connected to form a full bridge rectifier circuit.

2. The power supply module according to claim 1, wherein at least one of the first rectifier component, the second rectifier component, the third rectifier component and the fourth rectifier component is connected in series to the shared winding portion.

3. The power supply module according to claim 1, wherein the shared winding portion comprises a first shared winding portion and a second shared winding portion, at least a part of the first shared winding portion and at least a part of the second shared winding portion are located between the first magnetic column and the second magnetic column, part of the first winding and part of the second winding disposed on the outside of the first magnetic column and the second magnetic column are electrically connected to form a first annular winding portion, and ends of the first shared winding portion and ends of the second shared winding portion are electrically connected to the first annular winding portion;
  the first rectifier component and the second rectifier component are connected in series to the first shared winding portion, the third rectifier component and the fourth rectifier component are connected in series to the second shared winding portion, negative electrode of the first rectifier component and negative electrode of the second rectifier component are respectively electrically connected to the first annular winding portion, positive electrode of the first rectifier component and positive electrode of the second rectifier component are electrically connected to a negative output terminal GND of the power supply module, positive electrode of the third rectifier component and positive electrode of the fourth rectifier component are respectively electrically connected to the first annular winding portion, and negative electrode of the third rectifier component and negative electrode of the fourth rectifier component are electrically connected to a positive output terminal Vo of the power supply module.

4. The power supply module according to claim 3, wherein the first shared winding portion and the second shared winding portion have a reuse shared winding portion and two branches, the reuse shared winding portion has one end electrically connected to the first annular winding portion, and the other end extending to upper or lower sides of the first magnetic column and the second magnetic column through a space between the first magnetic column and the second magnetic column, and the other end of the reuse shared winding portion is electrically connected to the first annular winding portion through the two branches, the first rectifier component and the second rectifier component are connected in series to one of the two branches, and the third rectifier component and the fourth rectifier component are connected in series to another one of the two branches.

5. The power supply module according to claim 4, wherein all of the first rectifier component, the second rectifier component, the third rectifier component and the fourth rectifier component are located on the upper side of the first magnetic column and the second magnetic column, or
all of the first rectifier component, the second rectifier component, the third rectifier component and the fourth rectifier component are located on the lower side of the first magnetic column and the second magnetic column.

6. The power supply module according to claim 3, wherein all of the first rectifier component, the second rectifier component, the third rectifier component and the fourth rectifier component are located between the first magnetic column and the second magnetic column, or
each of the first rectifier component, the second rectifier component, the third rectifier component and the fourth rectifier component is located on upper or lower sides of the first magnetic column and the second magnetic column.

7. The power supply module according to claim 3, wherein
when a magnetic flux in the first magnetic column exits perpendicular to a paper, and a magnetic flux in the second magnetic column enters perpendicular to the paper, a current of the first winding flows along an anticlockwise direction, a current of the second winding flows along a clockwise direction, the first rectifier component and the fourth rectifier component are turned on, the second rectifier component and the third rectifier component are turned off, the negative output terminal GND of the power supply module, the first rectifier component, the first winding, the fourth rectifier component and the positive output terminal Vo of the power supply module are electrically connected around the first magnetic column sequentially to form a first current loop, and the negative output terminal GND of the power supply module, the first rectifier component, the second winding, the fourth rectifier component and the positive output terminal Vo of the power supply module are electrically connected around the second magnetic column sequentially to form a second current loop;
when a magnetic flux in the first magnetic column enters perpendicular to a paper, and a magnetic flux in the second magnetic column exits perpendicular to the paper, a current of the first winding flows along a clockwise direction, a current of the second winding flows along an anticlockwise direction, the second rectifier component and the third rectifier component are turned on, the first rectifier component and the fourth rectifier component are turned off, the negative output terminal GND of the power supply module, the second rectifier component, the first winding, the third rectifier component and the positive output terminal Vo of the power supply module are electrically connected around the first magnetic column sequentially to form a third current loop, and the negative output terminal GND of the power supply module, the second rectifier component, the second winding, the third rectifier component and the positive output terminal Vo of the power supply module are electrically connected around the second magnetic column sequentially to form a fourth current loop.

8. The power supply module according to claim 1, wherein outer conductors are disposed on outside of the first magnetic column and the second magnetic column, and comprise a first outer conductor, a second outer conductor and a third outer conductor, the first outer conductor is formed by electrically connecting the first winding surrounding an upper surface of the first magnetic column and the second winding surrounding an upper surface of the second magnetic column sequentially, and each of the second outer conductor and the third outer conductor is formed by electrically connecting the first winding surrounding a lower surface of the first magnetic column and the second winding surrounding a lower surface of the second magnetic column sequentially;
a first shared winding portion and a second shared winding portion are provided between the first magnetic column and the second magnetic column, the first shared winding portion has one end electrically connected to the first outer conductor, and the other end electrically connected to the second outer conductor, and the second shared winding portion has one end electrically connected to the first outer conductor, and the other end electrically connected to the third outer conductor;
the plurality of rectifier components further comprise a fifth rectifier component and a sixth rectifier component, the third rectifier component is connected in series to a section of the second outer conductor surrounding the first magnetic column, the fourth rectifier component is connected in series to a section of the third outer conductor surrounding the first magnetic column, the first rectifier component is connected in series to the first shared winding portion, the second rectifier component is connected in series to the second shared winding portion, the fifth rectifier component is connected in series to a section of the second outer conductor surrounding the second magnetic column, and the sixth rectifier component is connected in series to a section of the third outer conductor surrounding the second magnetic column;
positive electrodes of the first rectifier component, the third rectifier component and the fifth rectifier component are electrically connected to a negative output terminal GND of the power supply module, and negative electrodes of the second rectifier component, the fourth rectifier component and the sixth rectifier component are electrically connected to a positive output terminal Vo of the power supply module.

9. The power supply module according to claim 1, wherein the plurality of rectifier components further comprise a fifth rectifier component, a sixth rectifier component, a seventh rectifier component and an eighth rectifier component electrically connected to form an additional full bridge rectifier circuit;
- outer conductors are disposed on outside of the first magnetic column and the second magnetic column, and comprise a first outer conductor, a second outer conductor and a third outer conductor, the first outer conductor is formed by electrically connecting the first winding surrounding an upper surface of the first magnetic column and the second winding surrounding an upper surface of the second magnetic column sequentially, and each of the second outer conductor and the third outer conductor is formed by electrically connecting the first winding surrounding a lower surface of the first magnetic column and the second winding surrounding a lower surface of the second magnetic column sequentially;
- a reuse shared winding portion is provided between the first magnetic column and the second magnetic column, the reuse shared winding portion has one end electrically connected to the first outer conductor, and the other end electrically connected to the second outer conductor and the third outer conductor;
- the first rectifier component and the second rectifier component are connected in series to a section of the second outer conductor surrounding the first magnetic column, the third rectifier component and the fourth rectifier component are connected in series to a section of the third outer conductor surrounding the first magnetic column, the fifth rectifier component and the sixth rectifier component are connected in series to a section of the second outer conductor surrounding the second magnetic column, and the seventh rectifier component and the eighth rectifier component are connected in series to a section of the third outer conductor surrounding the second magnetic column;
- positive electrodes of the third rectifier component, the fourth rectifier component, the seventh rectifier component and the eighth rectifier component are electrically connected to a negative output terminal GND of the power supply module, and negative electrodes of the first rectifier component, the second rectifier component, the fifth rectifier component and the sixth rectifier component are electrically connected to a positive output terminal Vo of the power supply module.

10. The power supply module according to claim 1, wherein the rectifier circuit further comprises a fifth rectifier component, a sixth rectifier component, a seventh rectifier component and an eighth rectifier component.

11. The power supply module according to claim 10, wherein the transformer further comprises a third magnetic column and a third winding wound onto the third magnetic column, the first magnetic column, the second magnetic column and the third magnetic column are linearly arranged in sequence, magnetic fluxes in the adjacent magnetic columns have opposite directions, and the third magnetic column is connected between the first cover plate and the second cover plate;
- the magnetic core further comprises a first magnetic side column and a second magnetic side column disposed on outside of the first magnetic column, the second magnetic column and the third magnetic column, the first magnetic side column and the second magnetic side column are connected between the first cover plate and the second cover plate, and magnetic fluxes in the first magnetic side column and the second magnetic side column are a half of magnetic flux in the first magnetic column or the second magnetic column.

12. The power supply module according to claim 11, wherein outer conductors are disposed on outside of the first magnetic column, the second magnetic column and the third magnetic column, and comprise a first outer conductor, a second outer conductor and a third outer conductor, the first outer conductor is formed by electrically connecting the first winding surrounding an upper surface of the first magnetic column, the second winding surrounding an upper surface of the second magnetic column and the third winding surrounding an upper surface of the third magnetic column sequentially, and each of the second outer conductor and the third outer conductor is formed by electrically connecting the first winding surrounding a lower surface of the first magnetic column, the second winding surrounding a lower surface of the second magnetic column and the third winding surrounding a lower surface of the third magnetic column sequentially;
- a first inner conductor and a second inner conductor are provided between the first magnetic side column and the first magnetic column, a third inner conductor and a fourth inner conductor are provided between the second magnetic side column and the third magnetic column, a first shared winding portion and a second shared winding portion are provided between the first magnetic column and the second magnetic column, and a third shared winding portion and a fourth shared winding portion are provided between the second magnetic column and the third magnetic column;
- one end of the first inner conductor, one end of the first shared winding portion, one end of the third shared winding portion and one end of the third inner conductor are electrically connected to the first outer conductor, the other end of the first inner conductor, the other end of the first shared winding portion, the other end of the third shared winding portion and the other end of the third inner conductor are electrically connected to the second outer conductor, one end of the second inner conductor, one end of the second shared winding portion, one end of the fourth shared winding portion and one end of the fourth inner conductor are electrically connected to the first outer conductor, and the other end of the second inner conductor, the other end of the second shared winding portion, the other end of the fourth shared winding portion and the other end of the fourth inner conductor are electrically connected to the third outer conductor;
- the fifth rectifier component is connected in series to the first inner conductor, the sixth rectifier component is connected in series to the second inner conductor, the first rectifier component is connected in series to the first shared winding portion, the second rectifier component is connected in series to the second shared winding portion, the third rectifier component is connected in series to the third shared winding portion, the fourth rectifier component is connected in series to the fourth shared winding portion, the seventh rectifier component is connected in series to the third inner conductor, and the eighth rectifier component is connected in series to the fourth inner conductor;
- positive electrodes of the first rectifier component, the third rectifier component, the fifth rectifier component and the seventh rectifier component are electrically connected to a negative output terminal GND of the power supply module, and negative electrodes of the second rectifier component, the fourth rectifier component, the sixth rectifier component and the eighth rectifier component are electrically connected to a positive output terminal Vo of the power supply module.

13. The power supply module according to claim 10, wherein the transformer further comprises a third magnetic column, a fourth magnetic column, a third winding wound onto the third magnetic column and a fourth winding wound onto the fourth magnetic column, the first magnetic column, the second magnetic column, the third magnetic column and the fourth magnetic column are arranged in an array, magnetic fluxes of the adjacent magnetic columns have opposite directions, and the third magnetic column and the fourth magnetic column are connected between the first cover plate and the second cover plate;

the first winding, the second winding, the third winding and the fourth winding disposed on outside of the first magnetic column, the second magnetic column, the third magnetic column and the fourth magnetic column are electrically connected sequentially to form a first annular winding portion, the windings between the adjacent magnetic columns form the first shared winding portions and the second shared winding portions, the first shared winding portions are electrically connected to form a first cross-shaped winding portion, the second shared winding portions are electrically connected to form a second cross-shaped winding portion, the first cross-shaped winding portion has one node and four terminals, and the second cross-shaped winding portion has one node and four terminals;

four rectifier components of the first rectifier component, the second rectifier component, the third rectifier component, the fourth rectifier component, the fifth rectifier component, the sixth rectifier component, the seventh rectifier component and the eighth rectifier component are respectively connected in series to the first shared winding portions between corresponding adjacent magnetic columns, positive electrodes of the four rectifier components are electrically connected to the node of the first cross-shaped winding portion, another four rectifier components are respectively connected in series to the second shared winding portions between corresponding adjacent magnetic columns, and negative electrodes of another four rectifier components are electrically connected to the node of the second cross-shaped winding portion.

14. The power supply module according to claim 13, wherein the four terminals of the first cross-shaped winding portion and the four terminals of the second cross-shaped winding portion are electrically connected to the first annular winding portion;

the node of the first cross-shaped winding portion is electrically connected to a negative output terminal GND of the power supply module, and the node of the second cross-shaped winding portion is electrically connected to a positive output terminal Vo of the power supply module.

15. The power supply module according to claim 14, wherein a window is provided at center of the first cover plate or the second cover plate, lead wires electrically connected to the nodes of the first cross-shaped winding portion and the second cross-shaped winding portion are lead out from the window.

16. The power supply module according to claim 13, wherein the winding further comprises a second annular winding portion surrounding the first magnetic column, the second magnetic column, the third magnetic column and the fourth magnetic column;

the four terminals of the first cross-shaped winding portion are electrically connected to the first annular winding portion, and the four terminals of the second cross-shaped winding portion are electrically connected to the second annular winding portion;

the node of the first cross-shaped winding portion is electrically connected to the node of the second cross-shaped winding portion;

the first annular winding portion is electrically connected to a positive output terminal Vo of the power supply module, and the second annular winding portion is electrically connected to a negative output terminal GND of the power supply module.

17. A power supply module, comprising a transformer comprising a magnetic core and a winding, and a rectifier circuit electrically connected to the winding, wherein the magnetic core further comprises:
a first cover plate;
a second cover plate opposite to the first cover plate;
a first magnetic column; and
a second magnetic column having a magnetic flux in opposite direction to that of the first magnetic column, the first magnetic column and the second magnetic column connected between the first cover plate and the second cover plate;

the winding further comprises:
a first winding wound onto the first magnetic column;
a third winding wound onto the second magnetic column;
a second winding wound onto the first magnetic column; and
a fourth winding wound onto the second magnetic column, wherein the first winding and the third winding have a first shared winding portion, the second winding and the fourth winding have a second shared winding portion, at least a part of the first shared winding portion is located between the first magnetic column and the second magnetic column, and at least a part of the second shared winding portion is located between the first magnetic column and the second magnetic column, and wherein a current flowing through the first winding and a current flowing through the third winding are overlapped in the first shared winding portion, and a current flowing through the second winding and a current flowing through the fourth winding are overlapped in the second shared winding portion; and the rectifier circuit further comprises:
a plurality of rectifier components comprising a first rectifier component and a second rectifier component electrically connected to form a half-bridge full-wave rectifier circuit.

18. The power supply module according to claim 17, wherein at least one of the first rectifier component and the second rectifier component is connected in series to the first shared winding portion or the second shared winding portion.

19. The power supply module according to claim 17, wherein part of the first winding and part of the third winding disposed on outside of the first magnetic column and the second magnetic column are electrically connected to form a first annular winding portion, part of the second winding and part of the fourth winding disposed on outside of the first magnetic column and the second magnetic column are electrically connected to form a second annular winding portion, the first shared winding portion has one end electrically connected to the first annular winding portion, and the other end electrically connected to the second annular winding portion, and the second shared winding portion has one end electrically connected to the first annular winding portion, and the other end electrically connected to the second annular winding portion.

20. The power supply module according to claim 19, wherein the first rectifier component is connected in series to the first shared winding portion, the second rectifier component is connected in series to the second shared winding portion, a negative electrode of the second rectifier component is electrically connected to a positive output terminal Vo of the power supply module, and a positive electrode of the first rectifier component is electrically connected to a negative output terminal GND of the power supply module.

21. The power supply module according to claim 19, wherein the first rectifier component and the second rectifier component are connected in series to the second shared winding portion, negative electrodes of the first rectifier component and the second rectifier component are electrically connected to a positive output terminal Vo of the power supply module, and the first shared winding portion is electrically connected to a negative output terminal GND of the power supply module.

22. The power supply module according to claim 19, wherein the first rectifier component and the second rectifier component are connected in series to the first shared winding portion, positive electrodes of the first rectifier component and the second rectifier component are electrically connected to a negative output terminal GND of the power supply module, and the second shared winding portion is electrically connected to a positive output terminal Vo of the power supply module.

23. The power supply module according to claim 17, wherein the first rectifier component and the second rectifier component are between the first magnetic column and the second magnetic column, or
    the first rectifier component and the second rectifier component are located on upper side of the first magnetic column and the second magnetic column, or
    the first rectifier component and the second rectifier component are located on lower side of the first magnetic column and the second magnetic column.

24. The power supply module according to claim 19, wherein the plurality of rectifier components further comprise a third rectifier component; wherein
    the first rectifier component is connected in series to the first shared winding portion, and the second rectifier component and the third rectifier component are connected in series to the second annular winding portion, or
    the first rectifier component is connected in series to the second shared winding portion, and the second rectifier component and the third rectifier component are connected in series to the first annular winding portion.

25. The power supply module according to claim 19, wherein the plurality of rectifier components further comprise a third rectifier component and a fourth rectifier component;
    the first rectifier component is connected in series to a section of the second annular winding portion surrounding the first magnetic column, the second rectifier component is connected in series to a section of the first annular winding portion surrounding the first magnetic column, the third rectifier component is connected in series to a section of the first annular winding portion surrounding the second magnetic column, and the fourth rectifier component is connected in series to a section of the second annular winding portion surrounding the second magnetic column;
    positive electrodes of the first rectifier component and the fourth rectifier component are electrically connected to the second shared winding portion, the second shared winding portion is electrically connected to a negative output terminal GND of the power supply module, negative electrodes of the second rectifier component and the third rectifier component are electrically connected to the first shared winding portion, and the first shared winding portion is electrically connected to a positive output terminal Vo of the power supply module.

26. The power supply module according to claim 25, wherein the first rectifier component, the second rectifier component, the third rectifier component and the fourth rectifier component are located on upper side of the first magnetic column and the second magnetic column; or
    the first rectifier component, the second rectifier component, the third rectifier component and the fourth rectifier component are located on lower side of the first magnetic column and the second magnetic column; or
    the first rectifier component and the second rectifier component are respectively located on upper side and lower side of the first magnetic column and the second magnetic column, and the third rectifier component and the fourth rectifier component are respectively located on the upper side and the lower side of the first magnetic column and the second magnetic column; or
    the first rectifier component and the second rectifier component are located on one side of upper side and lower side of the first magnetic column and the second magnetic column, and the third rectifier component and the fourth rectifier component are located on the other side of the upper side and lower side of the first magnetic column and the second magnetic column; or
    the first rectifier component and the second rectifier component are located on a left side of the first magnetic column and the second magnetic column, and the third rectifier component and the fourth rectifier component are located on a right side of the first magnetic column and the second magnetic column.

27. The power supply module according to claim 17, wherein the rectifier circuit further comprises a third rectifier component and a fourth rectifier component.

28. The power supply module according to claim 27, wherein the transformer further comprises a third magnetic column, a fifth winding and a sixth winding wound onto the third magnetic column, the third winding and the fifth winding have a third shared winding portion, the fourth winding and the sixth winding have a fourth shared winding portion, the first magnetic column, the second magnetic column and the third magnetic column are linearly arranged in sequence, magnetic fluxes in the adjacent magnetic columns have opposite directions, and the third magnetic column is connected between the first cover plate and the second cover plate;
    the magnetic core further comprises a first magnetic side column and a second magnetic side column disposed on outside of the first magnetic column, the second magnetic column and the third magnetic column, the first magnetic side column and the second magnetic side column are connected between the first cover plate and the second cover plate, and magnetic fluxes in the first magnetic side column and the second magnetic side column are a half of magnetic flux of the first magnetic column or the second magnetic column;

outer conductors are disposed on outside of the first magnetic column, the second magnetic column and the third magnetic column, and comprises a first outer conductor, a second outer conductor, a third outer conductor and a fourth outer conductor, the first outer conductor is formed by electrically connecting the first winding surrounding an upper surface of the first magnetic column, the third winding surrounding an upper surface of the second magnetic column and the fifth winding surrounding an upper surface of the third magnetic column sequentially, the second outer conductor is formed by electrically connecting the second winding surrounding the upper surface of the first magnetic column, the fourth winding surrounding the upper surface of the second magnetic column and the sixth winding surrounding the upper surface of the third magnetic column sequentially, the third outer conductor is formed by electrically connecting the second winding surrounding a lower surface of the first magnetic column, the fourth winding surrounding a lower surface of the second magnetic column and the fifth winding surrounding a lower surface of the third magnetic column sequentially, and the fourth outer conductor is formed by electrically connecting the first winding surrounding the lower surface of the first magnetic column, the third winding surrounding the lower surface of the second magnetic column and the sixth winding surrounding the lower surface of the third magnetic column sequentially;

a first inner conductor and a second inner conductor are provided between the first magnetic side column and the first magnetic column, a third inner conductor and a fourth inner conductor are provided between the second magnetic side column and the third magnetic column, a first shared winding portion and a second shared winding portion are provided between the first magnetic column and the second magnetic column, and a third shared winding portion and a fourth shared winding portion are provided between the second magnetic column and the third magnetic column;

the first inner conductor has one end electrically connected to the first outer conductor, and the other end electrically connected to the fourth outer conductor, the second inner conductor has one end electrically connected to the second outer conductor, and the other end electrically connected to the third outer conductor, the third inner conductor has one end electrically connected to the first outer conductor, and the other end electrically connected to the third outer conductor, the fourth inner conductor has one end electrically connected to the second outer conductor, and the other end electrically connected to the fourth outer conductor, the first shared winding portion has one end electrically connected to the first outer conductor, and the other end electrically connected to the third outer conductor, the second shared winding portion has one end electrically connected to the second outer conductor, and the other end electrically connected to the fourth outer conductor, the third shared winding portion has one end electrically connected to the first outer conductor, and the other end electrically connected to the fourth outer conductor, and the fourth shared winding portion has one end electrically connected to the second outer conductor, and the other end electrically connected to the third outer conductor.

29. The power supply module according to claim 28, wherein the first rectifier component is connected in series to the first inner conductor, the second rectifier component is connected in series to the second shared winding portion, the third rectifier component is connected in series to the third shared winding portion, and the fourth rectifier component is connected in series to the fourth inner conductor;

negative electrodes of the first rectifier component, the second rectifier component, the third rectifier component and the fourth rectifier component are electrically connected to the fourth outer conductor, the third outer conductor is electrically connected to a negative output terminal GND of the power supply module, and the fourth outer conductor is electrically connected to a positive output terminal Vo of the power supply module.

30. The power supply module according to claim 27, wherein the transformer further comprises a third magnetic column, a fourth magnetic column, a fifth winding and a sixth winding wound onto the third magnetic column, a seventh winding and an eighth winding wound onto the fourth magnetic column, the first magnetic column, the second magnetic column, the third magnetic column and the fourth magnetic column are arranged in an array, magnetic fluxes of the adjacent magnetic columns have opposite directions, and the third magnetic column and the fourth magnetic column are connected between the first cover plate and the second cover plate;

the first winding, the third winding, the fifth winding and the seventh winding disposed on outside of the first magnetic column, the second magnetic column, the third magnetic column and the fourth magnetic column are electrically connected sequentially to form a first annular winding portion, the second winding, the fourth winding, the sixth winding and the eighth winding disposed on outside of the first magnetic column, the second magnetic column, the third magnetic column and the fourth magnetic column are electrically connected sequentially to form a second annular winding portion, the windings between the adjacent magnetic columns form the first shared winding portions and the second shared winding portions, the first shared winding portions are electrically connected to form a first cross-shaped winding portion, the second shared winding portions are electrically connected to form a second cross-shaped winding portion;

the first cross-shaped winding portion has one node and four terminals, two spaced terminals of the first cross-shaped winding portion are electrically connected to the first annular winding portion, another two terminals of the first cross-shaped winding portion are electrically connected to the second annular winding portion, the second cross-shaped winding portion has one node and four terminals, two spaced terminals of the second cross-shaped winding portion are electrically connected to the first annular winding portion, another two terminals of the second cross-shaped winding portion are electrically connected to the second annular winding portion;

the two terminals of the second cross-shaped winding portion electrically connected to the first annular winding portion are adjacent to the two terminals of the first cross-shaped winding portion electrically connected to the second annular winding portion, and the two terminals of the second cross-shaped winding portion electrically connected to the second annular winding portion are adjacent to the two terminals of the first cross-shaped winding portion electrically connected to the first annular winding portion.

31. The power supply module according to claim 30, wherein each of the first rectifier component, the second rectifier component, the third rectifier component and the fourth rectifier component is connected in series to the first shared winding portions between the corresponding adjacent magnetic columns, negative electrodes of the first rectifier component, the second rectifier component, the third rectifier component and the fourth rectifier component are electrically connected to the node of the first cross-shaped winding portion, the node of the first cross-shaped winding portion is electrically connected to a positive output terminal Vo of the power supply module, and the node of the second cross-shaped winding portion is electrically connected to a negative output terminal GND of the power supply module.

32. The power supply module according to claim 30, wherein the first rectifier component and the third rectifier component are connected in series to the first shared winding portion, the second rectifier component and the fourth rectifier component are connected in series to the second shared winding portion, positive electrodes of the first rectifier component and the third rectifier component are electrically connected to the node of the first cross-shaped winding portion, positive electrodes of the second rectifier component and the fourth rectifier component are electrically connected to the node of the second cross-shaped winding portion, the first annular winding portion is electrically connected to a negative output terminal GND of the power supply module, and the second annular winding portion is electrically connected to a positive output terminal Vo of the power supply module.

33. The power supply module according to claim 20, wherein
when a magnetic flux in the first magnetic column exits perpendicular to a paper, and a magnetic flux in the second magnetic column enters perpendicular to the paper, a current of the first winding flows along an anticlockwise direction, a current of the third winding flows along a clockwise direction, the second rectifier component is turned off, the first rectifier component is turned on, the current of the first winding flows through the negative output terminal GND of the power supply module, the first rectifier component and the first winding to the positive output terminal Vo of the power supply module, and the current of the third winding flows through the negative output terminal GND of the power supply module, the first rectifier component and the third winding to the positive output terminal Vo of the power supply module;

when a magnetic flux in the first magnetic column enters perpendicular to a paper, and a magnetic flux in the second magnetic column exits perpendicular to the paper, a current of the second winding flows along a clockwise direction, a current of the fourth winding flows along an anticlockwise direction, the first rectifier component is turned off, the second rectifier component is turned on, the current of the second winding flows through the negative output terminal GND of the power supply module, the second winding and the second rectifier component to the positive output terminal Vo of the power supply module, and the current of the fourth winding flows through the negative output terminal GND of the power supply module, the fourth winding and the second rectifier component to the positive output terminal Vo of the power supply module.

34. The power supply module according to claim 33, wherein each of the rectifier components comprises one switch or a plurality of switches connected in parallel;
the winding is a flat-wise winding, and functions as a secondary winding of the transformer.

* * * * *